United States Patent
Omote et al.

(10) Patent No.: US 12,379,286 B2
(45) Date of Patent: Aug. 5, 2025

(54) TIRE AND TIRE SENSOR

(71) Applicants: NITTO, INC., Teaneck, NJ (US); NITTO DENKO CORPORATION, Osaka (JP)

(72) Inventors: Toshihiko Omote, San Jose, CA (US); Benedicto Delos Santos, San Jose, CA (US); Martin John McCaslin, San Jose, CA (US); John Bortell, San Jose, CA (US); Sean Sousa, San Jose, CA (US); Colton Allen Ottley, Salt Lake City, UT (US); Jared K. Jonas, Salt Lake City, UT (US); Colin D. Eichinger, Salt Lake City, UT (US); Nathan C. Briggs, Salt Lake City, UT (US)

(73) Assignees: NITTO, INC., Teaneck, NJ (US); NITTO DENKO CORPORATION, Osaka (JP); NITTO BEND TECHNOLOGIES, INC., Farmington, UT (US)

( * ) Notice: Subject to any disclaimer, the term of this patent is extended or adjusted under 35 U.S.C. 154(b) by 288 days.

(21) Appl. No.: 17/904,707

(22) PCT Filed: Feb. 19, 2021

(86) PCT No.: PCT/US2021/018825
§ 371 (c)(1),
(2) Date: Aug. 19, 2022

(87) PCT Pub. No.: WO2021/168286
PCT Pub. Date: Aug. 26, 2021

(65) Prior Publication Data
US 2023/0008775 A1    Jan. 12, 2023

Related U.S. Application Data

(60) Provisional application No. 63/118,561, filed on Nov. 25, 2020, provisional application No. 63/065,817,
(Continued)

(51) Int. Cl.
*G01M 17/02* (2006.01)
*B60C 19/00* (2006.01)
(Continued)

(52) U.S. Cl.
CPC ............. *G01M 17/02* (2013.01); *B60C 19/00* (2013.01); *B60C 23/064* (2013.01); *G01B 7/22* (2013.01);
(Continued)

(58) Field of Classification Search
CPC ...... G01M 17/02; B60C 19/00; B60C 23/064; B60C 2019/004; G01B 7/22; G01L 1/142; B60T 2240/04
See application file for complete search history.

(56) References Cited

U.S. PATENT DOCUMENTS 7,543,491 B2   6/2009  Hammerschmidt et al.
9,815,343 B1   11/2017 Laflamme et al.
(Continued)

FOREIGN PATENT DOCUMENTS

CN   101371119 A   2/2009
CN   104136930 A   11/2014
(Continued)

OTHER PUBLICATIONS

CN-104870223-A, English Translation (Year: 2015).*
(Continued)

*Primary Examiner* — Ryan D Walsh
(74) *Attorney, Agent, or Firm* — MASCHOFF BRENNAN; Paul G. Johnson

(57) ABSTRACT

In an example, a vehicle tire includes a tread portion, a sidewall portion, and a sensor module for estimating one or more parameters of the tire. The sensor module includes a detector patch that includes one or more capacitors, each of which has an electrostatic capacity that is variable due to at least deformation of each capacitor. The sensor module also includes an electronics unit connected to each capacitor and configured to control the sensor module. The detector patch is adhered to an inside of at least one of the tread portion or
(Continued)

the sidewall portion. At least one of the capacitors is located on the inside of the at least one of the tread portion or the sidewall portion. The electronics unit is configured to estimate at least one of the parameters based on the electrostatic capacity of each capacitor.

9 Claims, 25 Drawing Sheets

Related U.S. Application Data filed on Aug. 14, 2020, provisional application No. 63/058,098, filed on Jul. 29, 2020, provisional application No. 63/015,368, filed on Apr. 24, 2020, provisional application No. 62/979,882, filed on Feb. 21, 2020.

(51) Int. Cl.
 B60C 23/06 (2006.01)
 G01B 7/16 (2006.01)
 G01L 1/14 (2006.01)
(52) U.S. Cl.
 CPC ........ *G01L 1/142* (2013.01); *B60C 2019/004* (2013.01); *B60T 2240/04* (2013.01)

(56) References Cited

U.S. PATENT DOCUMENTS

| 10,823,546 | B1 | 11/2020 | Reese et al. |
| 11,267,298 | B2 | 3/2022 | Begou et al. |
| 2007/0068266 | A1 | 3/2007 | Fujimori et al. |
| 2009/0069969 | A1 | 3/2009 | Hammerschmidt |
| 2010/0147063 | A1 | 6/2010 | Suzuki et al. |
| 2014/0060169 | A1 | 3/2014 | McNeil et al. |
| 2014/0338451 | A1 | 11/2014 | Takagi |
| 2014/0350879 | A1 | 11/2014 | Takiguchi et al. |
| 2015/0048849 | A1 | 2/2015 | Reese |
| 2015/0292970 | A1 | 10/2015 | Gando et al. |
| 2016/0169760 | A1 | 6/2016 | McNeil et al. |
| 2016/0305759 | A1 | 10/2016 | Reese et al. |
| 2017/0010298 | A1 | 1/2017 | Tanaka |
| 2017/0190227 | A1* | 7/2017 | Genmei .................... G01L 9/08 |
| 2017/0273599 | A1 | 9/2017 | Reese et al. |
| 2018/0297424 | A1 | 10/2018 | Mori et al. |
| 2020/0141794 | A1 | 5/2020 | Hiyama et al. |

FOREIGN PATENT DOCUMENTS

| CN | 104870223 A * | 8/2015 | ......... B60C 23/0408 |
| JP | 2007-86002 A | 4/2007 | |
| JP | 2009-175113 A | 8/2009 | |
| JP | 2014-48292 A | 3/2014 | |
| JP | 2014-142193 A | 8/2014 | |
| JP | 2014-231337 A | 12/2014 | |
| JP | 2015-003651 A | 1/2015 | |
| JP | 2017-71341 A | 4/2017 | |
| JP | 2019-60667 A | 4/2019 | |
| WO | 2007/086390 A1 | 8/2007 | |
| WO | 2019/003621 A1 | 1/2019 | |
| WO | WO-2019135401 A1 * | 7/2019 | ............. G01L 1/142 |

OTHER PUBLICATIONS

WO-2019135401-A1 (Year: 2019).*
Marc Matysek, et al., Combined Driving and Sensing Circuitry for Dielectric Elastomer Actuators in mobile applications, Proceedings of Spie, downloaded from https://www.spiedigitallibrary.org/conference-proceedings-of-spie on Jan. 25, 2021, 12 pgs.
Andreas Tairych, et al., Distributed sensing: multiple capacitive stretch sensors on a single channel, Electroactive Polymer Actuators and Devices, downloaded from http://proceedings.spiedigitallibrary.org/ on May 23, 2017, 10 pgs.
Daniel Xu et al., Enabling large scale capacitive sensing for dielectric elastomers, Electroactive Polymer Actuators and Devices, downloaded from http://proceedings.spiedigitallibrary.org/ on Oct. 12, 2015, 9 pgs.
International Search Report and Written Opinion, as issued in connection with International Patent Application No. PCT/US2021/018825, dated May 25, 2021, 12 pgs.
Japanese Office Action, as issued in connection with Japanese Application No. 2022-550873, dated Jan. 14, 2025, 14 pgs.
First Office Action dated Sep. 18, 2024 in the corresponding TW application No. 110105777, 13 pgs.
Chinese Office Action, as issued in connection with Chinese Application No. 202180030357.2, dated Mar. 19, 2025, 19 pgs.

* cited by examiner

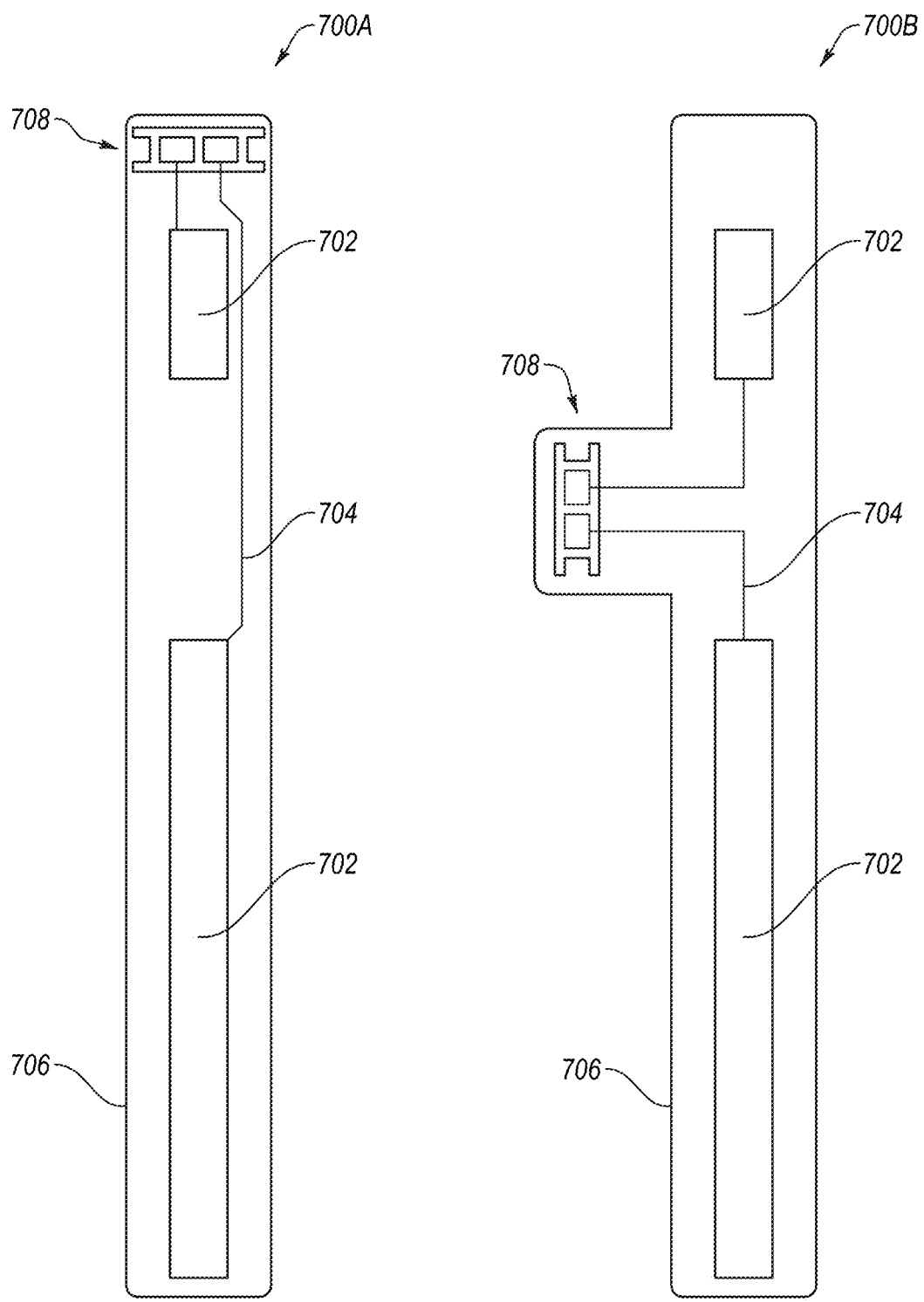

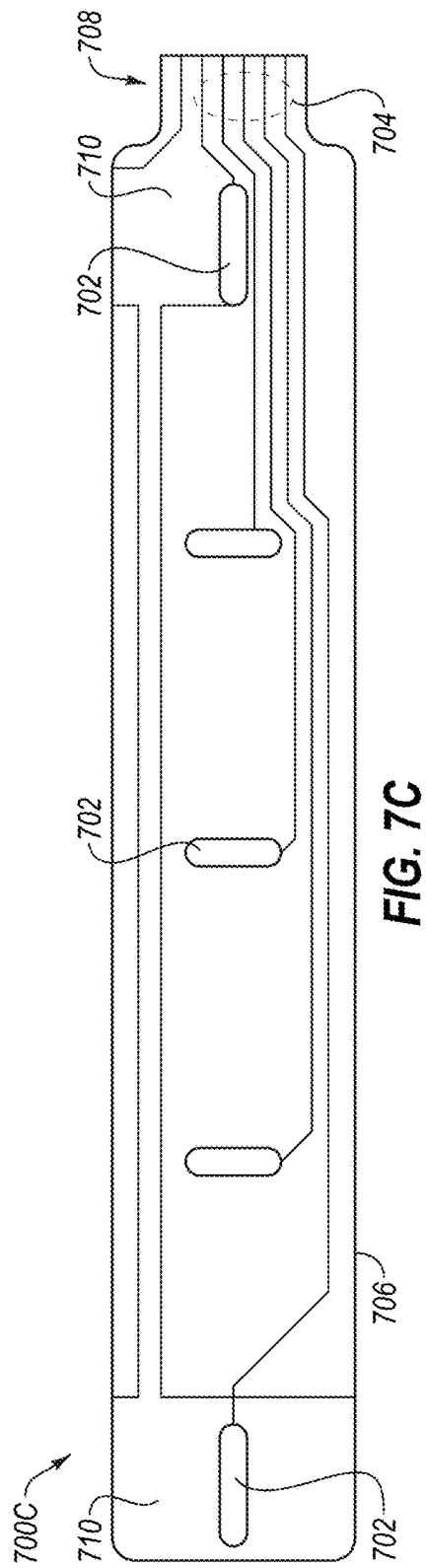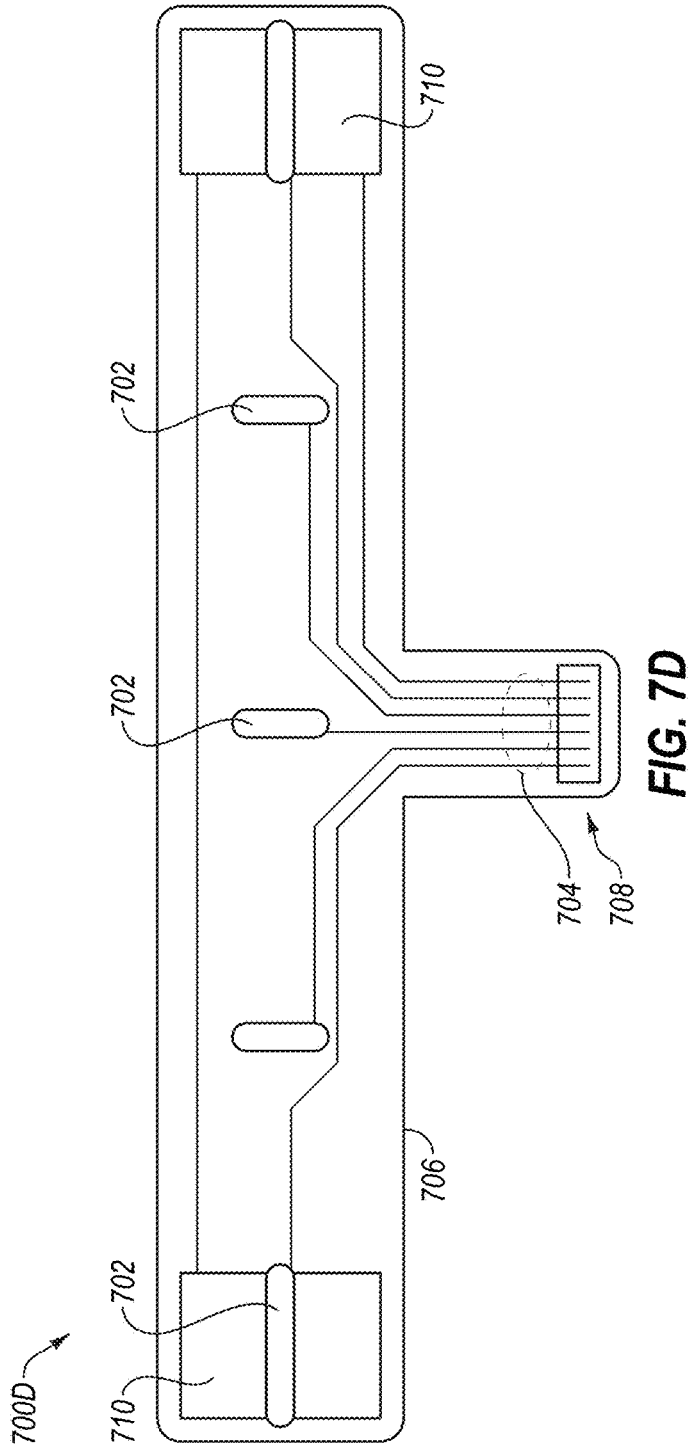

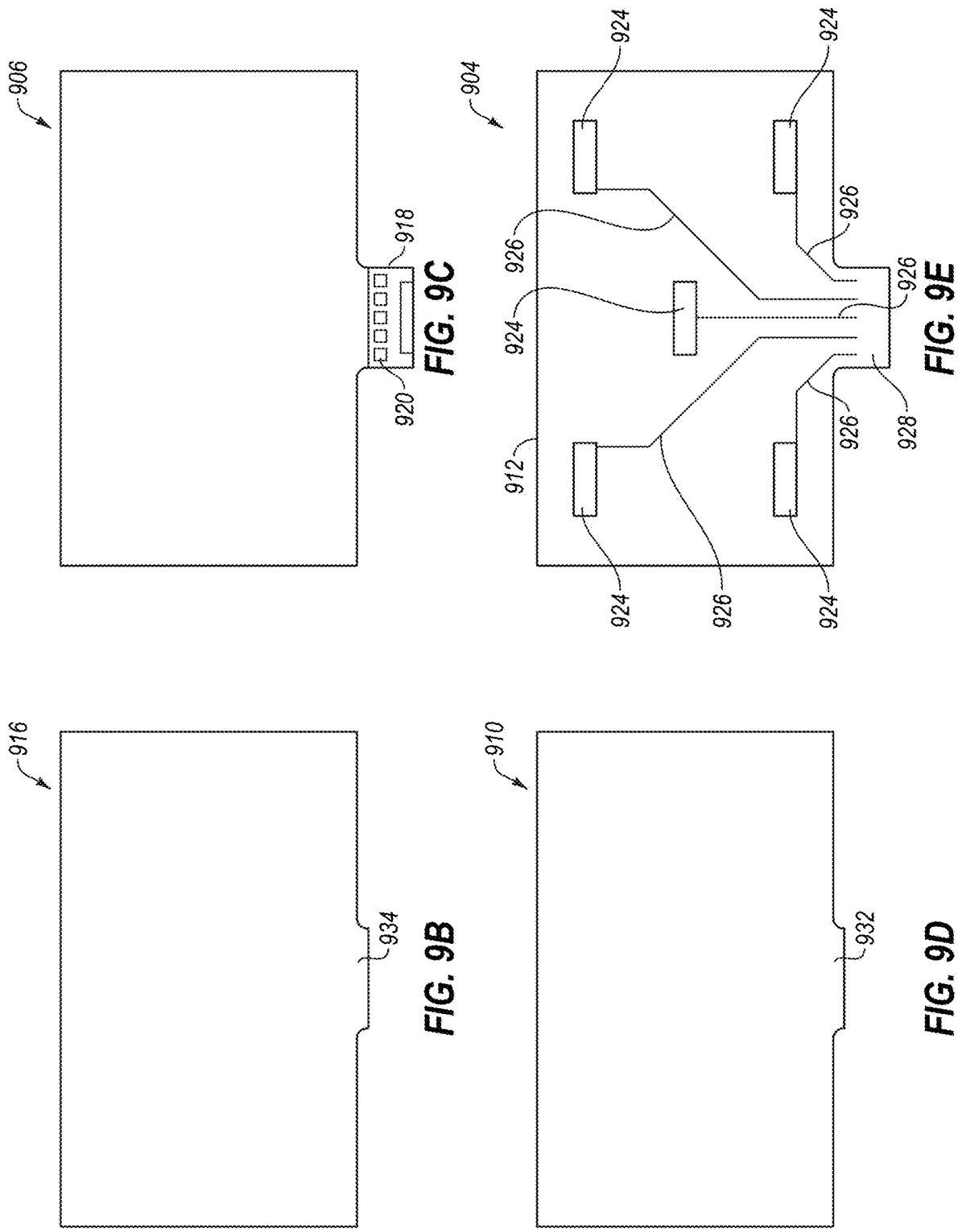

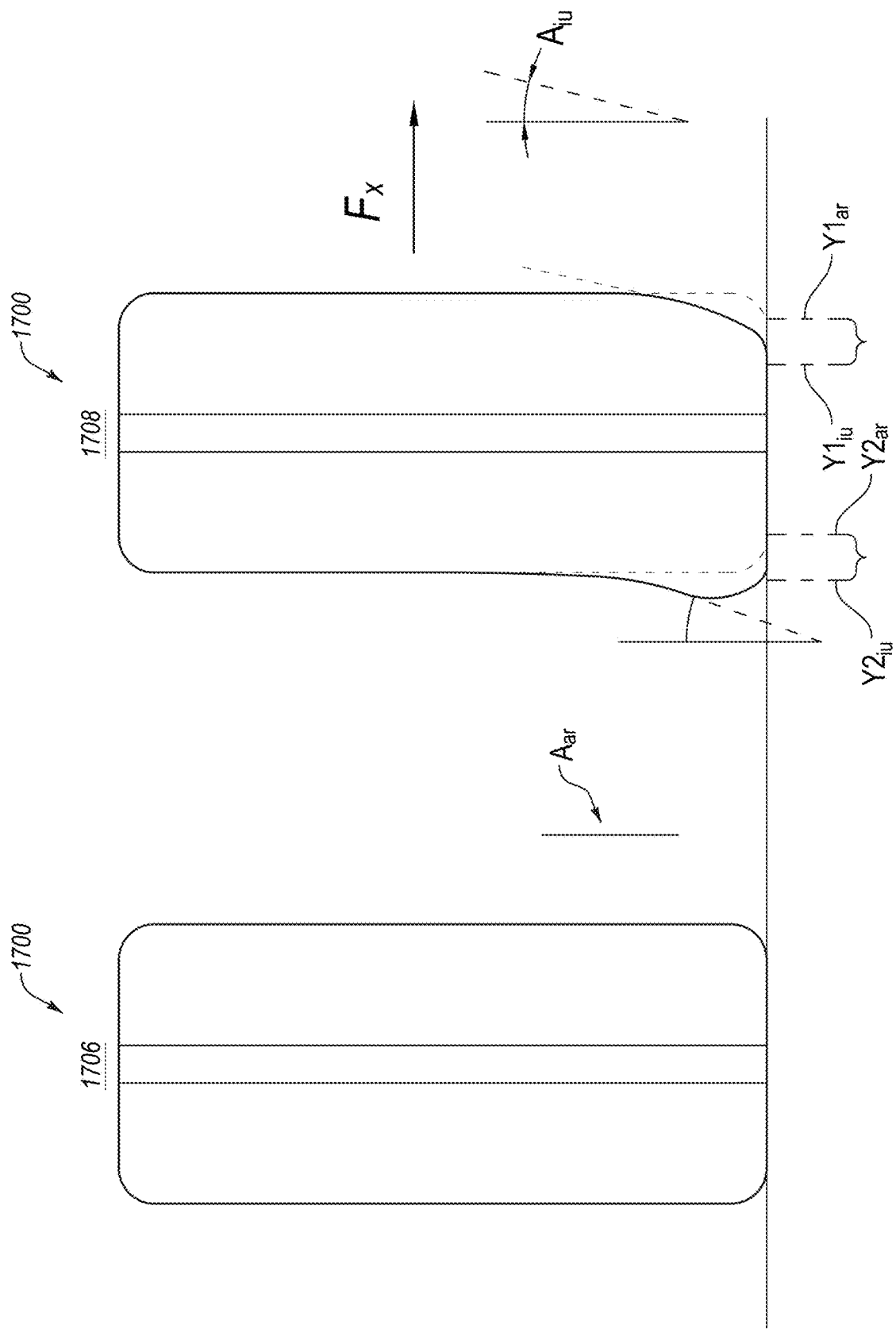

TIRE AND TIRE SENSOR

CROSS-REFERENCE TO RELATED APPLICATIONS

This application claims the benefit of and priority to U.S. Provisional Application No. 62/979,882 filed Feb. 21, 2020, U.S. Provisional Application No. 63/015,368 filed Apr. 24, 2020, U.S. Provisional Application No. 63/058,098 filed Jul. 29, 2020, U.S. Provisional Application No. 63/065,817 filed Aug. 14, 2020, and U.S. Provisional Application No. 63/118,561 filed Nov. 25, 2020, each of which is incorporated herein by reference in its entirety for all that it discloses.

FIELD

The present disclosure is related to a capacitive tire sensor and methods for making and using the same.

BACKGROUND

Unless otherwise indicated herein, the materials described herein are not prior art to the claims in the present application and are not admitted to be prior art by inclusion in this section.

Current tire sensors use accelerometers in a single package, attached to one point on the tire, to measure acceleration in several dimensions. The measured accelerations in turn are used as inputs to formulas from which quantities such as: contact length, slip angle, longitudinal force, lateral force, vertical force (i.e. vehicle loading), the hydroplaning portion of the contact patch, road classification, are estimated. This method is indirect, and accelerometer outputs are subject to a considerable amount of noise. This leads to less accurate and more time-consuming calculations. This limitation becomes more pronounced when the method is used to deduce characteristics related to road conditions (e.g., dry, wet, snow, rough) and tire conditions (e.g. tread wear).

In response to these problems, capacitive tire sensors have been described (see U.S. Pat. Nos. 7,121,145; 7,543,491; 7,880,600). In addition, compliant multi-region angular displacement and strain sensors have been described (e.g., U.S. Pat. Nos. 9,874,431, 9,612,102, 9,476,692, 9,222,764 and 8,941,281).

Thus, there is a need for a tire sensor which can provide information on multiple tire parameters. Thus, there is a need for a tire sensor which can provide information on both strain and bending of whole areas of a tire under operating loads. Such a sensor system may be used to achieve a more comprehensive sensor system for use in combination with vehicles with inflated tires

SUMMARY

In an example embodiment, a vehicle tire includes a tread portion, a sidewall portion, and a sensor module for estimating one or more parameters of the tire. The sensor module may include a detector patch with one or more capacitors, each of which has an electrostatic capacity that is variable due to at least deformation of each capacitor. The sensor module may also include an electronics unit connected to each capacitor and configured to control the sensor module. The detector patch is adhered to an inside of at least one of the tread portion or the sidewall portion. At least one of the capacitors is located on the inside of the tread portion or the sidewall portion. The electronics unit is configured to estimate at least one of the parameters based on the electrostatic capacity of each capacitor.

These and other embodiments are described in greater detail below.

BRIEF DESCRIPTION OF THE DRAWINGS

FIGS. 7A-7D include overhead views of other example signal electrode layers that may be included in detector patches;

FIGS. 9B-9H are overhead views of, respectively, a second dielectric cover layer, a second electrode layer, a dielectric layer, a signal electrode layer, a dielectric layer, a first electrode layer, and a first dielectric cover layer of the detector patch of FIG. 9A;

FIGS. 17A-17D illustrate some of the forces that may be experienced by a vehicle tire when the vehicle is in operation;

DETAILED DESCRIPTION

The current disclosure describes a sensor module, a vehicle tire with sensor module, and methods of making and using such sensor modules. The sensor module may be used to measure or estimate one or more tire parameters of a vehicle tire to which it is attached. The sensor module may include a detector patch with one or more capacitors, each of which has an electrostatic capacity that is variable due to at least deformation of each capacitor. The sensor module may include an electronics unit connected to each capacitor and configured to control the sensor module. The detector patch may be adhered to an inside of at least one of a tread portion of the vehicle tire or a sidewall portion of the vehicle tire. At least one of the capacitors may be located on the inside of the tread portion or the sidewall portion. The electronics unit may be configured to estimate at least one of the parameters based on the electrostatic capacity of each capacitor.

"Contiguous," as used herein, means being proximate to or in actual contact.

"Sandwich," as used herein, means to insert or enclose between at least two things of another quality or character.

"Flexible," as used herein, means capable of bending.

"Extensible," as used herein, means capable of extending or stretching.

"Distensible," as used herein, means capable of stretching or spreading in one or more directions.

"Deformable," as used herein, means capable of changing shape.

"Lamellar", as used herein, means composed of or arranged in thin layers of different material composition.

"Layered," as used herein, means composed of or arranged in layers.

"Close proximity", as used herein refers to being proximate to or disposed adjacent to.

The term "sidewall," a term known in the art, refers to the portion of the tire that extends from the wheel/rim to which the tire is attached/mounted to the shoulder portion of the tire.

The term "shoulder," a term known in the art, refers to the transition portion of the tire connecting the sidewall portion of the tire to the tread portion of the tire.

The term "tread," a term known in the art, refers to the part of the tire that comes in contact with the road surface. The tread can be a thick rubber, or rubber/composite compound formulated to provide an appropriate level of traction that does not wear away too quickly.

The term "contact patch" refers to the portion of the tire that is in contact with the road at a given instant in time.

In some embodiments, a tire sensor is described that can provide real-time information of strain and/or bending of whole and plural areas of a tire.

Figure 1:
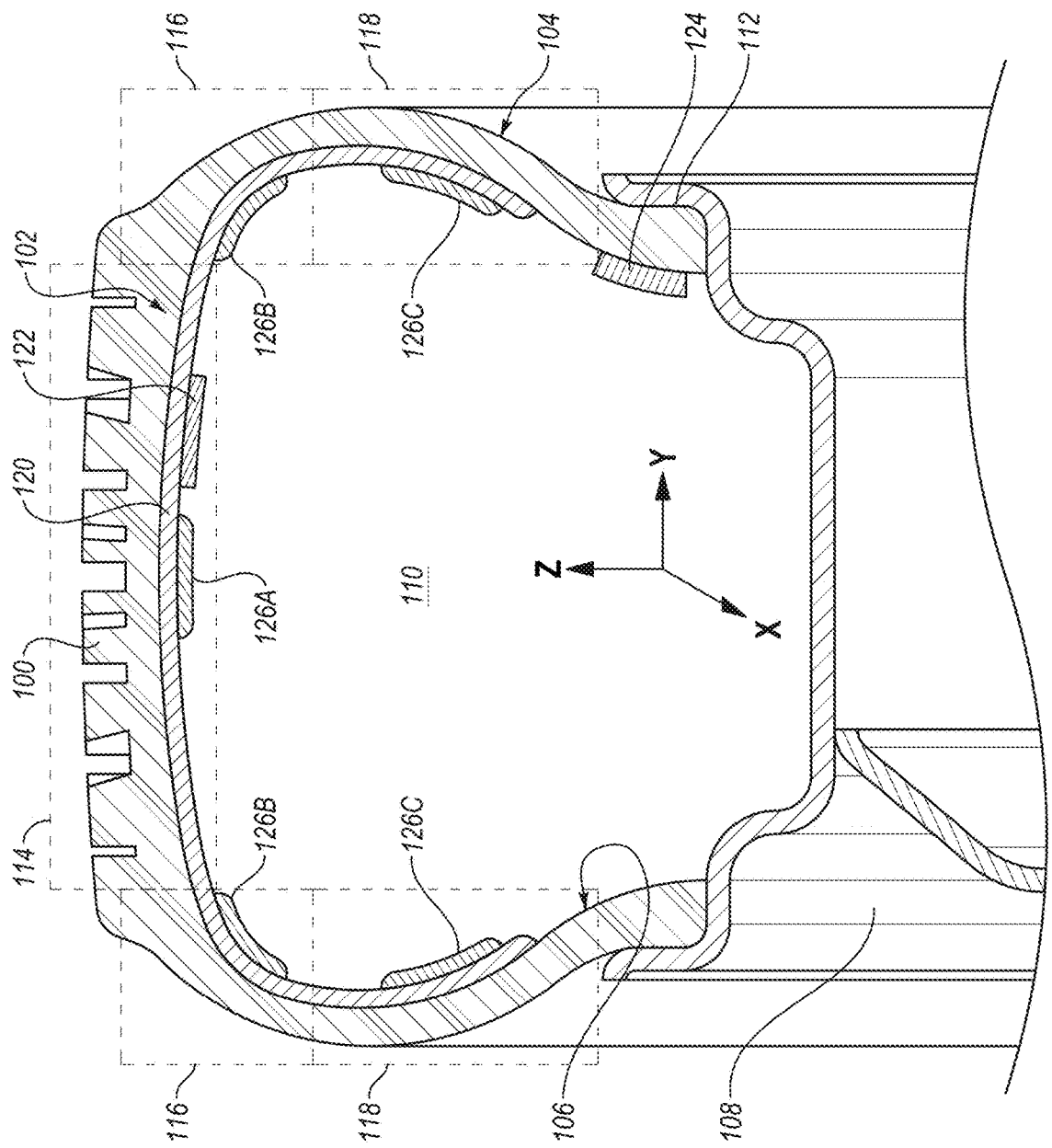
FIG. 1 is a cross-sectional view of a portion of a tire with an example sensor module for estimating one or more parameters of the tire.

FIG. 1 is cross-sectional view of a portion of a tire 100 with an example sensor module 102 for estimating one or more parameters of the tire 100, arranged in accordance with at least one embodiment described herein. In some embodiments, the tire 100 is a tubeless tire having a tire carcass 104 with an inner surface 106, the tire 100 forming an air tight seal with a wheel 108 to define a reservoir 110 for receipt of a gas, generally air, therein. The tire carcass 104 may have a tire bead 112 which interacts with the wheel 108 to form the air tight seal. In some embodiments, the tire 100 is used with an inner tube disposed within the reservoir 110 to hold a gas such as air, in which case the tire 100 need not form an air tight seal with the wheel 108. The tire carcass 104 may include a tread portion 114, shoulder portions 116, and sidewall portions 118.

The sensor module 102 may be disposed upon the inner surface 106 of the tire 100, on an outer surface of an inner tube disposed within the reservoir 110 when the tire 100 is implemented with the inner tube, or on or at other suitable location(s). The sensor module 102 may generally include a detector patch 120 and an electronics unit 122 connected to the detector patch 120. The sensor module 102 may additionally include or be coupled to an electric power source 124. For example, the electronics unit 122 may be coupled to the electric power source 124 to obtain power for operation.

The detector patch 120 may include one or more sensor regions 126A, 126B, and/or 126C (hereinafter collectively "sensor regions 126" or generically "sensor region 126"). Each of the sensor regions 126 may include one or more capacitors. The detector patch 120 may be applied or coupled to the inner surface 106 such that one or more of the sensor regions 126 is disposed upon, in close proximity, and/or adjacent to the tread portion 114, the shoulder portions 116, and/or the sidewall portions 118. For example, as illustrated in FIG. 1, the sensor region 126A is disposed on, in close proximity to, or adjacent to the tread portion 114, sensor regions 126B are disposed on, in close proximity to, or adjacent to shoulder portions 116, and sensor regions 126C are disposed on, in close proximity to, or adjacent to sidewall portions 118. In some embodiments, adjacent can be within 1 millimeter (mm), 5 mm, 10 mm, 25 mm, or 100 mm of the tread portion 114, shoulder portion 116, or sidewall portion 118 of the tire 100. Alternatively or additionally, the detector patch 120 may be adhered to the inside of the tread portion 114 (e.g., on the inner surface 106), the inside of the shoulder portion 116 (e.g., on the inner surface 106), and/or the inside of the sidewall portion 118 (e.g., on the inner surface 106).

In FIG. 1, each of the sensor regions 126 is depicted as being located inside a single one of the tread portion 114, the shoulder portion 116, or the sidewall portion 118. Alternatively or additionally, one or more of the sensor regions 126 may be located inside two or more of the tread portion 114, the shoulder portion 116, or the sidewall portion 118. For example, at least one of the sensor regions 126 may be elongate and may extend across an inside of at least two of the tread portion 114, the shoulder portion 116, or the sidewall portion 118

The electronics unit 122 is depicted in FIG. 1 as inside the tread portion 114 but more generally may be positioned anywhere on or coupled to the tire 100, the wheel 108, the detector patch 120, and/or the electric power source 124. In some embodiments, the electronics unit 122 includes one or more of a printed circuit board (PCB), one or more voltage and/or current measurement circuits, a transmitter, a receiver, a transceiver, or other components. The electronics unit 122 may be configured to measure one or more parameters of the sensor regions 126 or capacitors therein, estimate one or more tire parameters based on the measurements, transmit the estimated tire parameter(s) to another system or device, and/or transmit the measurements to another system or device to perform the estimation of one or more tire parameters.

The electric power source 124 may include one or more batteries, an energy generating circuit, a receiver coil and circuitry of an inductive charging unit, or other electric power source.

FIG. 1 includes arbitrarily-defined X, Y, Z coordinate axes arranged with the X axis aligned to a longitudinal direction (e.g., the direction the tire 100 moves when rolling forward or backward without any sideslip), the Y axis aligned to a lateral direction (e.g., the direction that is orthogonal to the longitudinal direction and horizontal), and the Z axis aligned to a vertical direction that is orthogonal to the longitudinal and lateral directions. The X, Y, and Z coordinate axis may also be respectively referred to as roll, pitch, and yaw axes.

When a vehicle that includes one or more tires such as the tire 100 is making a turn, it has a tendency to roll, e.g., to rotate about the X axis or the roll axis. For example, when a car is moving through a turn, tires 100 of the car on the inside of the turn (hereinafter the "inside tires 100"), or more particularly, the centers of gravity of the inside tires 100, tend to lift through the turn, while tires 100 of the car on the outside of the turn (hereinafter the "outside tires 100"), or more particularly the centers of gravity of the outside tires 100, tend to depress. This may result in movement of the center of gravity of the inside tires 100 and the outside tires in the XZ plane of FIG. 1.

When the vehicle is accelerating or decelerating, it has a tendency to rotate about the Y axis or the pitch axis. For example, when a rear-wheel drive car is accelerating forward, there is a tendency for the front of the car and thus the front tires 100, or more particularly the centers of gravity of the front tires, to lift up. When the car is moving forward and decelerates or brakes, there is a tendency for the front of the car and thus the front tires 100, or more particularly the centers of gravity of the front tires, to be depressed down. This may result in movement of the centers of gravity of the front tires 100 in the YZ plane of FIG. 1. Further, vertical forces on the tires 100 may vary, e.g., as the vehicle accelerates and decelerates. For example, compared to moving forward with constant velocity, downward vertical forces on the front tires 100 may be lower during accelerations and higher during decelerations.

When the vehicle is struck from the side by another vehicle forward or rearward of the center of gravity of the vehicle, it has a tendency to rotate about the Z axis or the yaw axis. For example, if the vehicle is struck from the side by another vehicle rearward of the center of gravity of the vehicle, and assuming the positive X direction in FIG. 1 is the direction the vehicle is facing, there is a tendency for the rear tires 100 to move laterally in the negative Y direction and a tendency for the front tires 100 to move laterally in the positive Y direction. This may result in movement of the front tires 100 in the XY plane of FIG. 1.

The vertical, longitudinal, and/or lateral forces on the tires 100 of the vehicle and/or other parameters of the tires 100 such as strain, flex, bend, or the like, may vary in these and other circumstances. Embodiments described herein may use one or more sensor modules 102 in one or more tires 100 of vehicles to estimate such tire parameters. These measured tire parameters in combination can comprise a set of leading indicators of the pitch, roll and yaw felt by the vehicle suspension system. Employing a leading indicator should reduce the response lag of an active or semi-active suspension system.

In some embodiments, one or more of the capacitors included in the sensor regions 126 of the sensor module 102 may be layered and/or lamellar. Alternatively or additionally, the one or more of the capacitors may be flexible, extensible, distensible, and/or deformable. The flexibility, extensibility, distensibility, and/or deformability of the one or more of the capacitors may be at least partially elastic. For example, a capacitor may be elastically deformable if it is capable of experiencing a change in shape under stress or force where the change in shape is reversable after the stress or force is removed.

In some embodiments, the one or more of the capacitors may include a single- or multi-directionally distensible or extensible capacitor. As used herein, multi-directionally distensible or extensible means that the capacitor may be distended or extended in multiple directions relative to its first position on the inner surface 106 of the tire 100. In some embodiments, the capacitor may be distensible or extensible in response to longitudinal, lateral, or vertical forces, or combinations thereof. The capacitor may be disposed upon a first position on the inner surface 106 and, due to distension of the tire 100 under an applied force relative this first position, may be moved or distended from this first position to a second relative position.

In some embodiments, the one or more capacitors and/or the detector patch 120 may be constrained to stretch only in a certain dimension by appropriate addition and/or orientation of elements in the sensor module 102. For example, an anisotropic member may be added to the detector patch 120 which limits deformation along the Y axis while not restricting deformation along the X axis. This may amplify an X axis deformation signal and damping Y axis deformation signal from the detector patch 120. The anisotropic member can be any layer in a stack up of the detector patch 120, including adhesive. As another example, the added member may continue to allow bending but restrict stretching. This may be the case where the added member itself is flexible but has limited stretchability.

One or more of the capacitors included in the sensor regions 126 of the sensor module 102 may be elongate; that is, a length of one or more of the capacitors may exceed its width. In some embodiments where the detector patch 120 includes multiple capacitors including a first capacitor and a second capacitor and/or multiple sensor regions 126, the first and second capacitors or first and second sensor regions 126 may be arranged such that a length of the second capacitor or second sensor region 126 is aligned within ±5°, 10°, 15°, 20°, or 30° of a length of the first capacitor or first sensor region 126 or within ±5°, 10°, 15°, 20°, or 30° of a direction orthogonal to the length of the first capacitor or first sensor region 126. In some embodiments, the first and second capacitors and/or first and second sensor regions 126 can be linearly aligned. In some embodiments, multiple capacitors and/or sensor regions 126 of the detector patch 120 can be disposed in a radially parallel plane (e.g., the XY plane of FIG. 1).

Figure 2A:
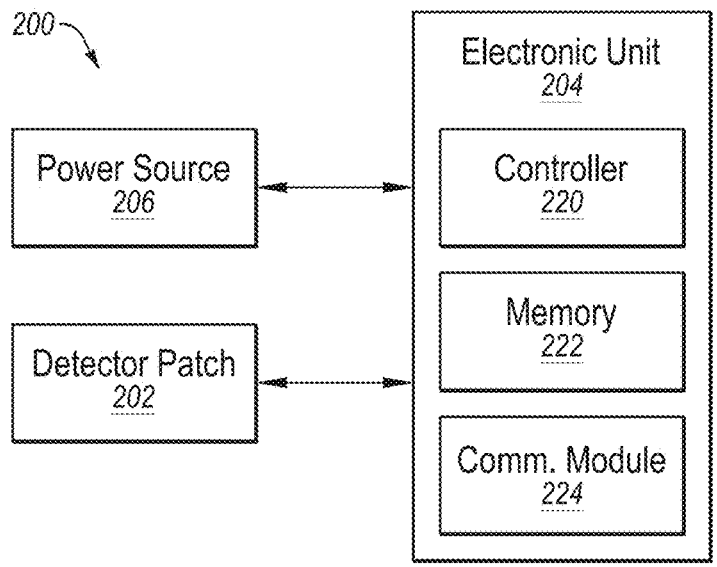
FIGS. 2A-2B are schematics of another example sensor module.
Figure 2B:
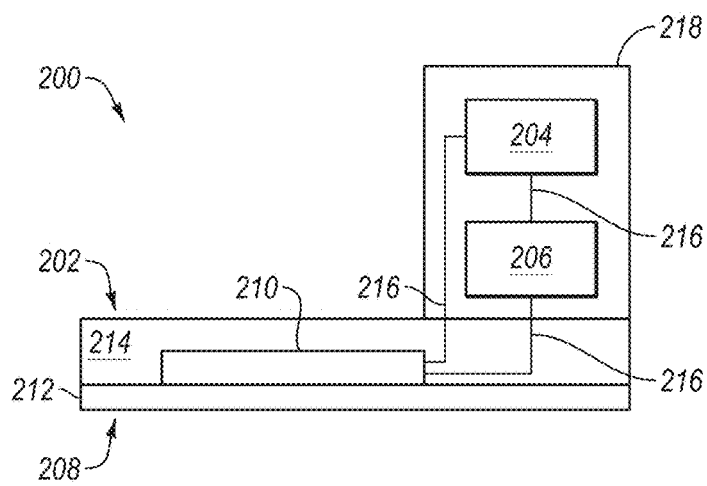

FIGS. 2A-2B are schematics of another example sensor module 200, arranged in accordance with at least one embodiment described herein. The sensor module 200 may include, be included in, or correspond to the sensor module 102 of FIG. 1. For example, the sensor module 102 of FIG. 1 may have a same, similar, or different composition and/or configuration as the sensor module 200 of FIGS. 2A-2B.

As illustrated in FIGS. 2A-2B, the sensor module 200 may generally include a detector patch 202 and an electronics unit 204 and optionally an electric power source 206, the electronics unit 204 connected to the detector patch 202 and the electric power source 206. The detector patch 202, the electronics unit 204, and the electric power source 206 may respectively include, be included in, or correspond to the detector patch 120, the electronics unit 122, and the electric power source 124 of FIG. 1.

The detector patch 202 may include a mounting surface 208 (FIG. 2B) and one or more sensor regions 210 (FIG. 2B). The mounting surface 208 may be configured to be attached to a surface of a tire or other object and/or may include a lower or bottom surface (FIG. 2B) of the detector patch 202. Alternatively or additionally, the mounting surface 208 may include an adhesive 212 (FIG. 2B) disposed thereon to adhere the detector patch 202 to a desired position within a tire cavity of a tire or exterior of an inner tube. The adhesive 212 may include thermoplastic adhesive or other suitable adhesive.

The sensor region 210 may generally include a capacitor. In some embodiments, the capacitor and/or the sensor region 210 may be flexible, extensible, distensible, deformable, layered, and/or lamellar. Alternatively or additionally, the sensor region 210 may be at least partially covered, bound, and/or surrounded by one or more protective layers 214 as part of the detector patch 202. The protective layers 214 may include an elastomeric material such as silicone or the like.

The electric power source 206 may include a battery, an energy generating circuit, an energy harvesting system (EHS) module, a dielectric elastomer generating material, a piezoelectric generating material, and/or a receiver coil and circuitry of an inductive charging unit.

The electronics unit 204 may be in electrical communication with each of the detector patch 202 and the power source 206 via one or more corresponding electrical connectors 216 (FIG. 2B). Alternatively or additionally, the electronics unit 204 and the electric power source 206 may be mechanically coupled together by epoxy resin and/or may be disposed within a housing or encapsulant 218 (FIG. 2B) that is mechanically coupled to the detector patch 202. The housing or encapsulant 218 may be an electrical, thermal, and/or mechanical insulator. For example, the housing or encapsulant 218 may include a vibration damping material such as platinum silicone flexible foam, a specific example of which includes SOMA FOAMA 25. In another embodiment, the housing 218 may be supported by a vibration isolator mounted on mounting surface 208. The vibration isolator may be or include a spring mechanism, a patterned grid of vibration dampers, a microlattice, or the like. The vibration isolators may be made from molded rubber, metal or a composite thereof. In another embodiment, an electricity generating element (e.g., dielectric elastomer generating material and/or piezoelectric generating material) can be actuated by cyclical deformation of the vibration isolator.

In some embodiments, and as illustrated in FIG. 2A, the electronics unit 204 may include a controller 220, a memory 222, and/or a communication module 224. The controller 220 may be operably coupled to each of the memory 222 and the communication module 224 and may generally be configured to control operation of the sensor module 200. For example, the electronics unit 204 generally and the controller 220 specifically may be configured to perform or control performance of operations including charging each capacitor of the sensor module 200, calculating a variation of electrostatic capacity of each capacitor on discharged charge amount during discharge of each capacitor, and/or estimating at least one tire parameter based on the electrostatic capacity and/or the variation of the electrostatic capacity. In some embodiments, the controller 220 may estimate, compare and/or otherwise analyze one or more tire parameters. The tire parameters may include one or more of: tire internal pressure, strain, angular displacement, temperature, inflation pressure (under and over) friction, hydroplaning portion of contact patch, road classification, uneven tire loads, camber imbalance, vehicle loading, individual tire balance, suspension anomalies, tire anomalies (cracks, delamination, puncture holes), treadwear and tire thickness, tire strain, quick accelerations, quick turns, quick braking, slip angle, slip ratio, camber angle effects, longitudinal force, longitudinal acceleration, longitudinal velocity, lateral force, lateral acceleration, lateral velocity, torque about longitudinal axis, torques about lateral axis, torque about vertical axis, and/or tire rotational speed. In some embodiments the controller 220 estimates the tire rotational speed and the road classification and uses that to modulate the sampling frequency. This may conserve energy in some circumstances while at the same time providing enough data to calculate safety parameters like road classification including hydroplaning at high speeds. For example, the controller 220 may increase sampling rate when it detects a wet road to allow a human driver or an autonomous vehicle to respond faster.

In some embodiments in which the sensor module 200 includes multiple sensor regions 210, the controller 220 may selectively receive data from any or all of the sensor regions 210 or portions thereof. This may facilitate tire parameter analysis while the tire is in motion and/or under the stress of turning. Alternatively or additionally, this may enable self-testing of the sensor module 200 to identify when one or more sensor regions 210 or the entire sensor module 200 or portion thereof should be replaced. The memory 222 may store data generated by the sensor regions 210 (e.g., raw measurement data or signal), data generated by the controller 220 (e.g., calculated electrostatic capacity or variation of electrostatic capacity, or estimated tire parameter(s)), and/or other data.

Incorporation of an in-sensor computing element, e.g., the controller 220, can reduce the amount of raw data, such as strain and angular displacement data, that may be sent to an external or remote device. This may reduce memory and energy consumption for wireless transmission to the external or remote device and may decrease feedback latency. In some embodiments, each tire of a vehicle includes one or more sensor modules 200 and each of the sensor modules 200 may transmit its data to an on-board computer of the vehicle that, while on the same vehicle, is nevertheless a remote device with respect to each of the sensor modules 200. The on-board computer may generate alarms or other notifications to a driver of the vehicle based on the data received from the sensor modules 200, store the data, perform further processing on the data, report the data to a fleet or vehicle management system, or perform some other operations on, with, or based on the data. In some embodiments, each sensor module 200 may be connected (e.g., networked) to the external or remote system or device in a Local Area Network (LAN), an intranet, an extranet, or the Internet. The external or remote system or device may operate in the capacity of a server or a client machine in a client-server network environment, or as a peer machine in a peer-to-peer (or distributed) network environment. Each sensor module 200 may include or be in communication with a personal computer (PC), a tablet PC, a set-top box (STB), a Personal Digital Assistant (PDA), a cellular telephone, a web appliance, a server, a network router, switch or bridge, vehicular circuitry, vehicular on-board computer or any machine capable of executing a set of instructions (sequential or otherwise) that specify actions to be taken by that sensor module 200. The controller 220 and the communications module 224 may comprise an asset-side active tracking circuit used for asset tracking.

In some embodiments, the controller 220 can selectively reduce the sampling frequency of at least one sensor region 210 when that sensor region 210 is rotated out of contact or outside of the contact patch of the tire to which the sensor module 200 is attached. In some embodiments, the sampling frequency can be increased in proportion to the tire rotational speed. In some embodiments, the controller 220 can selectively utilize capacitive output from specifically located sensor regions 210 to facilitate determination or estimation of spatial displacement, angular displacement, or other tire parameter of selected tire portions.

The controller 220 may include any suitable special-purpose or general-purpose computer, computing entity, or processing device including various computer hardware or software modules and may be configured to execute instructions stored on any applicable computer-readable storage media. For example, the processor 220 may include a processor, a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single controller 220, the controller 220 may include any number of controllers configured to, individually or collectively, perform or direct performance of any number of operations described in the present disclosure. In some embodiments, the controller 220 can include a separate or integrated AI chip which can serve as a center for sensor fusion.

In some implementations, the controller 220 may be configured to interpret and/or execute computer-executable instructions and/or process data stored in the memory 222 and/or other data storage. In some implementations, the controller 220 may fetch computer-executable instructions from a persistent data storage and load the computer-executable instructions in a non-persistent storage such as the memory 222. After the computer-executable instructions are loaded into memory 222, the controller 220 may execute the computer-executable instructions.

The memory 222 may include computer-readable storage media for carrying or having computer-executable instructions or data structures stored thereon. Such computer-readable storage media may include any available media that may be accessed by a general-purpose or special-purpose computer, such as the controller 220. By way of example, such computer-readable storage media may include tangible or non-transitory computer-readable storage media including Random Access Memory (RAM), Read-Only Memory (ROM), Electrically Erasable Programmable Read-Only Memory (EEPROM), flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the controller 220 to perform or control performance of a certain operation or group of operations.

The communication module 224 may include one or more circuits or devices configured to facilitate communication between the sensor module 200 and one or more external or remote devices. In some embodiments, such circuits or devices may include a transmitter, a receiver, a transceiver, and/or an antenna. For example, the communication module 224 may include one or more wireless chips to communicate wirelessly using any proprietary or standards-based wireless protocol, examples of which include the IEEE 802.11 standards (e.g., WiFi), Bluetooth, Zigbee, and the like.

In some embodiments, the sensor module 200 further includes a microphone. The microphone can be included in a semiconductor chip that may also include the controller 220, for example. In some embodiments, the microphone can determine pressure. In some embodiments, tire strain measurements determined from the sensor region 210 can be compared with the pressure determination from the microphone to dynamically refine the processor pressure determinations. In some embodiments, outputs from at least one, and or all or any of each wheel of a vehicle can be compared with each to detect possible suspension issues. In some embodiments, input from the microphone can be fused with inputs from the detector patch 202 to improve the accuracy of a road classification algorithm.

In some embodiments, the computed end results of the sensor module 200 can be transmitted to an end user recipient. In some embodiments, the end user recipient can be a smartphone. In some embodiments, the end user recipient can be a cloud server. In some embodiments, the end user recipient can be the vehicle itself. In some embodiments, the output can be sent to a processing unit of the vehicle which can modify the vehicle motion, e.g., slow the vehicle down when levels of global tire strain attain certain thresholds. In some embodiments, the output can be sent to a data logger within the vehicle. In some embodiments, the data logger can be part of an on-board computer which compares outputs by the tires and extracts parameters pertinent to the ensemble of tires, e.g. comparing tire wear patterns and recommending specific tire rotation patterns. In some embodiments, the on-board computer may direct specific controller units 220 of corresponding sensor modules 200 to reduce sampling and/or reduce data transmission rates from sensor modules 200 where the power sources 206 have battery or charge levels below a threshold. To compensate, the on-board computer may use data from tires adjacent to extrapolate ensemble information. In some embodiments, the output can be sent to an indicator light to indicate the achievement of a given threshold parameter.

Figure 3:
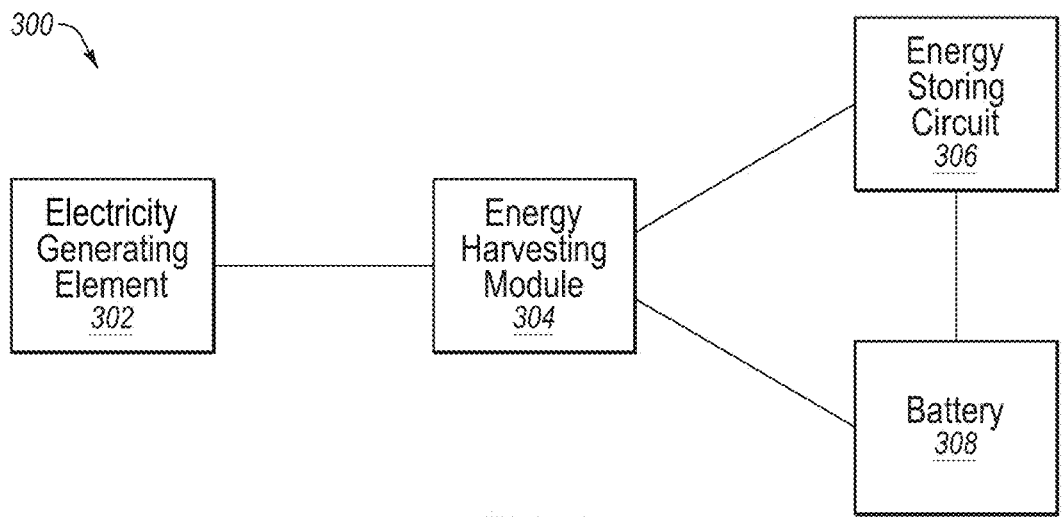
FIG. 3 is a schematic of an example energy generating circuit that may be included in the sensor module of FIGS. 2A-2B.

FIG. 3 is a schematic of an example energy generating circuit 300, arranged in accordance with at least one embodiment described herein. The energy generating circuit 300 may include, be included in, or correspond to the electric power source 206 of FIGS. 2A-2B. For example, the electric power source 206 of FIGS. 2A-2B may include some or all of the energy generating circuit 300 of FIG. 3.

The energy generating circuit 300 may include an electricity generating element 302, an EHS module 304, an energy storing circuit 306, and/or a battery 308. The EHS module 304 may be electrically coupled to the electricity generating element 302, the energy storing circuit 306, and/or the battery 308.

The electricity generating element 302 may include a dielectric generating material, a piezoelectric generating material, or other material, system, or device that generates electricity when subject to motion, mechanical stress, or other input, or a combination thereof. In some embodiments, flexing of the electricity generating element 302, e.g., implemented as a piezo flexing film, and or portions of a detector patch that has such materials can generate a charge on the surface of the electricity generating element 302. Suitable material(s) for the electricity generating element 302 may include, e.g., a silicone polymer and a charge generating material, e.g., lead zirconate titanate. In some embodiments, the silicone polymer can include 50 to 90 wt % of the charge generating material. In some embodiments, the electricity generating element 302 may be disposed in close proximity to a tread portion, a shoulder portion, and/or a sidewall portion of a tire.

In some embodiments, the EHS module 304 collects capacitive discharge and/or current generated by the electricity generating element 302. The EHS module 304 may include bridge rectifiers, voltage regulators, and/or an energy buffer capacitor to collect the output of the electricity generating element 302 and generate an electrical output compatible with electronics of a corresponding sensor module and/or vehicle. After accumulating the output above a threshold level, the EHS module 304 may discharge and send the accumulated output to the energy storing circuit 306. In some embodiments, not all of the energy accumulated by the energy buffer capacitor is sent to the energy storing circuit 306; some of that energy can instead be redirected back for use in the electronics unit 204.

In some embodiments, the energy storing circuit 306 includes a battery charging integrated circuit (IC) and/or direct electrical connection to a storage source, e.g., a rechargeable battery 308. An electronics unit, such as the electronics unit 204 of FIGS. 2A-2B, may draw operating power from the battery 308.

Figure 4A:
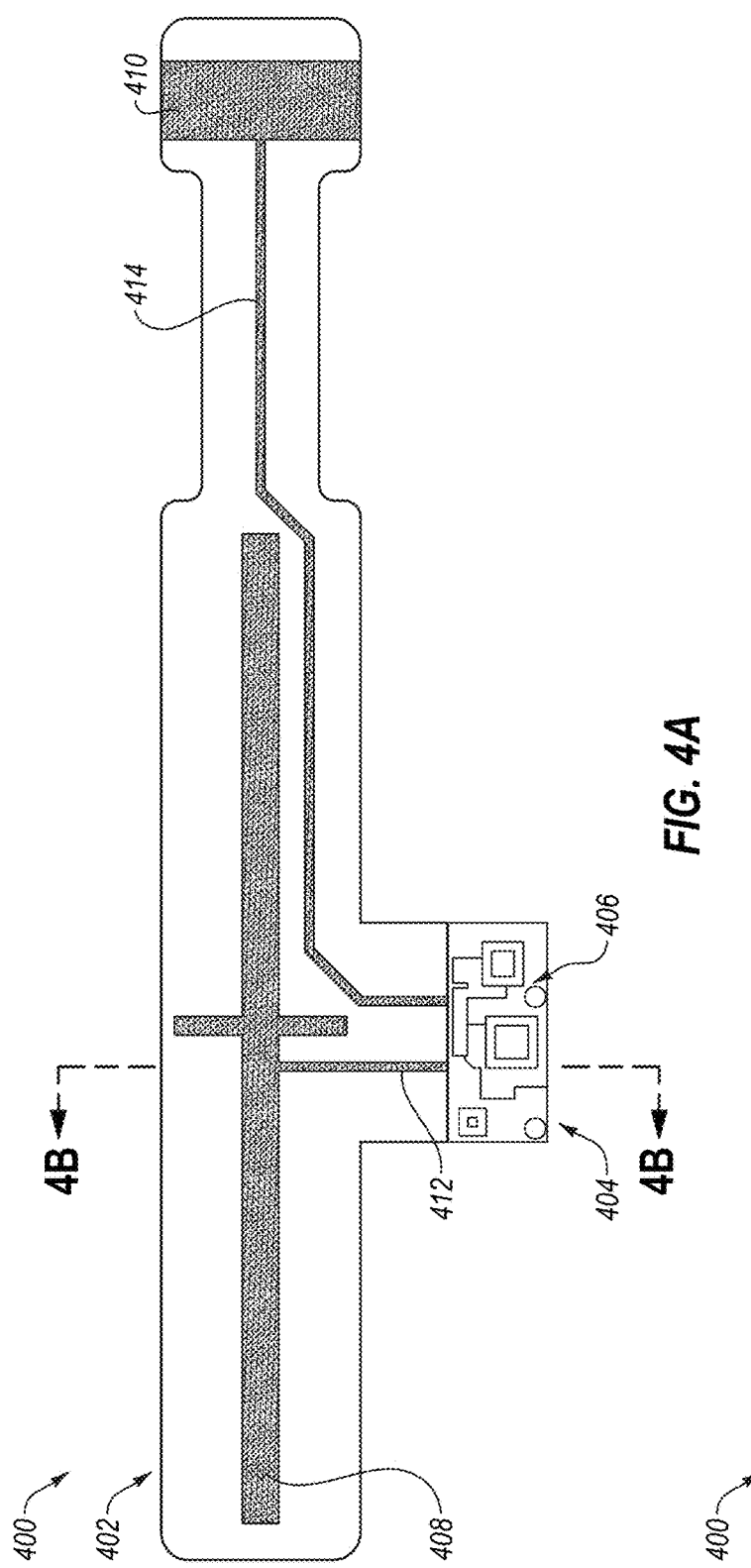
FIGS. 4A-4B illustrate another example sensor module.
Figure 4B:
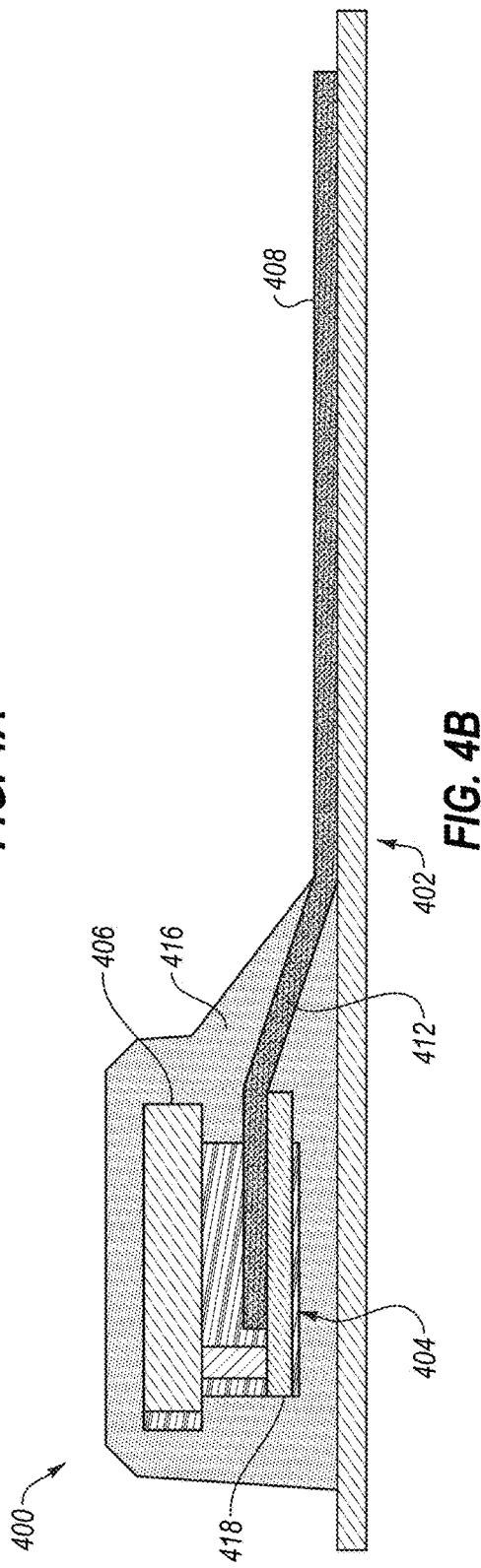

FIGS. 4A-4B illustrate another example sensor module 400, arranged in accordance with at least one embodiment described herein. In particular, FIG. 4A is an overhead view of the sensor module 400 and FIG. 4B is a cross-sectional view of the sensor module 400 in a cutting plane 4B-4B in FIG. 4A. The sensor module 400 may include, be included in, or correspond to other sensor modules herein. For example, the sensor module 102 of FIG. 1 and/or the sensor module 200 of FIGS. 2A-2B may have a same, similar, or different configuration as the sensor module 400 of FIGS. 4A-4B.

As illustrated in FIGS. 4A-4B, the sensor module 400 may generally include a detector patch 402 and an electronics unit 404 and optionally an electric power source 406, the electronics unit 404 connected to the detector patch 402 and the electric power source 406. The detector patch 402, the electronics unit 404, and the electric power source 406 may respectively include, be included in, or correspond to other detector patches, electronics units, and electric power sources herein.

As illustrated in FIG. 4A, the detector patch 402 may include two sensor regions 408, 410, each of which is electrically coupled to the electronics unit 404 by a corresponding electrical trace 412, 414. Each of the sensor regions 408, 410 may include a capacitor with an electrostatic capacity that is variable due to deformation of the capacitor.

As illustrated in FIG. 4B, the electronics unit 204 and the electric power source 206 may be mechanically coupled together by epoxy resin and/or may be disposed within a housing or encapsulant 416 that is mechanically coupled to the detector patch 402. The housing or encapsulant 416 may be an electrical, thermal, and/or mechanical insulator. For example, the housing or encapsulant 416 may include a vibration damping material such as platinum silicone flexible foam, a specific example of which includes SOMA FOAMA 25.

As further illustrated in FIG. 4B, the electronics unit 404 may include a PCB 418 with one or more circuits formed thereon or coupled thereto. Alternatively or additionally, the PCB 418 may include thereon or coupled thereto one or more voltage and/or current measurement circuits, a transmitter, a receiver, a transceiver, or other components. Analogous to other electronics units described herein, the electronics unit 404 may be configured to measure one or more parameters of the sensor regions 408, 410 or capacitors therein, estimate one or more tire parameters based on the measurements, transmit the estimated tire parameter(s) to another system or device, and/or transmit the measurements to another system or device to perform the estimation of one or more tire parameters.

Figure 5A:
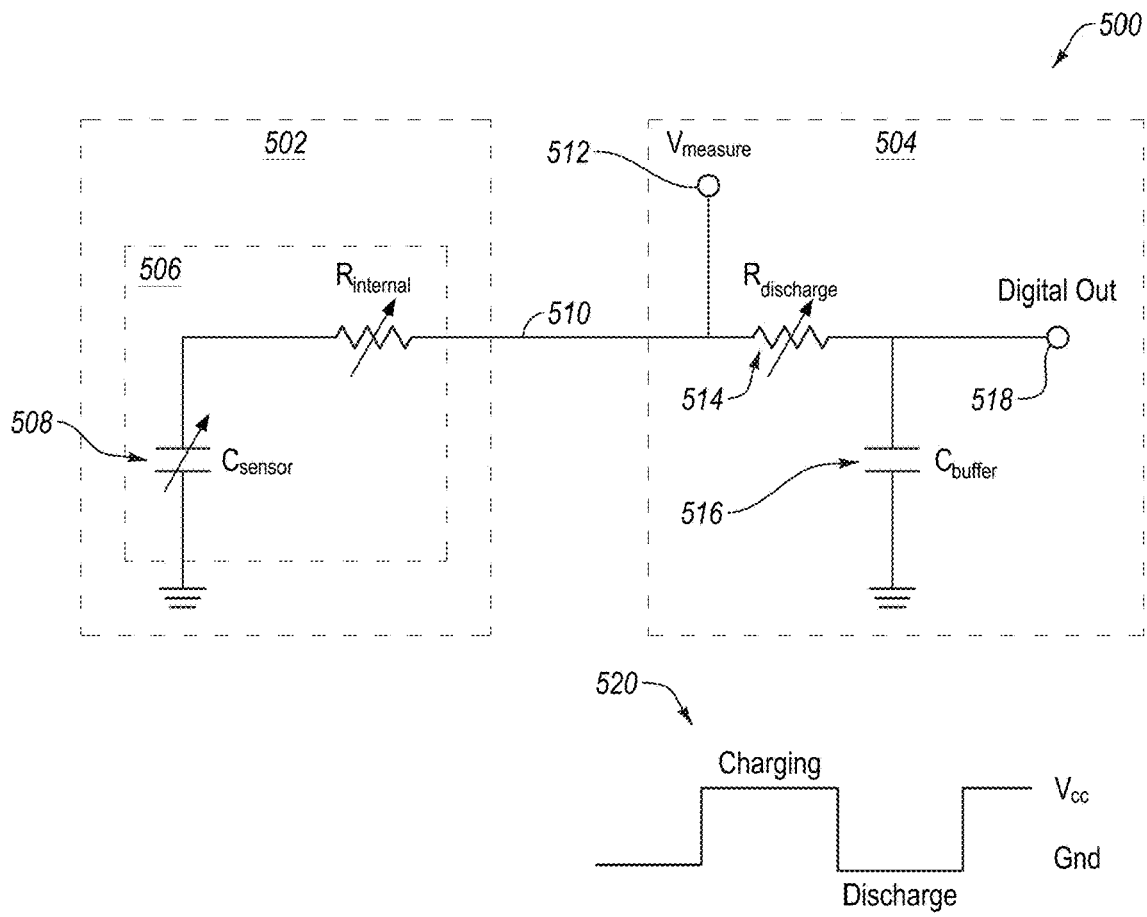
FIG. 5A is a circuit diagram of a portion of another example sensor module.

FIG. 5A is a circuit diagram of a portion of another example sensor module 500, arranged in accordance with at least one embodiment described herein. The sensor module 500 may include, be included in, or correspond to other sensor modules herein. For example, any of the sensor modules herein may have a same, similar, or different configuration as the sensor module 500 of FIG. 5A.

The portion of the sensor module 500 depicted in FIG. 5A includes a detector patch 502 and a portion of an electronics unit 504. The detector patch 502 includes a sensor region 506 with a capacitor 508. The capacitor 508 has a variable capacitance, or variable electrostatic capacity, $C_{sensor}$ that is variable due to at least deformation of the capacitor 508.

In some embodiments, the electrostatic capacity $C_{sensor}$ of the capacitor 508 varies between 50-500 picofarads (pF). The capacitor 508 is electrically coupled to the electronics unit 504 through an electrical trace 510. The sensor region 506 alone or in combination with the electrical trace 510 may have a variable internal resistance $R_{internal}$.

The electronics unit 504 illustrated in FIG. 5A includes various circuit elements that may be formed on or coupled to, e.g., a PCB, such as the PCB 418 of FIG. 4B. In more detail, the electronics unit 504 may include a measurement node 512, a discharge resistor 514 with resistance $R_{discharge}$, a buffer capacitor 516 with electrostatic capacity $C_{buffer}$, and a node 518. The node 518 may be coupled to a digital output pin of a controller, such as the controller 220 of FIG. 2A, which may be included as part of the electronics unit 504 of FIG. 5A.

In general, measurements of the capacitance of the capacitor 508 may be made by charging and discharging the capacitor 508. The capacitor 508 may be charged by direct current (DC) or alternating current (AC).

Measurements made with AC excitation sources may compute complex impedance. Complex impedance may be computed using a combination of operational and instrumentation amplifiers, programmable gate arrays (PGAs), analog-to-digital converters (ADCs), and a Discrete Fourier Transform (DFT). The combination of the hardware power requirements and the computational power requirements of the DFT for complex impedance-based measurements from AC excitation sources may consume a significant amount of power. An example single chip solution for measuring complex impedance from an AC excitation source exhibits typical current consumption of 10 milliamps (mA).

In some embodiments herein, digital charge integration is used to directly measure charge stored on capacitive sensors such as the capacitor 508. An explanation of the technique follows.

Capacitance (c), or electrostatic capacity, is defined as the amount of stored charge (Q) divided by the charging voltage (V) according to Equation 1:

$$c=Q/V \qquad \text{Equation 1}$$

If the charging voltage is known and the total charge is computed, the capacitance can be measured. FIG. 5A illustrates one circuit for measuring the total charge on the capacitor 508 according to this technique.

In the circuit of FIG. 5A, the capacitor 508 has the variable capacitance $C_{sensor}$ and the variable internal resistance $R_{internal}$ which are both strain dependent. The circuit of FIG. 5A may be driven with a DC square wave 520, e.g., via the node 518, from a controller such as the controller 220 of FIG. 2A. In FIG. 5A, the DC square wave 520 has a maximum charging voltage (Vcc and a discharge to ground (Gnd). The charging current charges the capacitor 508 via a charging current ($i_{charge}$), which can be measured indirectly via a voltage drop over the discharge resistor 514 according to Equation 2:

$$i_{charge} = (VCC - V_{measure})/R_{discharge} \quad \text{Equation 2}$$

In Equation 2, $V_{measure}$ is the voltage at the measurement node 512, which voltage may be measured by a voltage measurement circuit of the electronics unit 504 that may be coupled to the measurement node 512. In some embodiments, $V_{measure}$ is provided to an analog input pin of the controller of the electronics unit 504.

The total charge on the capacitor 508 may be found by integrating the measured current across the discharge resistor 514 numerically using the trapezoidal rule, e.g., according to Equation 3:

$$Q = \frac{dt}{2} \sum_{n=1}^{nmax} \left( i_{charge}^{n+1} + i_{charge}^{n} \right) \quad \text{Equation 3}$$

The capacitance or electrostatic capacity of the capacitor 508 may then be computed (e.g., by the controller of the electronics unit 504) using the total charge and the charging voltage, e.g., using Equation 1.

The use of digital charge integration to determine the capacitance or electrostatic capacity of the capacitor 508, as opposed to traditional complex impedance measurement, eliminates the computationally complex operation of the DFT and the complex analog instrumentation. This leads to a significant reduction in the power consumed when using digital charge integration to determine the capacitance or electrostatic capacity compared to the traditional complex impedance measurement.

Figure 5B:
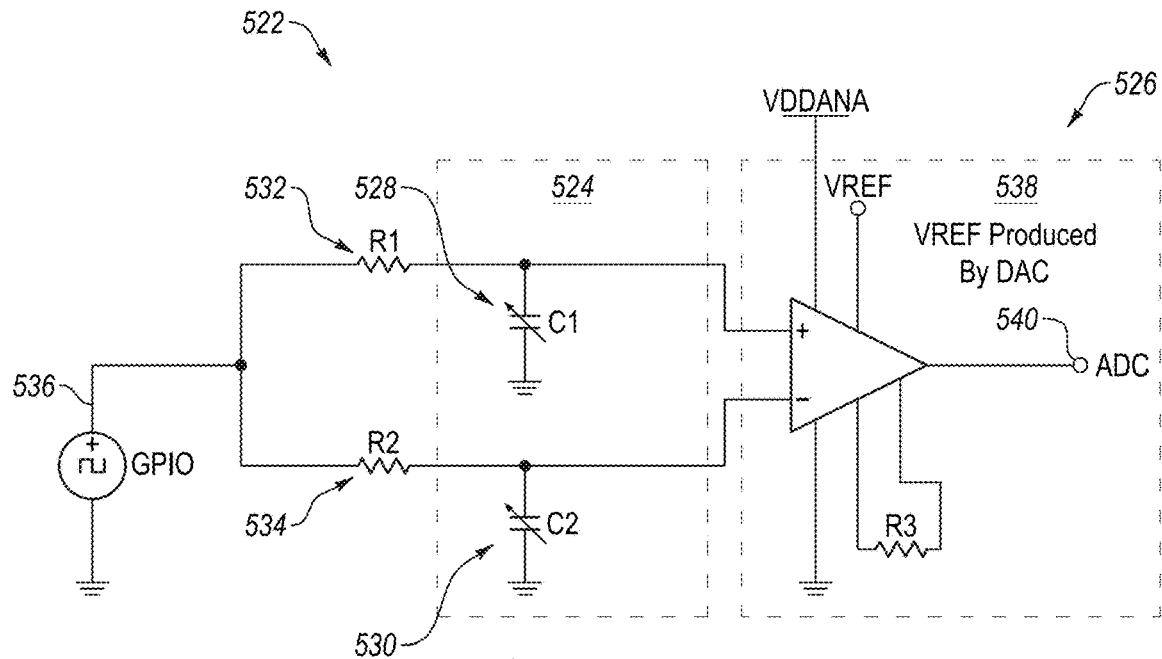
FIG. 5B is a circuit diagram of a portion of another example sensor module.

FIG. 5B is a circuit diagram of a portion of another example sensor module 522, arranged in accordance with at least one embodiment described herein. The sensor module 522 may include, be included in, or correspond to other sensor modules herein. For example, any of the sensor modules herein may have a same, similar, or different configuration as the sensor module 522 of FIG. 5B. Further, similar to the sensor module 500 of FIG. 5A, the sensor module 522 of FIG. 5B may be charged and discharged by DC or AC and in some embodiments may be suitable for determining capacitance or electrostatic capacity using digital charge integration.

The portion of the sensor module 522 depicted in FIG. 5B includes a detector patch 524 and a portion of an electronics unit 526. The detector patch 502 may be implemented as a bend sensor with two sensor regions, each with a capacitor 528, 530, stacked one on top of the other. Each of the capacitors 528, 530 has a variable electrostatic capacity C1 or C2 that is variable due to at least deformation of the capacitor 528, 530. In some embodiments, the electrostatic capacity $C_{sensor}$ of each of the capacitors 528, 530 varies between about 100-700 pF. Each of the capacitors 528, 530 is electrically coupled through a corresponding front end resistor 532, 534 to an input/output pin 536 of the electronics unit 526. Each of the front end resistors 532, 534 may have a resistance of 330 kilo ohms (kΩ) or other suitable resistance.

The electronics unit 526 illustrated in FIG. 5B includes various circuit elements that may be formed on or coupled to, e.g., a PCB, such as the PCB 418 of FIG. 4B. As illustrated, the electronics unit 526 may include a controller 538, such as a SAML21 or ATSAML21 microcontroller, supplied by Microchip Technology, or other suitable controller.

The controller 536 may include three operational amplifiers (opamps). The opamps may be configured via software to form an instrumentation amplifier, with programmable gain, without the use of external components or routing. An analog front end of the sensor module 522 of FIG. 5B may include the two resistors 532, 534 having respective resistance of R1, R2, the detector patch 524 implemented as the bend sensor (e.g., 400), the opamps (such as SAML21 opamps), and a digital-to-analog converter (DAC) (such as a SAML21 DAC).

The front-end resistors 532, 534 may convert a current supplied through the input/output pin 536 to charge the capacitors 528, 530 in the bend sensor into voltage, and the instrumentation amplifier of the controller 538 may convert a differential signal from the bend sensor into a single ended voltage. The output of the instrumentation amplifier is internally routed to an ADC of the controller 538, e.g., via node 540. The ADC performs digital integration by accumulating samples from the output of the instrumentation amplifier.

Figure 6A:
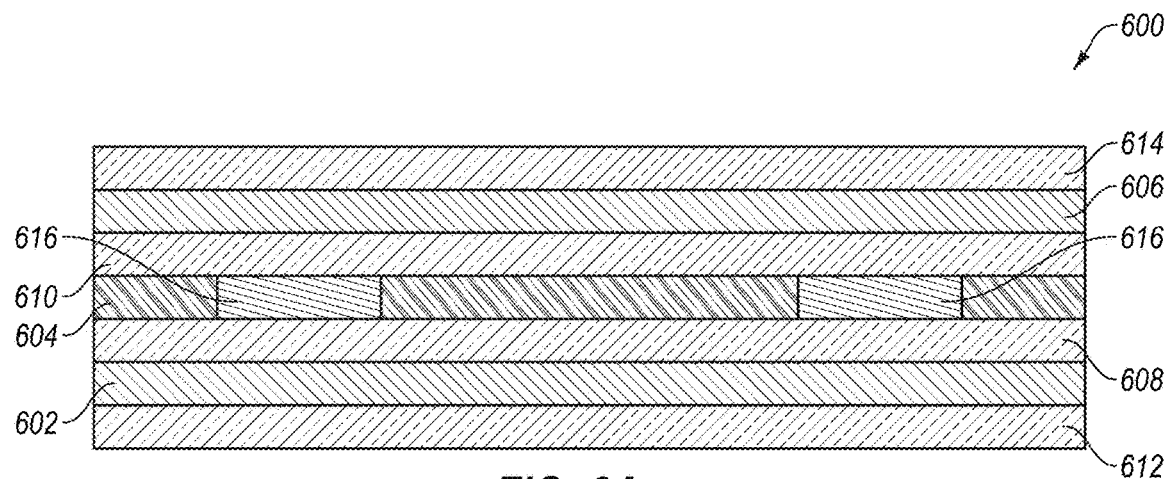
FIG. 6A is a schematic of an example detector patch that may be included in a sensor module.

FIG. 6A is a schematic of an example detector patch 600, arranged in accordance with at least one embodiment described herein. The detector patch 600 may include, be included in, or correspond to other detector patches herein. For example, any of the detector patches herein may have a same, similar, or different configuration as the detector patch 600 of FIG. 6A.

In general, the detector patch 600 may include one or more electrode layers and interposed dielectric layers, each of which may have a Young's modulus of 0.1 gigapascals (GPa) or less. In other embodiments, the Young's modulus of one or more of the layers may be greater than 0.1 GPa. As illustrated, the detector patch 600 includes a first electrode layer 602, a signal electrode layer 604, a second electrode layer 606, and interposed dielectric layers 608, 610 arranged therebetween. In some embodiments, the detector patch 600 may additionally include one or more dielectric cover layers, such as first and second dielectric cover layers 612, 614.

Each of the first and second electrode layers 602, 606 may include an elastomeric substrate or layer such as silicone or the like with conductive particles (e.g., nanoparticles, such as carbon black, nickel nanostrands, silver nanoparticles, graphene nanoplatelets, graphene-oxides, or the like) integrated within. The conductive particles in the first and second electrode layers 602, 606 may be distributed continuously throughout the respective elastomeric substrate or layer and/or may be arranged thereon or therein in a hatched or mesh pattern or structure.

Each of the dielectric layers 608, 610 may include an elastomeric material such as silicone or the like. In some embodiments, one or both of the dielectric layers 608, 610 may have some conductive material integrated within depending upon, among other things, an intended or desired amount of permittivity or the like.

The signal electrode layer 604 may include an elastomeric material such as silicon or the like. In some embodiments, the signal electrode layer 604 includes one or more sensor regions 616 of electrically conductive material disposed in or on the signal electrode layer 604. For example, the sensor regions 616 may include conductive particles (e.g., nanoparticles, such as carbon black, nickel nanostrands, silver nanoparticles, graphene nanoplatelets, graphene-oxides, or the like) within the signal electrode layer 604. Although not illustrated in FIG. 6A, the signal electrode layer 604 may additionally include one or more electrical traces, each configured to electrically coupled a corresponding of the sensor regions 616 to an electronics unit of a sensor module in which the detector patch 600 is implemented.

Each of the first and second dielectric cover layers 612, 614 may include an elastomeric material such as silicone or the like. The first dielectric cover layer 612 may cover the first electrode layer 602 to prevent the first electrode layer 602 from unwanted contact with other objects, surfaces, or the like and/or to electrically insulate the first electrode layer 602. The second dielectric cover layer 614 may cover the second electrode layer 606 to prevent the second electrode layer 606 from unwanted contact with other objects, surfaces, or the like and/or to electrically insulate the second electrode layer 606.

In some embodiments, one or both of the first and second electrode layers 602, 606 may be coupled to ground of a corresponding sensor module and may thus be referred to as ground electrodes or ground electrode layers. Where both of the first and second electrode layers 602, 606 are ground electrode layers, each of the sensor regions 616 may form or be part of a different capacitor with the first and second electrode layers 602, 606. In this and other embodiments, each capacitor may include two nodes or terminals. One node or terminal may include the corresponding sensor region 616 while the other node or terminal may include the first and second electrode layer 602, 606. Where both of the first and second electrode layers 602, 606 are coupled to ground, the node or terminal that includes the first and second electrode layers 602, 606 may form a Faraday cage at least partially around the node that includes a given sensor region 616.

Figure 6B:
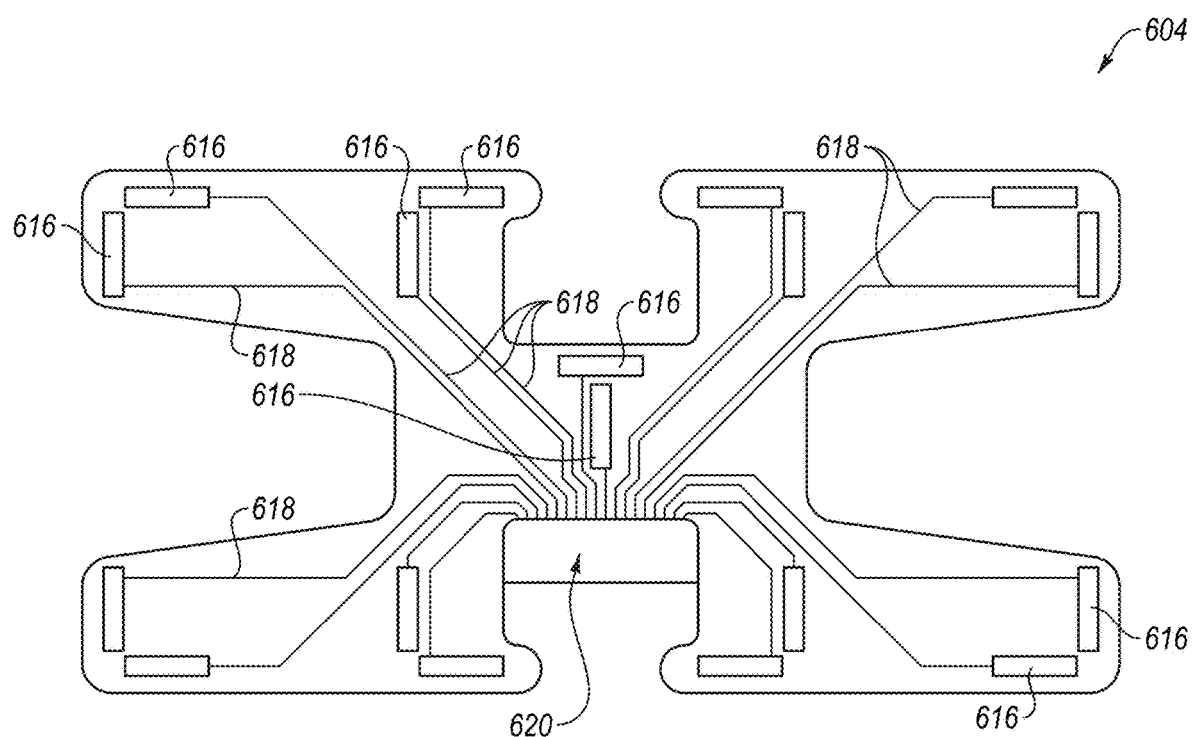
FIG. 6B is an overhead view of a signal electrode layer included in the detector patch of FIG. 6A.

FIG. 6B is an overhead view of the signal electrode layer 604 of FIG. 6A, arranged in accordance with at least one embodiment described herein. The signal electrode layer 604 may include, be included in, or correspond to other signal electrode layers herein. As illustrated, the signal electrode layer 604 includes various sensor regions 616, only some of which are labeled in FIG. 6B for simplicity.

The signal electrode layer 604 additionally includes electrical traces 618 that electrically couple the sensor regions 616 to a terminal region 620 of the signal electrode layer 604. Only some of the electrical traces 618 are labeled in FIG. 6B for simplicity. Each of the electrical traces 618 may include electrically conductive material disposed in or on the signal electrode layer 604. For example, the electrical traces 618 may include conductive particles (e.g., nanoparticles, such as carbon black, nickel nanostrands, silver nanoparticles, graphene nanoplatelets, graphene-oxides, or the like) within the signal electrode layer 604. Each of the electrical traces 618 may terminate within the terminal region 620 for electrical coupling to a corresponding electronics unit.

In some embodiments, the sensor regions 616 may be located in the signal electrode layer 604 in pairs where the sensor regions 616 of each pair are arranged or aligned orthogonal or substantial orthogonally (e.g., within +/−5, 10, 15, 20, 25, or 30 degrees of orthogonal) to each other. That is, a length or major axis of one of the sensor regions 616 of the pair may be aligned orthogonal or substantially orthogonal to a length or major axis of the other sensor region 616 of the pair. The orthogonal alignment may result in the paired sensor regions 616 generally forming an L-shape, a T-shape, or other suitable shape. In some embodiments, the orthogonal orientation of the sensor regions 616 within each pair of sensor regions 616 may facilitate the simultaneous measuring of orthogonal strains and angular displacements.

With combined reference to FIGS. 6A-6B, each of the first electrode layer 602, the second electrode layer 606, the dielectric layers 608, 610, and the dielectric cover layers 612, 614 may have a same or similar footprint as the signal electrode layer 604 of FIG. 6B. In other embodiments, the various layers of detector patches may have other footprints or outlines as described with respect to FIGS. 7A-7D.

FIGS. 7A-7D include overhead views of other example signal electrode layers 700A, 700B, 700C, 700D that may be included in detector patches, arranged in accordance with at least one embodiment described herein. Each of the signal electrode layers 700A, 700B, 700C, 700D and/or detector patches may include, be included in, or correspond to other signal electrode layers and/or detector patches herein.

As illustrated in FIGS. 7A-7D, each of the signal electrode layers 700A, 700B, 700C, 700D includes one or more sensor regions 702 and electrical traces 704 in or on an elastomeric material layer 706 such as silicone or the like. Only some of the sensor regions 702 and electrical traces 704 are labeled in FIGS. 7A-7D for simplicity. Each of the sensor regions 702 and electrical traces 704 may include electrically conductive material disposed in or on the signal electrode layer 700A, 700B, 700C, 700D. For example, each of the sensor regions 702 and the electrical traces 704 may include conductive particles (e.g., nanoparticles, such as carbon black, nickel nanostrands, silver nanoparticles, graphene nanoplatelets, graphene-oxides, or the like) within the signal electrode layer 700A, 700B, 700C, 700D.

The electrical traces 704 may electrically couple the sensor regions 702 to a terminal region 708 of the signal electrode layer 700A, 700B, 700C, 700D. Each of the electrical traces 704 may terminate within the terminal region 708 for electrical coupling to a corresponding electronics unit.

A shape, number, and/or arrangement of sensor regions 702, electrical traces 704, and/or terminal regions 708 in the signal electrode layers 700A, 700B, 700C, 700D or other signal electrode layers herein may have any suitable or desired configuration. Referring to FIGS. 7A and 7B, for example, the signal electrode layers 700A and 700B each includes two sensor regions 702 of unequal length that are aligned with each other longitudinally. The terminal region 708 of the signal electrode layer 700A is located at an end of the signal electrode layer 700A, while the terminal region 708 of the signal electrode layer 700B is located to one side of the signal electrode layer 700B.

Referring to FIGS. 7C and 7D, the signal electrode layers 700C, 700D each includes five sensor regions 702, including one sensor region 702 at each end aligned with a length of the signal electrode layer 700C, 700D and three sensor regions 702 in between the two ends aligned orthogonal to the length of the signal electrode layer 700C, 700D.

The signal electrode layer 700C, 700D may additionally include one or more electricity generating materials 710, illustrated at each of the two ends in the example of FIGS. 7C and 7D. One or more electrical traces may electrically couple the electricity generating materials 710 to each other and/or to the terminal region 708 of the signal electrode layer 700C, 700D to be electrically coupled to a corresponding electronics unit.

The terminal region 708 of the signal electrode layer 700C is located at one of the ends of the signal electrode layer 700C, while the terminal region 708 of the signal electrode layer 700D is located to one side of the signal electrode layer 700D.

Figure 8A:
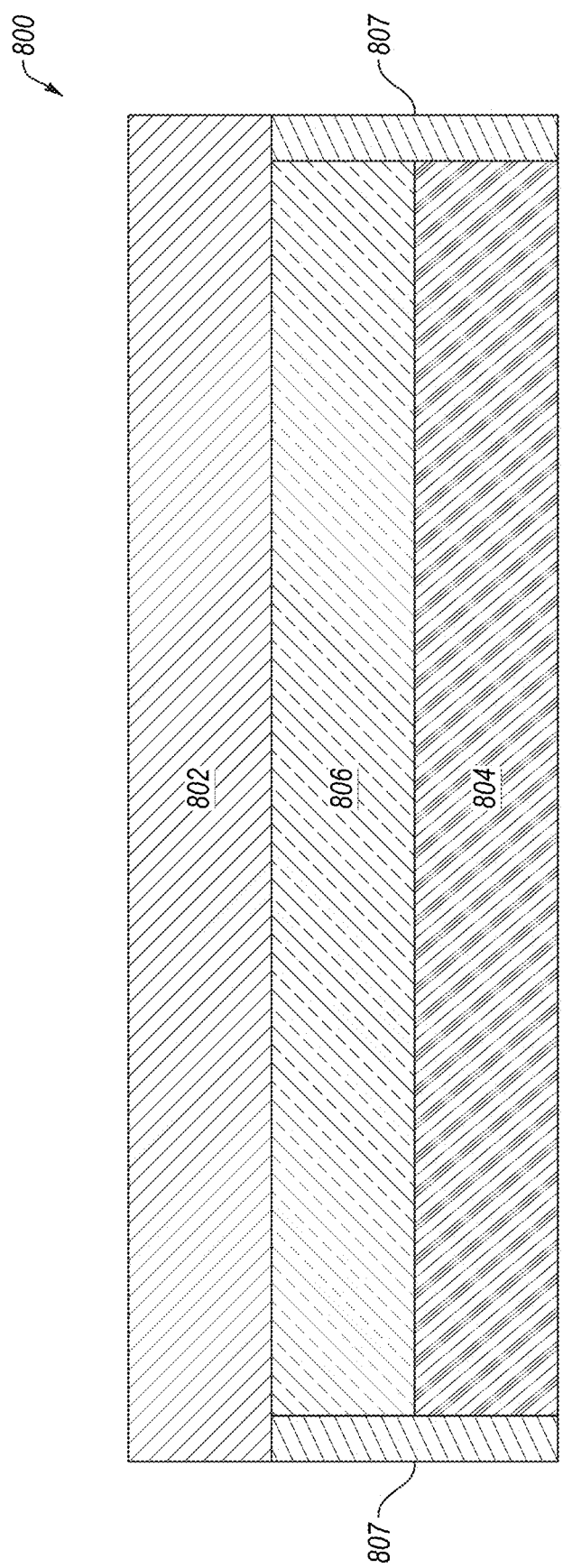
FIG. 8A is a schematic illustration of another example detector patch that may be included in a sensor module.

FIG. 8A is a schematic illustration of another example detector patch 800, arranged in accordance with at least one embodiment described herein. The detector patch 800 may include, be included in, or correspond to other detector patches herein. For example, any of the detector patches herein may have a same, similar, or different configuration as the detector patch 800 of FIG. 8A.

Figure 8B:
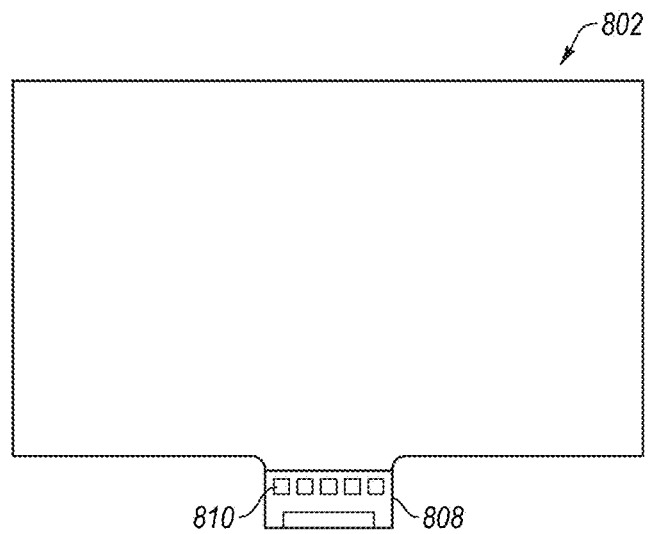
FIGS. 8B-8D are overhead views of, respectively, a first electrode layer, a signal electrode layer, and a dielectric layer of the detector patch of FIG. 8A.
Figure 8C:
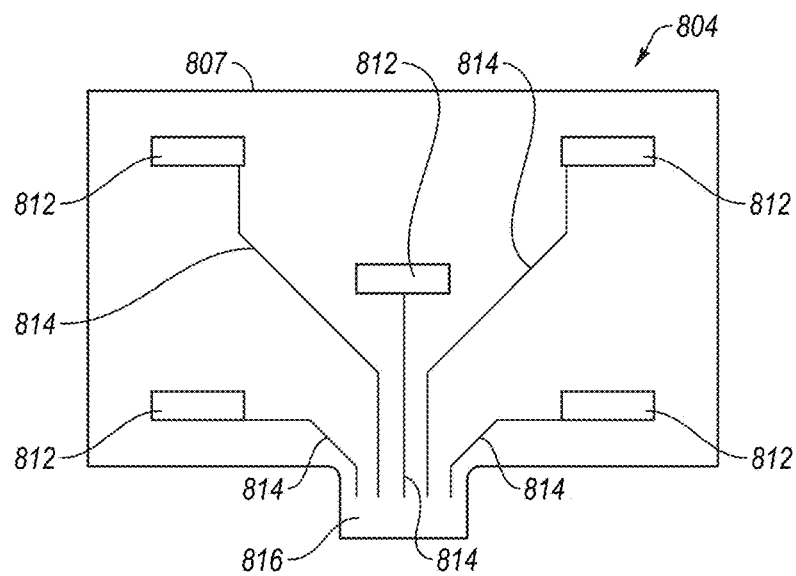
Figure 8D:
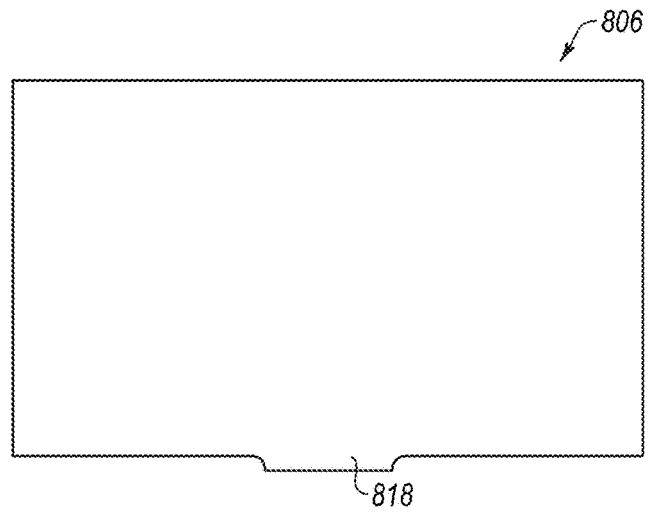

In general, the detector patch 800 may include one or more electrode layers and interposed dielectric layers, each of which may have a Young's modulus of 0.1 GPa or less. In other embodiments, the Young's modulus of one or more of the layers may be greater than 0.1 GPa. As illustrated, the detector patch 800 includes a first electrode layer 802, a signal electrode layer 804, and an interposed dielectric layer 806 arranged therebetween. Optionally, the detector patch 800 may further include a perimeter electrode 807. FIGS. 8B-8D are overhead views of, respectively, the first electrode layer 802, the signal electrode layer 804, and the dielectric layer 806 of the detector patch 800 of FIG. 8A, arranged in accordance with at least one embodiment described herein.

With combined reference to FIGS. 8A and 8B, the first electrode layer 802 may include an elastomeric substrate or layer such as silicone or the like with conductive particles (e.g., nanoparticles, such as carbon black, nickel nanostrands, silver nanoparticles, graphene nanoplatelets, graphene-oxides, or the like) integrated within. The conductive particles in the first electrode layer 802 may be distributed continuously throughout the elastomeric substrate or layer and/or may be arranged thereon or therein in a hatched or mesh pattern or structure. The first electrode layer 802 may also include a PCB interface 808 and one or more conductive trace pads 810 for attaching electrical traces, a PCB, or other electronics of or in a corresponding electronics unit of a sensor module in which the detector patch 800 is implemented, for operation and control of the detector patch 800.

With combined reference to FIGS. 8A and 8C, the signal electrode layer 804 may include an elastomeric material such as silicon or the like with electrically conductive material confined to the perimeter electrode 807, one or more sensor regions 812, and one or more electrical traces 814. The perimeter electrode 807, the sensor regions 812, and/or the electrical traces 814 may include conductive particles (e.g., nanoparticles, such as carbon black, nickel nanostrands, silver nanoparticles, graphene nanoplatelets, graphene-oxides, or the like) on or in the signal electrode layer 804. For example, the sensor regions 812 may be printed on the elastomeric material of the signal electrode layer 804. The electrical traces 814 may terminate at a tab region 816 that aligns with the trace pads 810 of the first electrode layer 802 to provide electrical connection points for the electrical traces 814. As shown, embodiments of the signal electrode layer 804 may include the perimeter electrode 807 that electrically connects to the first electrode layer 802 to, among other things, provide electrical isolation for the entire detector patch 800. In this and other embodiments, the first electrode layer 802 and the perimeter electrode 807 may form a Faraday cage that at least partially surrounds the signal electrode layer 804.

With combined reference to FIGS. 8A and 8D, the dielectric layer 806 may include an elastomeric material such as silicone or the like. In some embodiments, the dielectric layer 806 may have some conductive material integrated within depending upon, among other things, an intended or desired amount of permittivity or the like. In some embodiments, the dielectric layer 806 may also include a tab region 818 to cover at least a portion of the PCB interface 808 of the first electrode layer 802. For example, the tab region 818 may cover the PCB interface 808 up to the trace pads 810 of the PCB interface 808.

In some embodiments, the first electrode layer 802 may be coupled to ground of a corresponding sensor module and may thus be referred to as a ground electrode or ground electrode layer. Each of the sensor regions 812 may form or be part of a different capacitor with the first electrode layer 802. In this and other embodiments, each capacitor may include two nodes or terminals. One node or terminal may include the corresponding sensor region 812 while the other node or terminal may include the first electrode layer 802 and the perimeter electrode 807. The node or terminal that includes the first electrode layer 802 and the perimeter electrode 807 may form a Faraday cage at least partially around the node that includes a given sensor region 812.

Figure 9A:
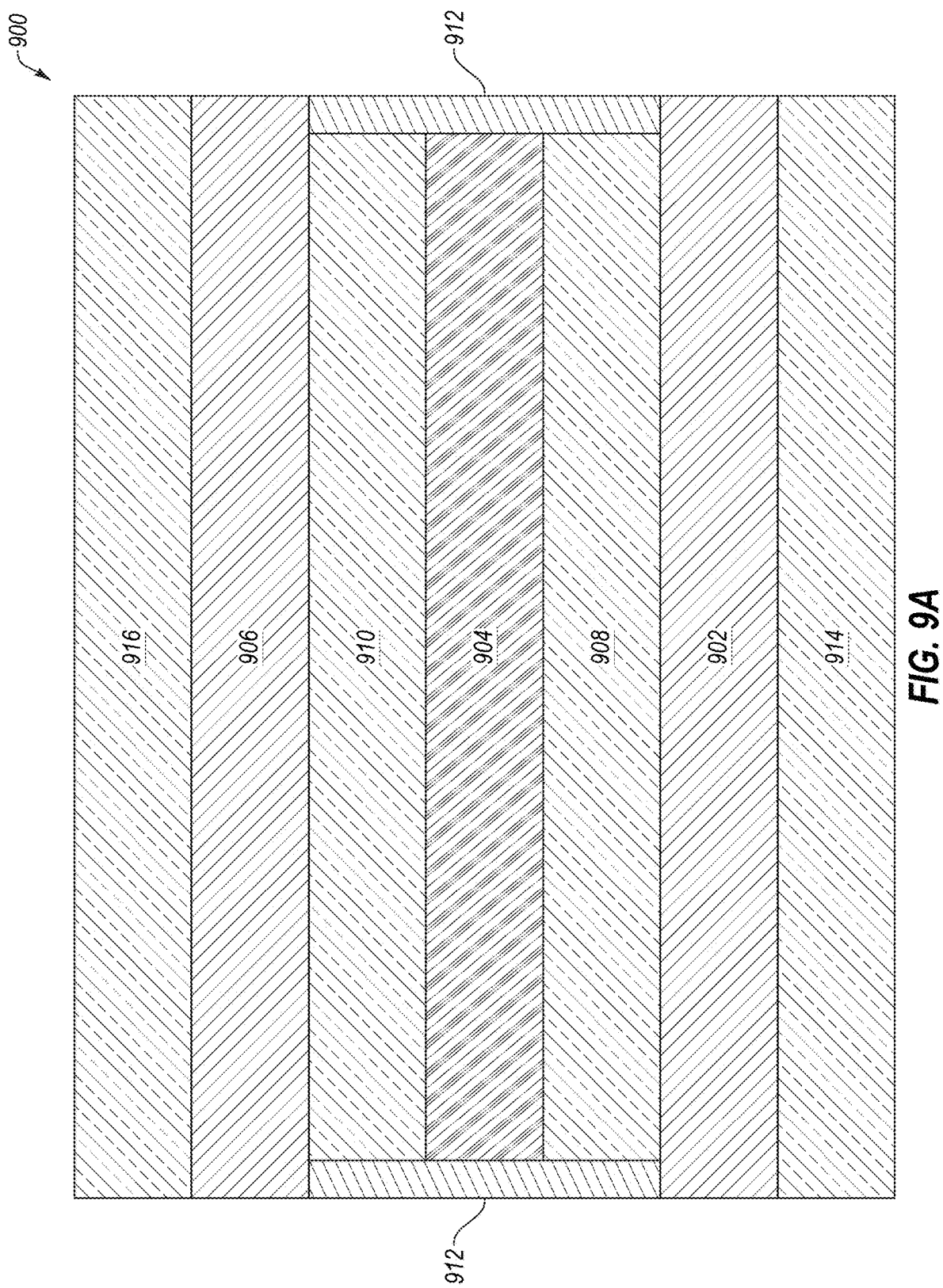
FIG. 9A is a schematic illustration of another example detector patch that may be included in a sensor module.

FIG. 9A is a schematic illustration of another example detector patch 900, arranged in accordance with at least one embodiment described herein. The detector patch 900 may include, be included in, or correspond to other detector patches herein. For example, any of the detector patches herein may have a same, similar, or different configuration as the detector patch 900 of FIG. 9A.

In general, the detector patch 900 may include one or more electrode layers and interposed dielectric layers, each of which may have a Young's modulus of 0.1 GPa or less. In other embodiments, the Young's modulus of one or more of the layers may be greater than 0.1 GPa. As illustrated, the detector patch 900 includes a first electrode layer 902, a signal electrode layer 904, a second electrode layer 906, and interposed dielectric layers 908, 910 arranged therebetween. Optionally, the detector patch 900 may further include a perimeter electrode 912 and/or one or more dielectric cover layers, such as first and second dielectric cover layers 914, 916. While the perimeter electrode 912 is shown in contact with the signal electrode layer 904 in FIG. 9A, sensor regions and/or electrical traces of the signal electrode layer 904 may be electrically insulated from the perimeter electrode 912. FIGS. 9B-9H are overhead views of, respectively, the second dielectric cover layer 916, the second electrode layer 906, the dielectric layer 910, the signal electrode layer 904, the dielectric layer 908, the first electrode layer 902, and the first dielectric cover layer 914, arranged in accordance with at least one embodiment described herein.

Figure 9F:
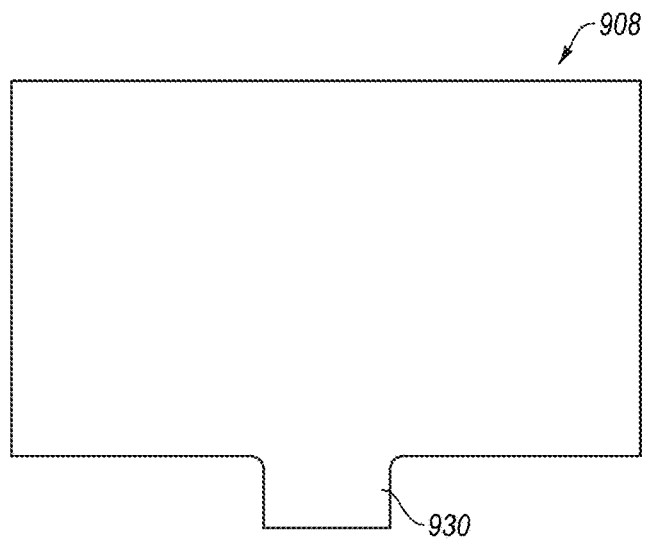
Figure 9G:
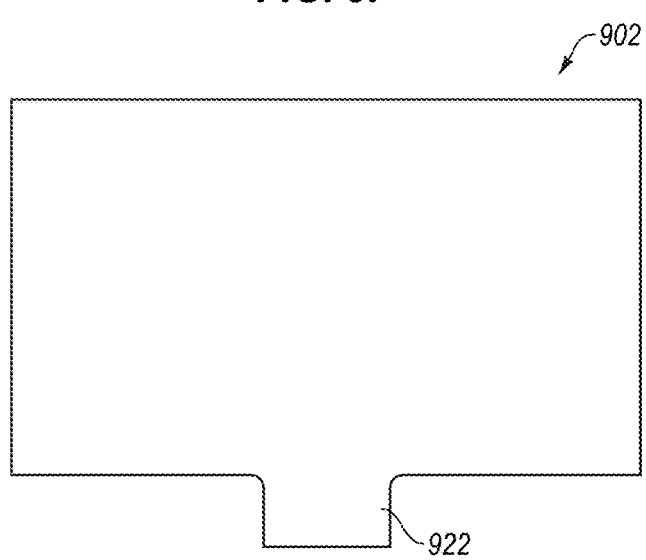

With combined reference to FIGS. 9A, 9C, and 9G, each of the first electrode layer 902 and the second electrode layer 906 may include an elastomeric substrate or layer such as silicone or the like with conductive particles (e.g., nanoparticles, such as carbon black, nickel nanostrands, silver nanoparticles, graphene nanoplatelets, graphene-oxides, or the like) integrated within. The conductive particles in each of the first electrode layer 902 and the second electrode layer 906 may be distributed continuously throughout the elastomeric substrate or layer and/or may be arranged thereon or therein in a hatched or mesh pattern or structure.

Referring to FIG. 9C, the second electrode layer 906 may also include a PCB interface 918 and one or more conductive trace pads 920 for attaching electrical traces, a PCB, or other electronics of or in a corresponding electronics unit of a sensor module in which the detector patch 900 is implemented, for operation and control of the detector patch 900.

Referring to FIG. 9G, the first electrode layer 902 may also include a tab region 922 to, among other things, support or provide mechanical strength to a connective region (e.g., the PCB interface 918) of the detector patch 900 for the trace pads 920.

With combined reference to FIGS. 9A and 9E, the signal electrode layer 904 may include an elastomeric material such as silicone or the like with electrically conductive material confined to the perimeter electrode 912, one or more sensor regions 924, and one or more electrical traces 926. The perimeter electrode 912, the sensor regions 924, and/or the electrical traces 926 may include conductive particles (e.g., nanoparticles, such as carbon black, nickel nanostrands, silver nanoparticles, graphene nanoplatelets, graphene-oxides, or the like) on or in the signal electrode layer 904. For example, the sensor regions 924 may be printed on the elastomeric material of the signal electrode layer 904. The electrical traces 926 may terminate at a tab region 928 that aligns with the trace pads 920 of the second electrode layer 906 to provide electrical connection points for the electrical traces 926. As shown, embodiments of the signal electrode layer 904 may include the perimeter electrode 912 that electrically connects to the first electrode layer 902 and the second electrode layer 906 to, among other things, provide electrical isolation for the entire detector patch 900. In this and other embodiments, the first electrode layer 902, the second electrode layer 906, and the perimeter electrode 907 may form a Faraday cage that at least partially surrounds the signal electrode layer 904.

With combined reference to FIGS. 9A, 9D, and 9F, each of the dielectric layers 908, 910 may include an elastomeric material such as silicone or the like configured to electrically insulate the signal electrode layer 904 from the first electrode layer 902 and the second electrode layer 906. In some embodiments, and depending upon, among other things, an intended or desired amount of permittivity or the like, one or both of the dielectric layers 908, 910 may have some conductive material integrated within. While not drawn rigorously to scale, each of the dielectric layers 908, 910 and the signal electrode layer 904 may be sized to be slightly smaller than the first electrode layer 902 and the second electrode layer 906 to leave a perimeter edge of the first electrode layer 902 and the second electrode layer 906 exposed and allow electrical contact with the perimeter electrode 912 as disclosed herein.

In some embodiments, each of the dielectric layers 908, 910 may also include a tab region 930, 932, respectively. The tab regions 930, 932 may cover at least a portion of the PCB interface 918 of the second electrode layer 906. For example, the tab regions 930, 932 may cover the PCB interface 918 up to the trace pads 920 of the PCB interface 918.

Figure 9H:
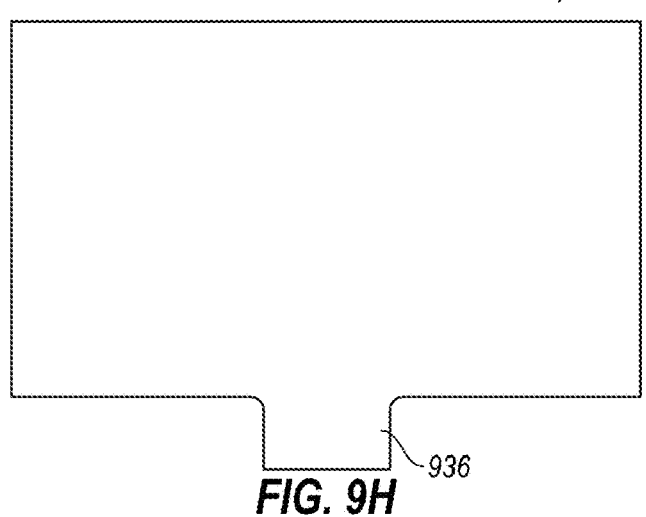

With combined reference to FIGS. 9A, 9B, and 9H, each of the first and second dielectric cover layers 914, 916 may include an elastomeric material such as silicone or the like. The first dielectric cover layer 914 may cover the first electrode layer 902 to prevent the first electrode layer 902 from unwanted contact with other objects, surfaces, or the like and/or to electrically insulate the first electrode layer 902. The second dielectric cover layer 916 may cover the second electrode layer 906 to prevent the second electrode layer 906 from unwanted contact with other objects, surfaces, or the like and/or to electrically insulate the second electrode layer 906.

Referring to FIG. 9B, the second dielectric cover layer 916 may be sized to cover the second electrode layer 906 and may be larger than the second electrode layer 906 in some embodiments. Alternatively or additionally, the second dielectric cover layer 916 may include a tab region 934 to cover the PCB interface 918 of the second electrode layer 906 up to the trace pads 920.

Referring to FIG. 9H, the first dielectric cover layer 914 may be sized to cover the first electrode layer 902 and may be larger than the first electrode layer 902 in some embodiments. Alternatively or additionally, the first dielectric cover layer 914 may include a tab region 936 to support or provide mechanical strength to the connective region (e.g., the PCB interface 918) of the detector patch 900 for the trace pads 920.

In some embodiments, one or both of the first and second electrode layers 902, 906 may be coupled to ground of a corresponding sensor module and may thus be referred to as ground electrodes or ground electrode layers. Where both of the first and second electrode layers 902, 906 are ground electrodes, each of the sensor regions 924 may form or be part of a different capacitor with the first and second electrode layers 902, 906. In this and other embodiments, each capacitor may include two nodes or terminals. One node or terminal may include the corresponding sensor region 924 while the other node or terminal may include the first and second electrode layers 902, 906 and the perimeter electrode 912. Where both of the first and second electrode layers 902, 906 and the perimeter electrode 912 are coupled to ground, the node or terminal that includes the first and second electrode layers 902, 906 and the perimeter electrode 912 may form a Faraday cage substantially around the node that includes a given sensor region 616.

The detector patch 900 of FIGS. 9A-9H is illustrated as a three-electrode stack. The three-electrode stack of FIGS. 9A-9H may be extended to more, or less, electrode layers. Likewise, more or less sensor regions 924 and electrical traces 926 may be used in other configurations and shapes.

The detector patches 600, 800, 900 and others described herein are examples of flexible sensor systems or portions thereof that may include distributed sensor regions and corresponding electrical connections (e.g., electrical traces) of varying lengths. The variation in length can cause a related variance in base capacitance levels of the sensor regions that can be problematic and otherwise inconvenient to compensate for in electronic circuitry such as the electronics units described herein. Such sensor systems or portions thereof may also experience mechanical crosstalk in regions where electrical traces flex and/or strain induce errant capacitance signals. The crosstalk from the electrical traces can be significant in regions with relatively large surface area coupled to a ground electrode. According to some embodiments herein, the ground electrode may be formed with a hatched or mesh structure to, e.g., reduce the crosstalk. An example of such a ground electrode is described with respect to FIG. 10.

Figure 10A:
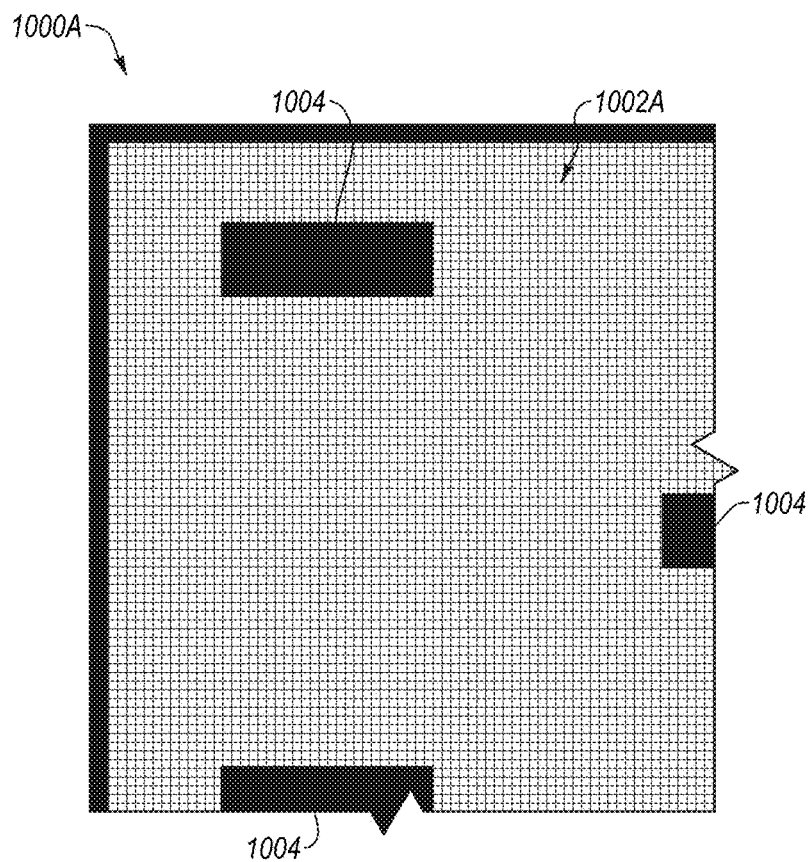
FIGS. 10A and 10B is each a schematic illustration of a portion of an example electrode layer that may be included in a detector patch.
Figure 10B:
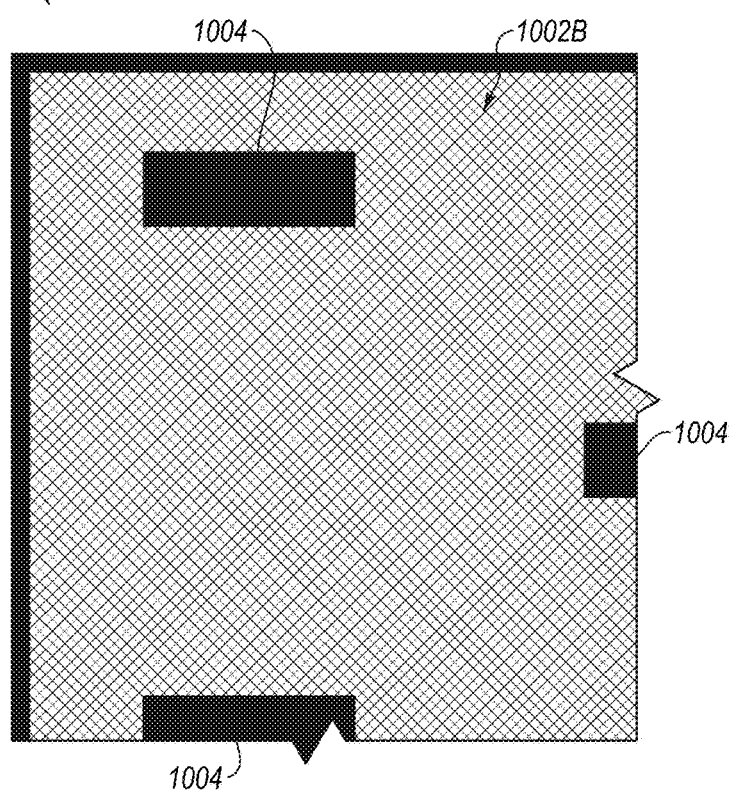

FIGS. 10A and 10B is each a schematic illustration of a portion of an example electrode layer 1000A, 1000B (hereinafter collectively "electrode layers 1000" or generically "electrode layer 1000"), arranged in accordance with at least one embodiment described herein. Each electrode layer 1000 may include, be included in, or correspond to other electrode layers herein. For example, any of the first electrode layers or second electrode layers herein may have a same, similar, or different configuration as the electrode layers 1000 of FIGS. 10A-10B.

As illustrated in FIGS. 10A and 10B, each electrode layer 1000 includes a partially open, checkered, or hatched or mesh pattern or structure 1002A, 1002B (hereinafter collectively "mesh structures 1002" or generically "mesh structure 1002") of an electrically conductive material such as carbon nanotubes, silver nanoparticles, other conductive particles, or the like in or on an elastomeric substrate such as silicone or the like. In some embodiments, the mesh structure 1002 may be printed on the elastomeric substrate, e.g., via additive or 3D printing. In some embodiments, the mesh structure 1002 may be formed as a continuous layer of electrically conductive material on the elastomeric substrate and then selectively etched to remove the electrically conductive material in select locations and form the mesh structure 1002 with holes or gaps. In some embodiments, and compared to an electrode layer with solid or continuous metallization, the mesh structure 1002 may provide similar electric shielding for a capacitive sensor with a reduced stray capacitance from electrical traces (e.g., electrical traces 926) due to the reduced surface area of the electrical traces coupling to the electrode layer 1000. Such a configuration may result in less error signal generated by strain and or flexion in the electrical traces. The reduction of the error signal may be proportional to an amount or percentage of non-metallized surface area of the electrode 1000, e.g., may be proportional to an amount or percentage of gaps or open spaces in the mesh structure 1002. Accordingly, embodiments herein may vary amounts or percentages of the open spaces in the mesh structure 1002 according to, among other things, signal frequencies to be shielded, width of the electrical traces, and/or other criteria. In general, wider electrical traces may produce more error signal (mechanical crosstalk) and for those embodiments a more open mesh structure 1002 (i.e., larger open spaces) may further reduce the crosstalk.

FIGS. 10A and 10B further illustrate sensor regions 1004 of a signal electrode layer that may be spaced above or below the electrode layer 1000 by a dielectric layer. Each sensor region 1004 forms or is part of a different capacitor with the electrode layer 1000.

In some embodiments, the mesh structure 1002 is arranged as a grid. Referring to FIG. 10A, the grid of the mesh structure 1002A may include intersecting lines of electrically conductive material aligned parallel or substantially parallel to edges of the electrode layer 1000A such that open spaces defined by the intersecting lines are also arranged linearly and parallel to the edges of the electrode layer 1000A. For example, a first subset of the lines of electrically conductive material may be aligned parallel to a vertical edge (in the orientation of FIG. 10A) of the electrode layer 1000A and spaced apart from each other while a second subset of the lines of electrically conductive material may be aligned parallel to a horizontal edge (in the orientation of FIG. 10A) of the electrode layer 1000A and spaced apart from each other. In this arrangement, the first subset of the lines intersects the second subset of the lines orthogonally or substantially orthogonally. The open spaces formed by this arrangement of lines includes generally rectangular open spaces aligned in vertical and horizontal lines.

Other alignments are also possible. For example, referring to FIG. 10B, the grid of the mesh structure 1002B may include intersecting lines of electrically conductive material aligned at plus and minus 45° relative to vertical (in the orientation of FIG. 10B) such that open spaces defined by the intersecting lines are also arranged linearly and at plus and minus 45° relative to vertical. For example, a first subset of the lines of electrically conductive material may be aligned at plus 45° relative to vertical in FIG. 10B and spaced apart from each other while a second subset of the lines of electrically conductive material may be aligned at minus 45° degrees relative to vertical in FIG. 10B and spaced apart from each other. In this arrangement, the first subset of the lines intersects the second subset of the lines orthogonally or substantially orthogonally. The open spaces formed by this arrangement of lines includes generally rectangular open spaces aligned in diagonal lines of plus or minus 45° relative to vertical.

Still other alignments are possible for the grid of the mesh structure 1000. For example, the intersecting lines of electrically conductive material may intersect at angles other than 90°. Alternatively or additionally, the lines may have alignments other than parallel to the vertical or horizontal edges of the electrode layer 1000 or other than plus and minus 45° relative to vertical (in the orientation of FIGS. 10A and 10B). In some embodiments, the open spaces formed by the arrangement of intersecting lines may have shapes other than rectangular. In some embodiments, the lines aligned in a given direction may have generally equal spacing from one line to the next or may have unequal or variable spacing from one line to the next.

In some embodiments, the grid of the mesh structure 1000 may be formed by non-linear intersecting shapes of electrically conductive material, such as interlinked annular rings, as a honeycomb pattern with hexagonal or other shape open spaces, with circular open spaces, or with any suitable arrangement of electrically conductive material and open spaces.

In some embodiments, a density of the electrically conductive material and/or the open spaces is uniform throughout the mesh structure 1000. In some embodiments, a density of the electrically conductive material and/or the open spaces is non-uniform throughout the mesh structure 1000. For example, the open spaces may be relatively more dense (e.g., a greater proportion of open space to electrically conductive material) in regions not directly above or below electrical traces and/or sensor regions 1004 and relatively less dense (e.g., a lesser proportion of open space to electrically conductive material) in regions directly above or below electrical traces and/or sensor regions 1004.

The particular configuration of the mesh structure 1000 in any given implementation may be selected to reduce crosstalk or alter or optimize other parameter or parameters. Aspects of the configuration of the mesh structure 1000 that may be selected or modified may include one or more of line width, line spacing, line alignment, open space shape, open space density (or conversely electrically conductive material density), uniformity (or lack thereof) of open space density (or conversely of electrically conductive material density), or other suitable aspects.

Figure 11A:
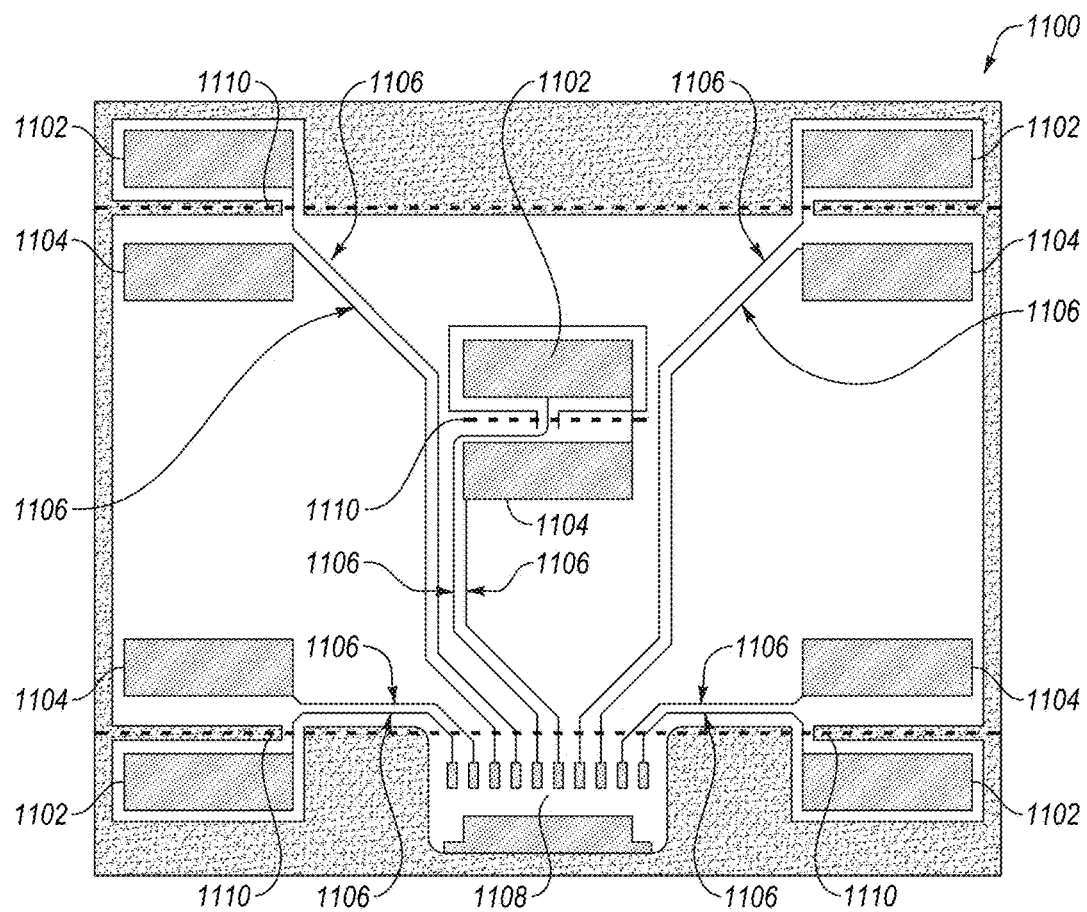
FIGS. 11A and 11B illustrate schematics of another example signal electrode layer with foldable sensor regions.
Figure 11B:
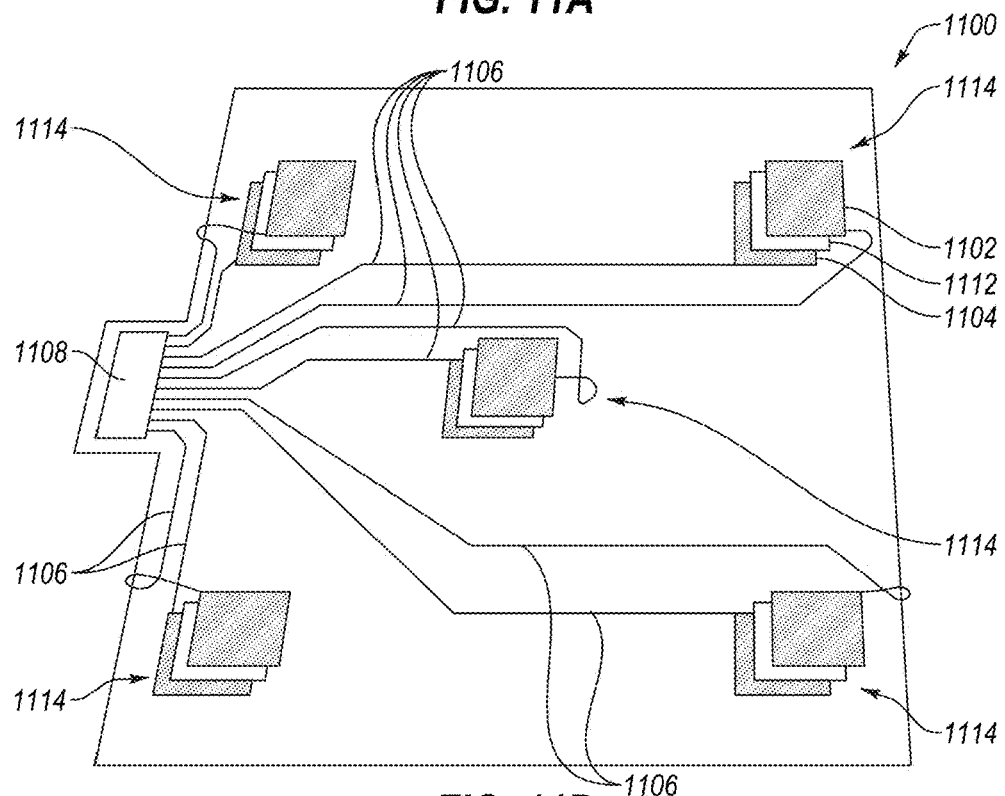

FIGS. 11A and 11B illustrate schematics of another example signal electrode layer 1100 with foldable sensor regions 1102, arranged in accordance with at least one embodiment described herein. The signal electrode layer 1100 may include, be included in, or correspond to other signal electrodes 1100 herein. For example, any of the signal electrode layers herein may have a same, similar, or different configuration as the signal electrode layer 1100 of FIGS. 11A and 11B. FIG. 11A is an overhead view of the signal electrode layer 1100 prior to folding the foldable sensor regions 1102. FIG. 11B is a top perspective view after folding the foldable sensor regions 1102.

The signal electrode layer 1100 may include an elastomeric material such as silicone or the like with electrically conductive material confined to one or more foldable sensor regions 1102, one or more sensor regions 1104, and one or more electrical traces 1106. The foldable sensor regions 1102, the sensor regions 1104, and/or the electrical traces 1106 may include conductive particles (e.g., nanoparticles, such as carbon black, nickel nanostrands, silver nanoparticles, graphene nanoplatelets, graphene-oxides, or the like) on or in the signal electrode layer 1100. The electrical traces 1106 may terminate at a tab region 1108 for connecting to a corresponding electronics unit, PCB, or other electronics for operation and control of a corresponding detector patch or sensor module in which the signal electrode layer 110 is implemented.

The foldable sensor regions 1102 may include a narrowed region intended to be a fold point, or fold line 1110, as indicated on FIG. 11A. The foldable sensor regions 1102 may be configured to fold over on top of sensor regions 1104 so they are positioned on top of the sensor regions 1104 as illustrated in FIG. 11B. The signal electrode 1100 may include greater or fewer sensor regions 1104 or foldable sensor regions 1102, other shaped sensor regions 1104 or foldable sensor regions 1102, other locations of sensor regions 1104 or foldable sensor regions 1102, other placements of fold lines 1110, or other configurations.

In manufacturing or formation of the signal electrode layer 1100, prior to folding over the foldable sensor regions 1102, an interposer 1112 (FIG. 11B) may be placed on or over each sensor region 1104. Only one interposer 1112 is labeled in FIG. 11B for simplicity. Each interposer 1112 may include a dielectric layer, or the like, composed of an elastomeric material such as silicone or the like that is configured to electrically insulate the foldable sensor regions 1102 and the sensor regions 1104 from each other. In some embodiments, depending upon, among other things, an intended or desired amount of permittivity, or the like, the interposer 1112 may have some conductive material integrated within. In some embodiments the interposer 1112 may include a separate component that is positioned prior to folding of foldable sensor regions 1102, or it may be an additively manufactured layer (e.g., 3D printed) formed on top of the signal electrode layer 1100. Other configurations and manufacturing processes are possible.

As illustrated in FIG. 11B, after placement of the interposers 1112, the foldable sensor regions 1102 may be folded over each fold line 1110 to position each of the foldable sensor regions 1102 spaced apart from and on top of or above a corresponding one of the sensor regions 1104. Each stack of sensor region 1104, interposer 1112, and foldable sensor region 1102 may form a corresponding multimode sensor region 1114. When combined with one or more other electrode layers and/or dielectric layers to form a detector patch such as those described herein, each sensor region 1104 and foldable sensor region 1102 within a given multimode sensor region 1114 may form or be part of a different capacitor with one or more of the electrode layers. For example, the sensor region 1104 of a given multimode sensor region 1114 together with one or more electrode layers may form or be part of a first capacitor while the foldable sensor region 1102 of the given multimode sensor region 114 together with the one or more electrode layers may form or be part of a second capacitor. The first and second capacitors formed by the sensor region 1104 and the foldable sensor region 1102 of each multimode sensor region 1114 may be referred to as a pair of capacitors or capacitor pair.

As also shown schematically in FIG. 11B, a portion of each electrical trace 1106 that is in one of the fold lines 1110 may likewise be folded over while leaving most of the respective electrical traces 1106 in a main or primary plane of the signal electrode layer 1100 (e.g., the portion of the signal electrode layer 1100 that is not folded over). With all or substantially all of each of the electrical traces 1106 to the multimode sensor regions 1114 residing in substantially the same plane (e.g., that of signal electrode layer 1100), associated signal measuring electronics (not shown) may subtract off common mode signals between each pair of capacitors each multimode sensor region 1114. Among other things, such an arrangement may result in embodiments that have a higher common mode rejection ratio from paired capacitors because all or substantially all of their respective electrical traces 1106 are in substantially the same plane and, with the common mode signals subtracted out, the remaining differential signal generated from the capacitor pair may be due completely or substantially to differences in the bending of the capacitors in the pair.

In some embodiments, the electrical traces 1106 that are folded over may be free folded, meaning they may be bent to form loops. In some embodiments, the electrical traces 1106 that are folded over may be mechanically or otherwise attached to the signal electrode layer 1100 or may be formed using an inset configuration. Further, while FIG. 11B illustrates a single interposer 1112 positioned between each paired sensor region 1104 and foldable sensor region 1102, in other embodiments, each paired sensor region 1104 and foldable sensor region 1102 may have positioned therebetween two or more interposers.

Figure 12:
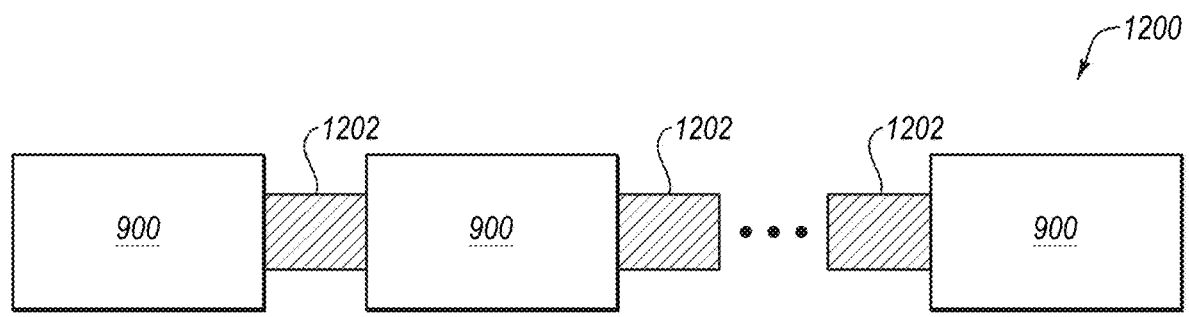
FIG. 12 is a schematic illustration of another example sensor module implemented as a multi-region angular displacement sensor.

FIG. 12 is a schematic illustration of another example sensor module 1200 implemented as a multi-region angular displacement sensor, arranged in accordance with at least one embodiment described herein. As illustrated, the sensor module 1200 may include multiple instances of the detector patch 900 of FIGS. 9A-9H coupled together through one or more elastomeric connectors 1202 to form the sensor module 1200. The sensor module 1200 may additionally include one or more electronic units, one or more electric power sources, or other components, devices, or systems. Additional disclosure of the construction, operation, and implementation of such an angular displacement sensor may be found in U.S. Pat. No. 10,551,917, which is hereby incorporated herein by reference in its entirety.

Figure 13:
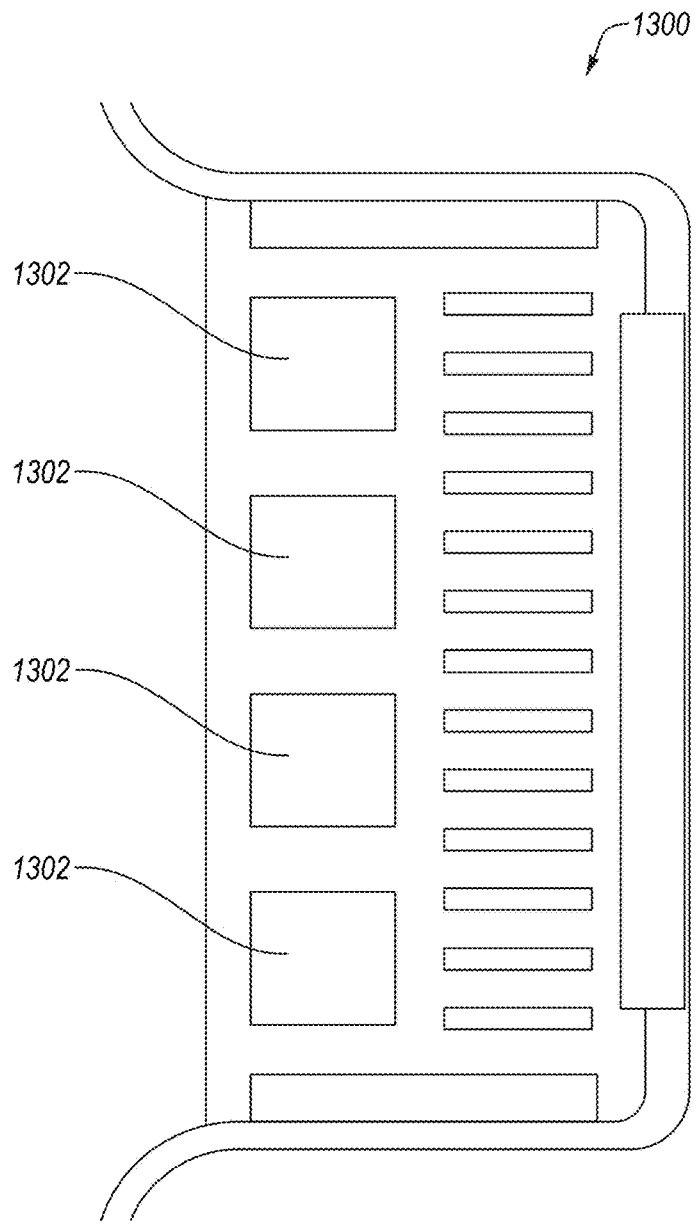
FIG. 13 is a schematic of an example PCB interface that may be included in an electrode layer.

FIG. 13 is a schematic of an example PCB interface 1300, arranged in accordance with at least one embodiment described herein. The PCB interface 1300 may include, be included in, or correspond to other PCB interfaces herein. For example, any of the PCB interfaces herein may have a same, similar, or different configuration as the PCB interface 1300 of FIG. 13.

In some embodiments, the PCB interface 1300 is placed or formed on a layer of a detector patch, such as the first electrode layer 902 or the second electrode layer 906, to provide a connection and mounting point for an electronics unit of a corresponding sensor module, such as for a PCB of such an electronics unit. The PCB interface 1300 may include electrically conductive portions printed with electrically conductive nanoparticles, such as carbon black, nickel nanostrands, silver nanoparticles, graphene nanoplatelets, graphene-oxides, or the like. For example, the PCB interface 1300 of FIG. 13 may include trace pads 1302 printed with silver nanoparticle ink or other electrically conductive material(s).

Figure 14A:
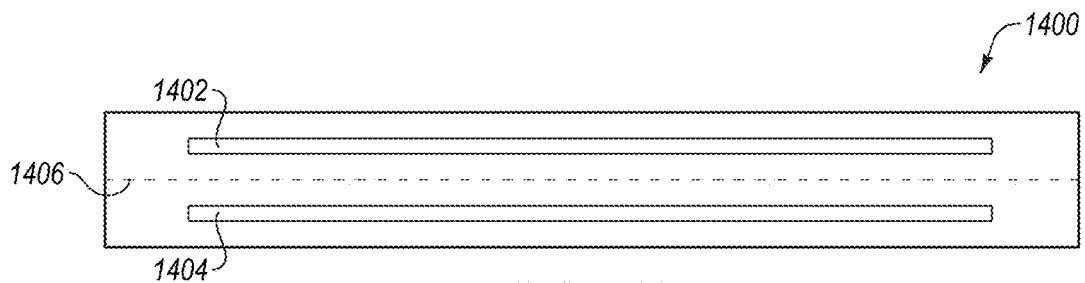
FIGS. 14A-14C illustrate an example bend sensor.
Figure 14B:
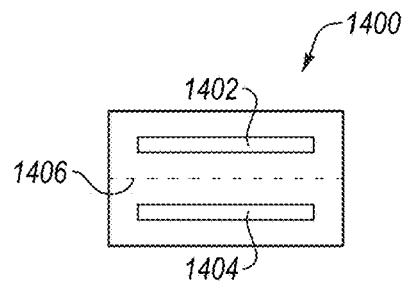
Figure 14C:
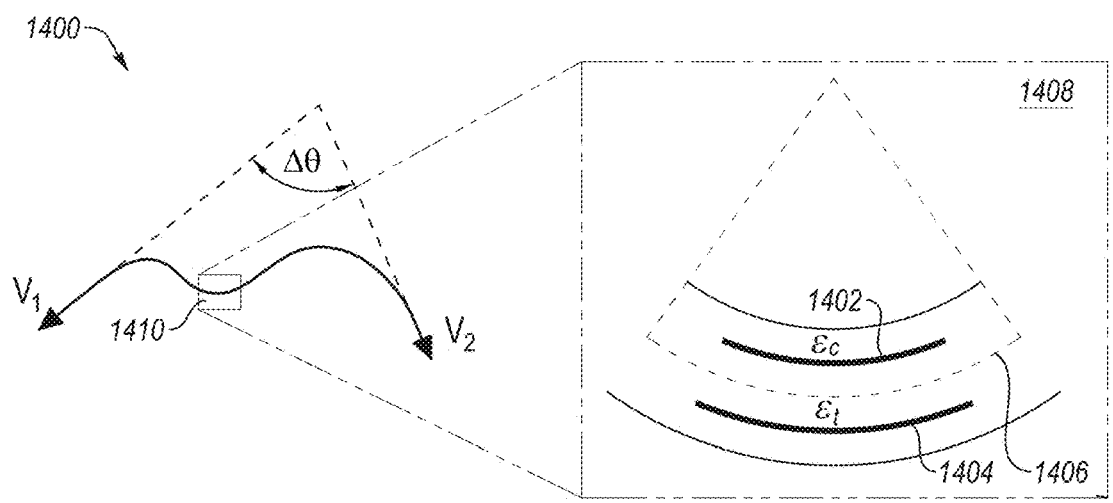

Some sensor modules and/or detector patches described herein may be implemented as or include a bend sensor. FIGS. 14A-14C illustrate an example bend sensor 1400, arranged in accordance with at least one embodiment described herein. The bend sensor 1400 may include, be included in, or correspond to other bend sensors, detector patches, and/or sensor modules herein. For example, any of the detector patches herein may have a same, similar, or different configuration as the bend sensor 1400 of FIGS. 14A-14C.

The bend sensor 1400 may generally have an elongate configuration with a length that exceeds its width and height. FIG. 14A is a cross-sectional view of the bend sensor 1400 in a plane parallel to the length and height of the bend sensor 1400. FIG. 14B is a cross-sectional view of the bend sensor 1400 in a plane parallel to the width and height of the bend sensor 1400. FIG. 14C illustrates the theory of operation of the bend sensor 1400.

The bend sensor 1400 may generally be configured to bend in the plane of FIG. 14A to measure single axis angular displacement in the plane of FIG. 14A. In general, the bend sensor 1400 may include various layers, electrodes, sensor regions, and/or electrical traces (e.g., the detector patch 900) arranged to form first and second capacitors 1402, 1404 or capacitive sensors stacked one on top of the other. The first capacitor 1402 may be positioned to one side of (e.g., above) a center 1406 of the bend sensor 1400, while the second capacitor 1404 may be positioned to an opposite side of (e.g., below) the center 1406.

In some embodiments, the bend sensor 1400 may be made using layered medical grade silicone elastomers doped with conductive and nonconductive fillers, giving them similar mechanical properties and operating temperatures to other silicone elastomer products.

In some embodiments, the bend sensor 1400 may measure angular displacement via a differential capacitance measurement. As such, common mode signals such as temperature fluctuations, strain and noise may be rejected, providing a high fidelity measurement of angular displacement.

In some embodiments, differential capacitance may be measured using extremely low sampling power, with less than 100 microamps (μA) power consumption at 1.8 volts (V). Unlike some other bend sensor technology, the signal may be highly stable over time and may not drift, facilitating high reliability and accuracy.

The bend sensor 1400 may be customized to include multiple channels and spatially distinct "bending pixels", may have arbitrary dimensions and varied stiffness, may be made inextensible or directly integrated into flex circuitry and/or may be configured to measure bending orthogonal planes. As used herein, a "bending pixel" may refer to a paired set of stacked capacitors that output a differential capacitance indicative of angular displacement localized to the bending pixel. For example, by segmenting each of the first and second capacitors 1402, 1404 along their lengths to form multiple linearly aligned first capacitors spaced across the center 1406 from multiple linearly aligned second capacitors 1404, each pair of a stacked first capacitor and second capacitor forms a bending pixel that may be configured to output a differential capacitance indicative of angular displacement localized to the bending pixel.

In some embodiments, the capacitors 1402, 1404 may be offset from the center 1406 (e.g., one to each side of the center 1406) and may extend the entire length or substantially the entire length of the bend sensor 1402, with a differential capacitance being measured between the two offset capacitors (FIG. 1). Because the output is differential, common mode signals such as tensile strain may be rejected. Accordingly, soft angular displacement sensors such as the bend sensor 1400 may measure an accurate bending angle even if common mode tensile strain, common mode compressive strain, or even a mixture of both is superimposed on top of the bending strain.

Referring to FIG. 14C, an output of the bend sensor 1400 may be angular displacement AO as computed from vectors $V_1, V_2$ defined by ends of the bend sensor 1400. FIG. 14C additionally includes a detail cross-sectional view 1408 of a bend portion 1410 of the bend sensor 1400. As illustrated in the view 1408, the first capacitor 1402 on the inside of the bend may experience a compressive strain $\varepsilon_c$ while the second capacitor 1404 on the outside of the bend may experience a tensile strain $\varepsilon_t$. Compared to an unbent or unstrained state, in the bent state illustrated in FIG. 14C the strains may alter the capacitances of the capacitors 1402, 1404 in opposite directions (e.g., one may increase while the other may decrease) which may cause the differential capacitance of the two capacitors 1402, 1404 to increase. The differential capacitance measurement may be linearly proportional to total angular displacement of the bend sensor 1400. As used herein, the total angular displacement may refer to the angle between the vectors $V_1$ and $V_2$.

Soft angular displacement sensors such as the bend sensor 1400 have a property of path independence, whereby extraneous bending has a limited effect on the sensor output. This property may arise from the fact that the capacitors, e.g., the first and second capacitors 1402, 1404, run the length or substantially the length of the bend sensor 1400. As such, the total amount of bending is integrated along the length such that extraneous bending paths are cancelled. This also means that the location of the bend can occur anywhere along the length of the bend sensor 1400.

Figure 15:
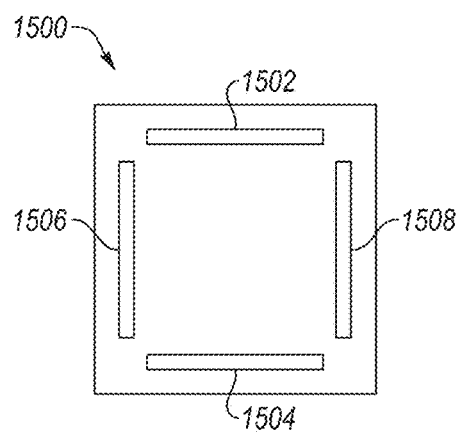
FIG. 15 illustrates another example bend sensor.

FIGS. 14A-14C depict a single-axis bend sensor 1400. The principal of operation of the bend sensor 1400 may be extended to double-axis bend sensors such as illustrated in FIG. 15. FIG. 15 illustrates another example bend sensor 1500, arranged in accordance with at least one embodiment described herein. The bend sensor 1500 may include, be included in, or correspond to other bend sensors, detector patches, and/or sensor modules herein. For example, any of the detector patches herein may have a same, similar, or different configuration as the bend sensor 1500 of FIG. 15.

The bend sensor 1500 may generally have an elongate configuration with a length that exceeds its width and/or height, generally similar to the bend sensor 1400 of FIGS. 14A-14C. FIG. 15 is a cross-sectional view of the bend sensor 1500 in a plane parallel to the width and height of the bend sensor 1500. As illustrated, the bend sensor 1500 includes first paired capacitors 1502, 1504 and second paired capacitors 1506, 1508. Each of the capacitors 1502, 1504, 1506, 1508 may extend all or substantially all of a length (e.g., in and out of the plane of FIG. 15) of the bend sensor 1500. A first differential signal from the first paired capacitors 1502, 1504 may measure angular displacement of the bend sensor 1500 in a plane aligned vertically and coming in and out of the plane of FIG. 15. A second differential signal from the second paired capacitors 1506, 1508 may measure angular displacement of the bend sensor 1500 in a plane aligned horizontally and coming in and out of the plane of FIG. 15.

Figure 16A:
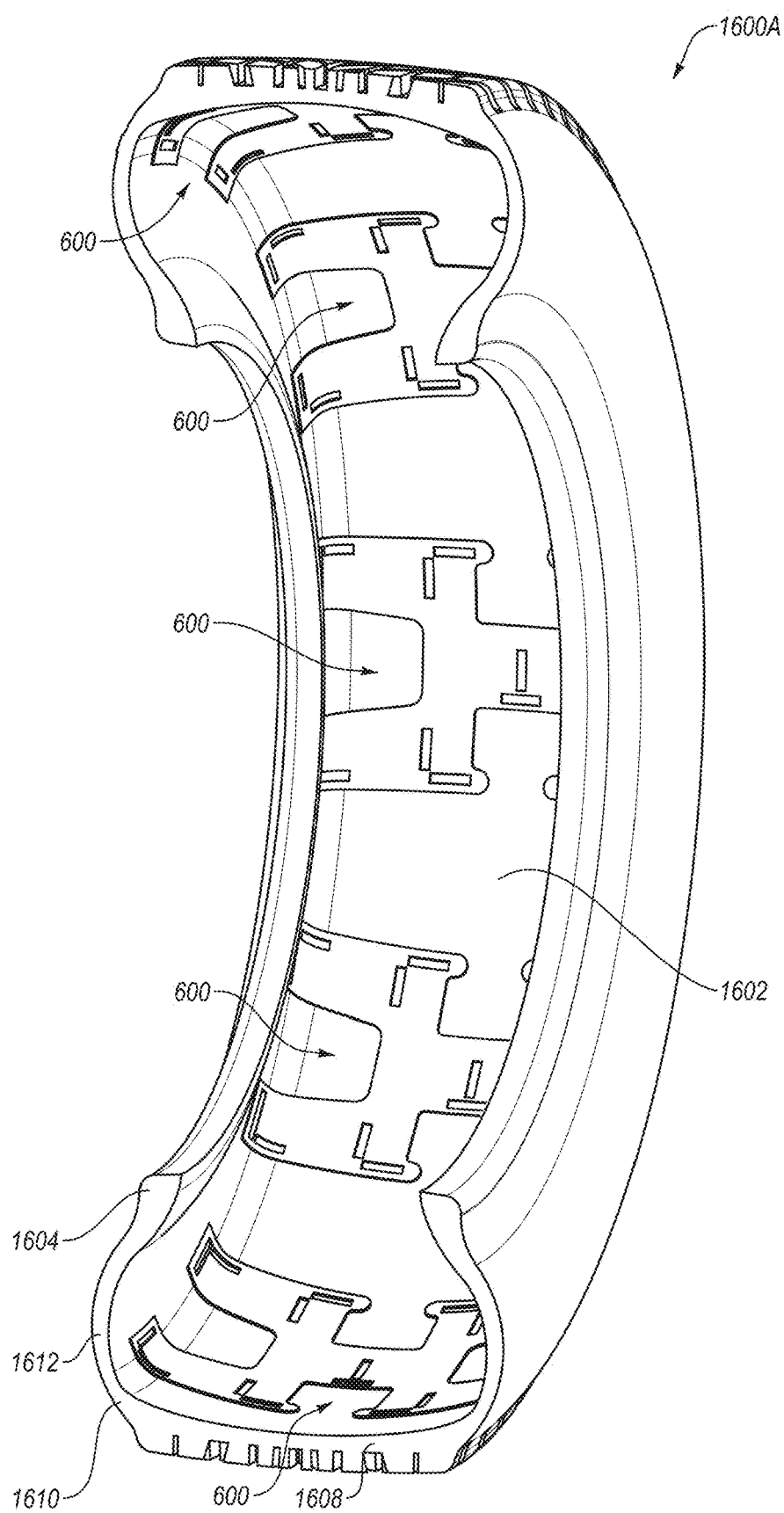
FIGS. 16A and 16B include cross-sectional views of vehicle tires with one or more attached sensor modules.
Figure 16B:
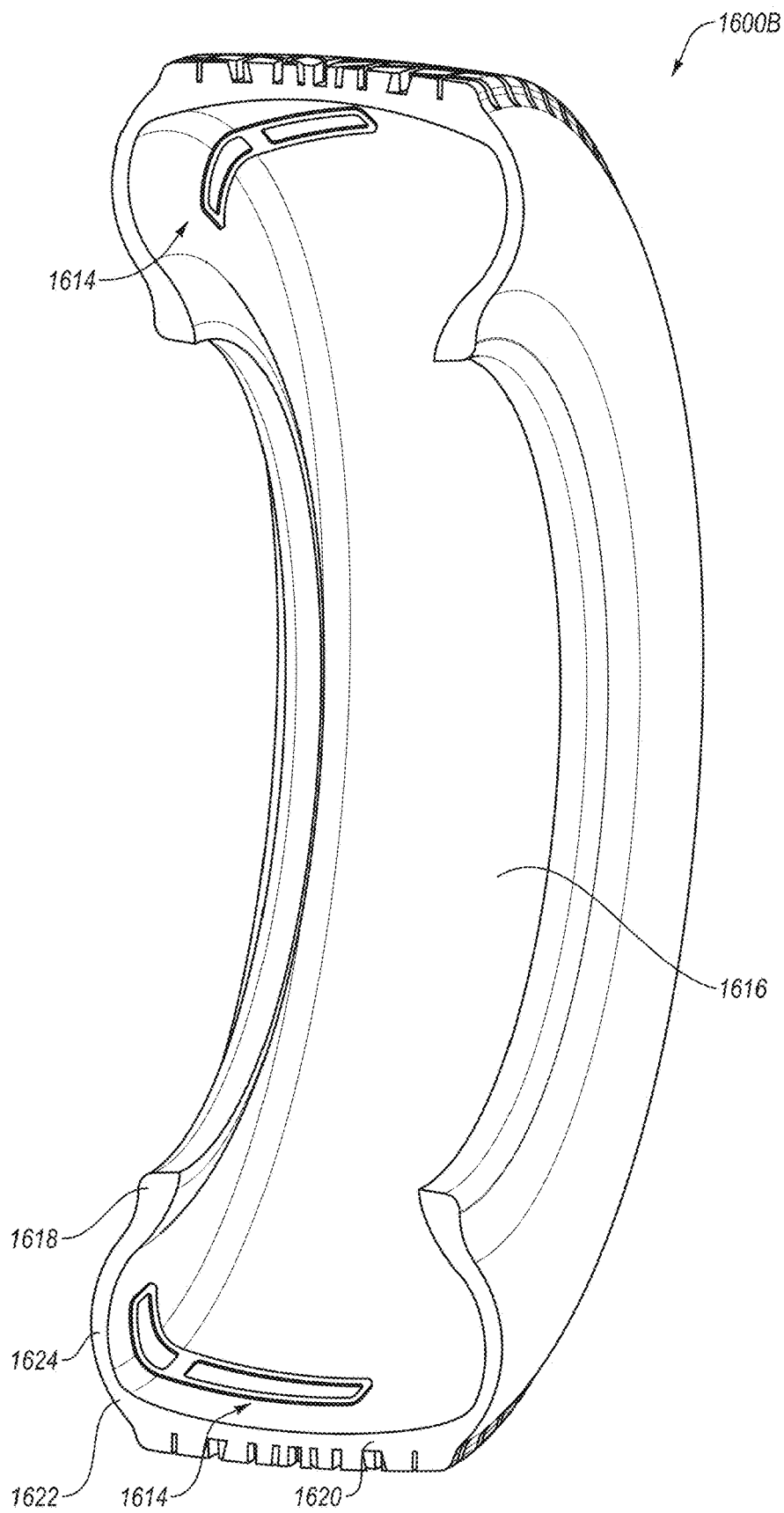

FIGS. 16A and 16B include cross-sectional views of vehicle tires 1600A, 1600B with one or more attached sensor modules, arranged in accordance with at least one embodiment described herein. FIGS. 16A and 16B illustrate various example arrangements of sensor modules on the vehicle tires 1600A, 1600B. Other arrangements are possible.

In more detail, FIG. 16A is an oblique cross-sectional view of the vehicle tire 1600A with one or more sensor modules that include multiple instances of the detector patch 600 of FIGS. 6A-6B. The detector patches 600 (with individual or shared electronics unit and/or electric power sources) may be dispersed upon an inside surface 1602 of the vehicle tire 1600A that has a tire bead 1604, a tread portion 1608, shoulder portions 1610, and sidewall portions 1612. The sensor modules and their sensor regions 616 (FIGS. 6A and 6B) can be disposed in close proximity to and/or on the inside surface 1602 of one or more of the sidewall portions 1612, the shoulder portions 1610, and/or the tread portion 1608. In some embodiments, the detector patches 600 may be distributed every 15°, 30°, 60°, 90°, 120°, and/or 180° about a circumference of the vehicle tire 1600A or have some other distribution.

FIG. 16B is an oblique cross-sectional view of the vehicle tire 1600B with one or more sensor modules that include multiple instances of a detector patch 1614 each of which has one of the signal electrode layers of FIGS. 7A-7D or other signal electrode layer. The detector patches 1614 (with individual or shared electronics unit and/or electric power sources) may be dispersed upon an inside surface 1616 of the vehicle tire 1600B that has a tire bead 1618, a tread portion 1620, shoulder portions 1622, and sidewall portions 1624. The detector patches 1614 and their sensor regions can be disposed in close proximity to and/or on the inside surface 1616 of one or more of the sidewall portions 1624, the shoulder portions 1622, and/or the tread portion 1620. In some embodiments, the detector patches 1614 may be distributed every 15°, 30°, 60°, 90°, 120°, and/or 180° about a circumference of the vehicle tire 1600B or have some other distribution.

Figure 17A:
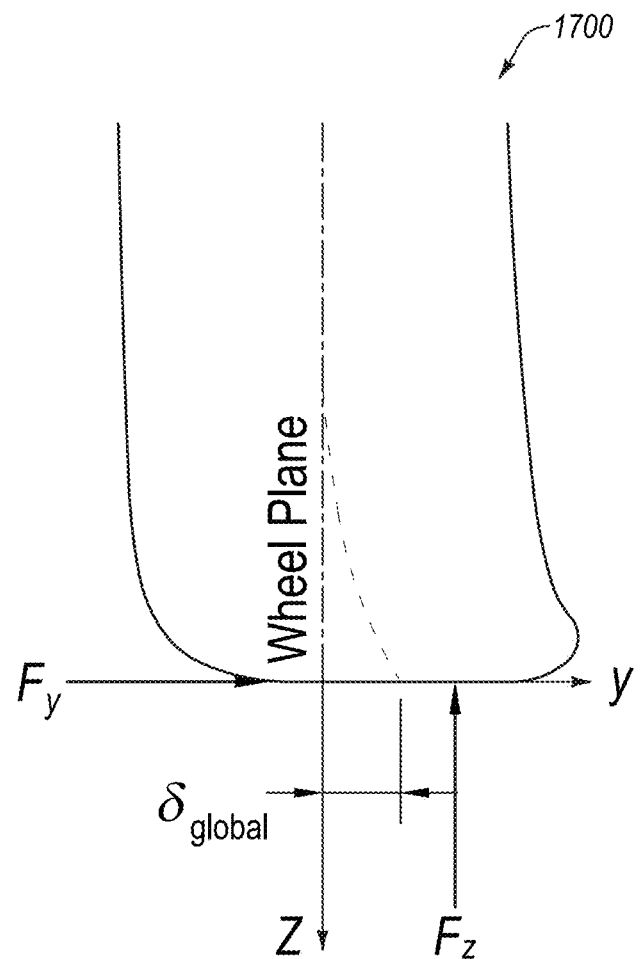
Figure 17B:
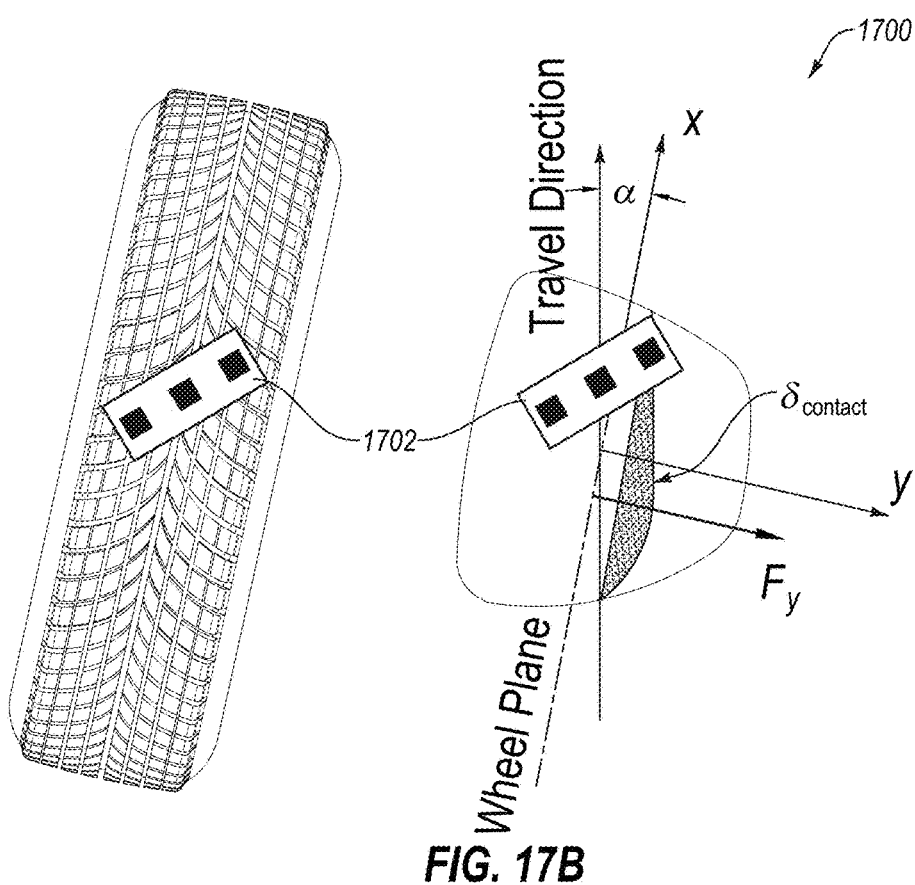
Figure 17C:
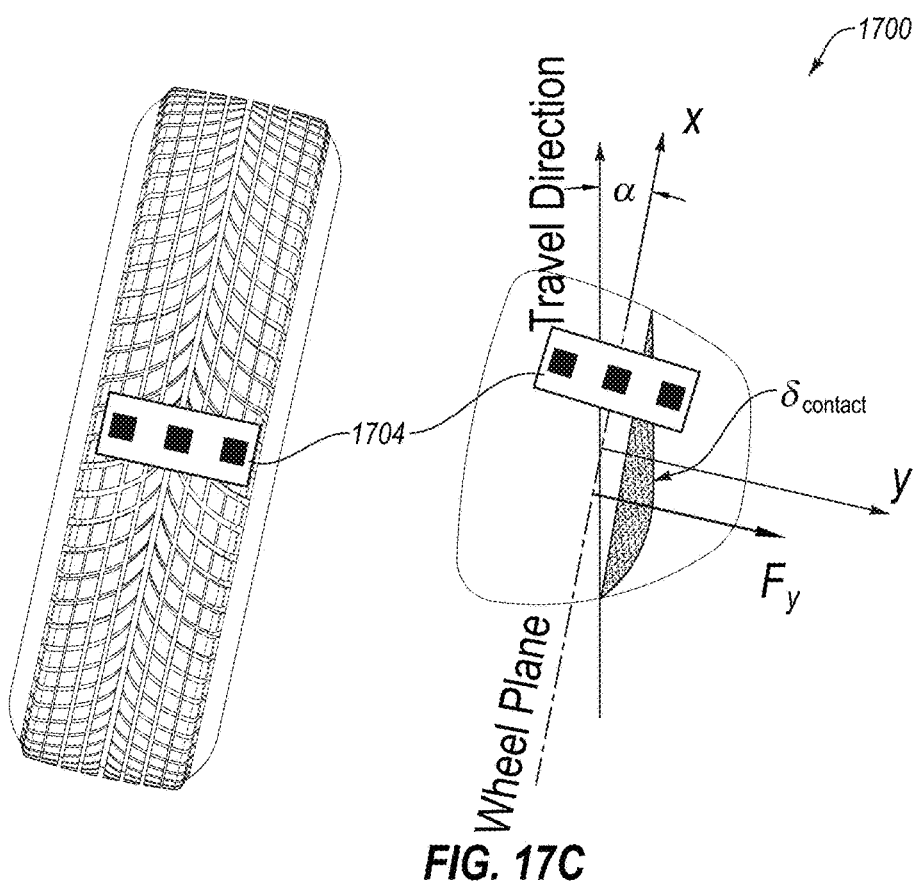

FIGS. 17A-17D illustrate some of the forces that may be experienced by a vehicle tire 1700 when the vehicle is in operation, arranged in accordance with at least some embodiments described herein. FIGS. 17B and 17C additionally illustrate example placement of a sensor module 1702, 1704 and/or its detector patch on an inside surface of the vehicle tire 1700. FIG. 17D illustrates the vehicle tire 1700 in an at-rest state 1706 and an in-use state 1708.

When the vehicle tire 1700 is mounted on a wheel/rim and is moving forward and turning, forces exerted upon the vehicle tire 1700 may be as shown. The contact patch of the vehicle tire 1700 upon a road surface may experience forces as a result of the wheel and a portion of the vehicle tire 1700 being displaced outwards, while the contact patch retains contact with the road surface. Forces Fy along the Y axis may effect a spatial displacement Y along the Y-axis of the vehicle tire 1700/wheel. At least one force vector exerted upon the vehicle tire 1700 structure may cause deformation in the vehicle tire 1700 tread portion, shoulder portions, and/or sidewall portions.

Referring to FIG. 17D, a tire displacement angle $A_{iu}$ can be determined relative to, e.g., the angle $A_{ar}$ of the sidewall portion at rest (depicted as vertical in the at-rest state 1706 of FIG. 17D). As shown in FIG. 17D, the physical location of the vehicle tire 1700 or portion thereof at rest may be compared with the physical location of the same tire portion in use or motion. In some embodiments, the so determined tire parameters may include tire portion physical displacement from a first at rest position, e.g., $Y1_{ar}$ and/or $Y2_{ar}$ (positions in the Y axis, laterally inward along the tire rotation axis) to a second real time position, e.g., $Y1_{iu}$ and/or $Y2_{iu}$) such displacement generating a strain sensor output. In some embodiments, "at rest" or the at-rest state 1706 may be when the vehicle tire 1700 is not rotating. In some embodiments, "at rest" may be when the vehicle that the vehicle tire 1700 is attached to is stationary, but under load, e.g., supported by all the tires of the vehicle. In some embodiments, "in use" may be when the vehicle tire 1700 is rotating. In some embodiments, in use may be when the vehicle to which the tires are attached is in motion, e.g., when the vehicle is turning, accelerating, decelerating, and/or moving with constant velocity. In some embodiments, the sensor modules 1702, 1704 may be disposed on the sidewall portions of the vehicle tire 1700 and the tire parameters determined according to embodiments herein may include an angular displacement from a first at rest tire sidewall portion angle $A_{ar}$ to a second real time tire sidewall portion angle $A_{iu}$, such change in sidewall portion angle generating a strain sensor output.

In some embodiments, a method for determining tire strain is described. The method may include calibrating the above described sensor modules by determining a reference capacitive sensor amplitude output with known tire physical parameter. In some embodiments, the method may include receiving a capacitive sensor amplitude output generated by actual, e.g., real time tire parameters, e.g., change in tire wall displacement angles, physical displacement of portions of the tire, or other deformation. In some embodiments, the method may include determining the tire strain by correlating the received strain sensor amplitude with the determined specific strain sensor amplitude output with known tire physical parameter.

In some embodiments, a method for measuring global deformation of a vehicle tire is described. The method may include measuring the strain applied to the tread and shoulder portions of a tire by one or more sensor modules disposed in close proximity to and/or on an inside surface of shoulder and/or tread portions of the vehicle tire. In some embodiments, the method may include measuring the strain and angular displacement applied to one or more sidewall portions of the vehicle tire by one or more sensor modules. In some embodiments, the method may include determining the global deformation of the tire by comparing an at rest capacitive output of one or more sensor modules to an under strain capacitive output of the one or more sensor modules.

In some embodiments a method for detecting sidewall tire wear and/or tire anomalies is described. The method may include measuring strain applied to a first portion of a sidewall portion and a second portion of the sidewall portion using one or more sensor modules, e.g., physical deformation or movement from a first position e.g., at rest or a first time position, to a second position, e.g., in motion position and/or a second time position. In some embodiments, the method may include comparing strain or angular displacement, e.g., physical deformation or movement from a first position e.g., at rest or a first time position, to a second position, e.g., in motion position and/or a second time position, of the first and second portions of the sidewall portion. In some embodiments, the method may include determining whether capacitive output differences between the measured strains exceed given thresholds.

Figure 18:
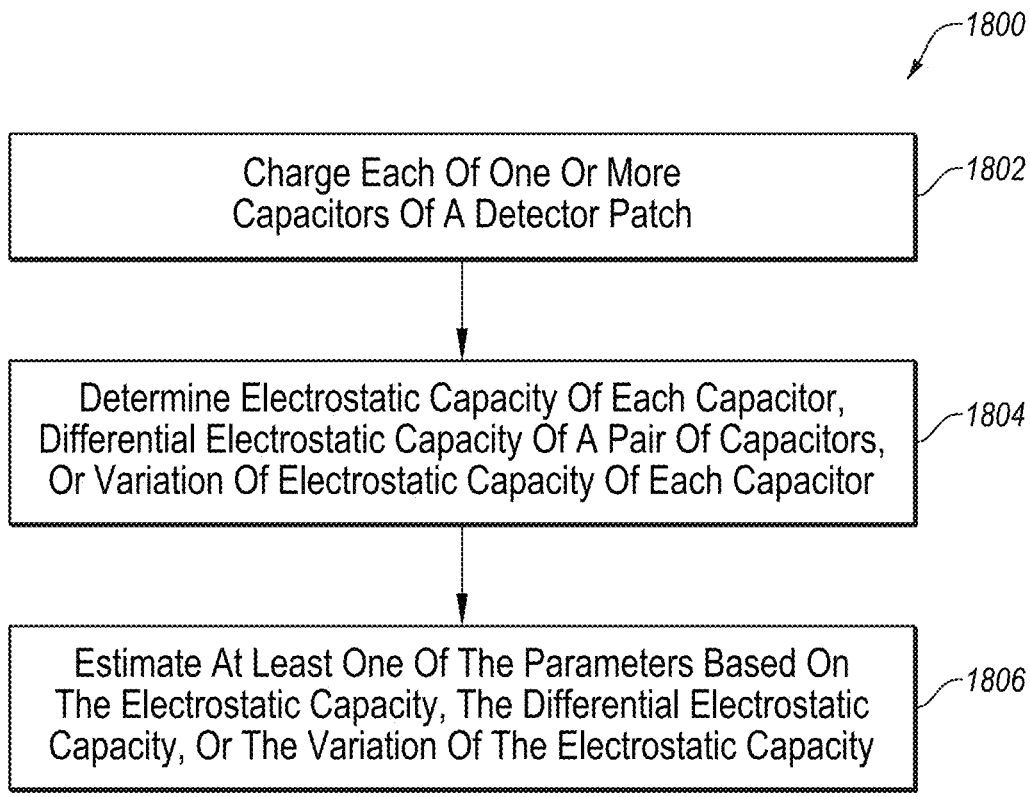
FIG. 18 is a flowchart of an example method to estimate one or more parameters of a tire.

FIG. 18 is a flowchart of an example method 1800 to estimate one or more parameters of a tire, arranged in accordance with at least one embodiment described herein. The method 1800 may be performed or controlled, in whole or in part, by a sensor module, electronics unit, or the like as described herein. The method 1800 may include one or more of blocks 1802, 1804, and/or 1806.

At block 1802, the method 1800 may include charging each of one or more capacitors of a detector patch. The capacitors may be charged by DC or AC. Block 1802 may be followed by block 1804.

At block 1804, the method 1800 may include determining electrostatic capacity of each capacitor, a differential electrostatic capacity of a pair of capacitors, or a variation of electrostatic capacity of each capacitor. In some embodiments, block 1804 may include impedance buffering voltage of each capacitor, sampling the voltage by an ADC where a value of ADC output is proportional to strain, and applying a calibration coefficient. Block 1804 may be followed by block 1806.

At block 1806, the method 1800 may include estimating the one or more parameters based on or using the determined electrostatic capacity, differential electrostatic capacity, or variation of electrostatic capacity. Block 1806 may include applying a machine learning algorithm to track features of a tire deformation waveform to estimate at least one of treadwear, loading, or traction of the tire.

In some embodiments, prior to the determining and the estimating, the method 1800 may further include calibrating each capacitor, including determining a reference output of each capacitor with known tire physical parameter.

In some embodiments, the method 1800 may further include receiving an output of each capacitor with unknown tire physical parameter. In this example, the estimating at block 1806 may include comparing the reference output with the known tire physical parameter and the output for the unknown tire physical parameter In some embodiments, the method 1800 may further include attaching the detector patch to the tire with a length of a first capacitor of the one or more capacitors aligned within plus or minus 30 degrees of a direction of travel of the tire or within plus or minus 30 degrees of a direction perpendicular to the direction of travel of the tire. The first capacitor has the length and a width and the length may exceed the width.

In some embodiments, the method 1800 may further include attaching the detector patch to the tire with each capacitor located near at least one selected from the group consisting of tire tread, tire shoulder, and tire sidewall.

In some embodiments, the method 1800 may further include generating energy in an energy generating circuit coupled to the detector patch to charge each capacitor.

Figure 19:
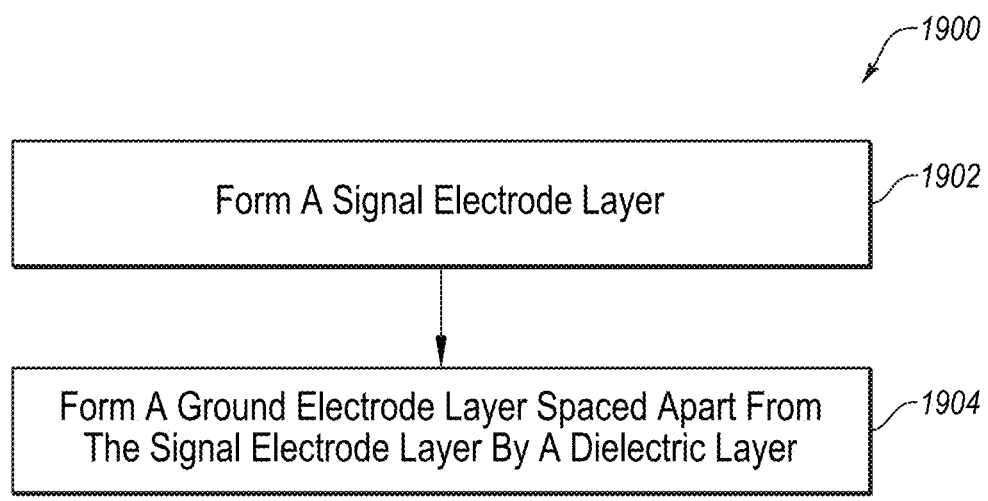
FIG. 19 is a flowchart of an example method to form a detector patch.

FIG. 19 is a flowchart of an example method 1900 to form a detector patch, arranged in accordance with at least one embodiment described herein. The method 1900 may include one or more of blocks 1902 and/or 1904. In some embodiments, the method 1900 or variation thereof may be used to form one or more of the detector patches 600, 800, 900 or other detector patches herein.

At block 1902, the method 1900 may include forming a signal electrode layer, such as any of the signal electrode layers 604, 700A-700D, 804, 904, 1100. Block 1902 may include forming an elastomeric material layer such as silicone or the like. The elastomeric material layer may be formed by additive printing or other method. Block 1902 may include forming a first sensor region on the elastomeric material layer in a first portion of the elastomeric material layer. Block 1902 may include placing an interposer on the first sensor region. Block 1902 may include forming a second sensor region on the elastomeric material layer in a second portion of the elastomeric material layer. Each of the first sensor region and the second sensor region may include one or more electrically conductive materials and/or may be formed by additive printing of an electrically conductive ink or other suitable process or materials. Block 1902 may include folding the elastomeric material layer to position the second portion over the first portion with the second sensor region aligned to the first sensor region and separated from the first sensor region by the interposer. The signal electrode layer may include the folded elastomeric material layer with the aligned first and second sensor regions separated by the interposer. Block 1902 may be followed by block 1904.

At block 1904, the method 1900 may include forming a ground electrode layer spaced apart from the signal electrode layer by a dielectric layer. The ground electrode layer may include, e.g., any of the first electrode layers 602, 802, 902, second electrode layers 606, 906, or other electrode layers described herein. Block 1904 may include forming another elastomeric material layer and forming an electrically conductive mesh structure on the elastomeric material layer.

In some embodiments, the elastomeric material layer may include an electronics connection region such as any of the PCB interfaces 808, 918, 1300 or other PCB interfaces or electronics connection regions herein. The method 1900 may further include, prior to the folding: forming a first trace on the elastomeric material layer that electrically couples the first sensor region to a first electrical pad in the electronics connection region; and forming a second trace on the elastomeric material layer that electrically couples the second sensor region to a second electrical pad in the electronics connection region. Each of the first trace and the second trace may include one or more electrically conductive materials.

In some embodiments, the method 1900 may further include forming a Faraday cage substantially around the signal electrode layer. In this and other embodiments, the ground electrode layer may include a first ground electrode layer (such as any of the first electrode layers 602, 802 902), the dielectric layer may include a first dielectric layer (such as the dielectric layer 608, 806, 908) formed on the first ground electrode layer, the signal electrode layer may be formed on the first dielectric layer, the forming the Faraday cage may include: forming a second ground electrode layer (such as the second electrode layer 606, 906) above and spaced apart from the signal electrode layer by a second dielectric layer (such as the dielectric layer 610, 910); and forming a perimeter electrode (such as the perimeter electrode 807, 912) substantially surrounding the first dielectric layer, the signal electrode layer, and the second dielectric layer. The perimeter electrode may electrically couple the first ground electrode layer to the second ground electrode layer.

In some embodiments, the ground electrode layer may include a first ground electrode layer (such as any of the first electrode layers 602, 802 902), the dielectric layer may include a first dielectric layer (such as the dielectric layer 608, 806, 908) formed on the first ground electrode layer, and the signal electrode layer may be formed on the first dielectric layer. In this and other embodiments, the method 1900 may further include: forming a first dielectric cover layer (such as the first dielectric cover layer 914) prior to forming the first ground electrode layer, where the first ground electrode layer is formed on the first dielectric cover layer; forming a second dielectric layer (such as the dielectric layer 910) on the signal electrode layer; forming a perimeter electrode (such as the perimeter electrode 912) substantially surrounding the first dielectric layer, the signal electrode layer, and the second dielectric layer, where the perimeter electrode is electrically coupled to the first ground electrode layer; forming a second ground electrode layer (such as the second electrode layer 906) on the second dielectric layer and electrically coupled to the perimeter electrode and the first ground electric layer; and forming a second dielectric cover layer (such as the second dielectric cover layer 916) on the second ground electrode layer.

EXAMPLES

Example—1 Determining High Stress Tire Regions

Figure 20A:
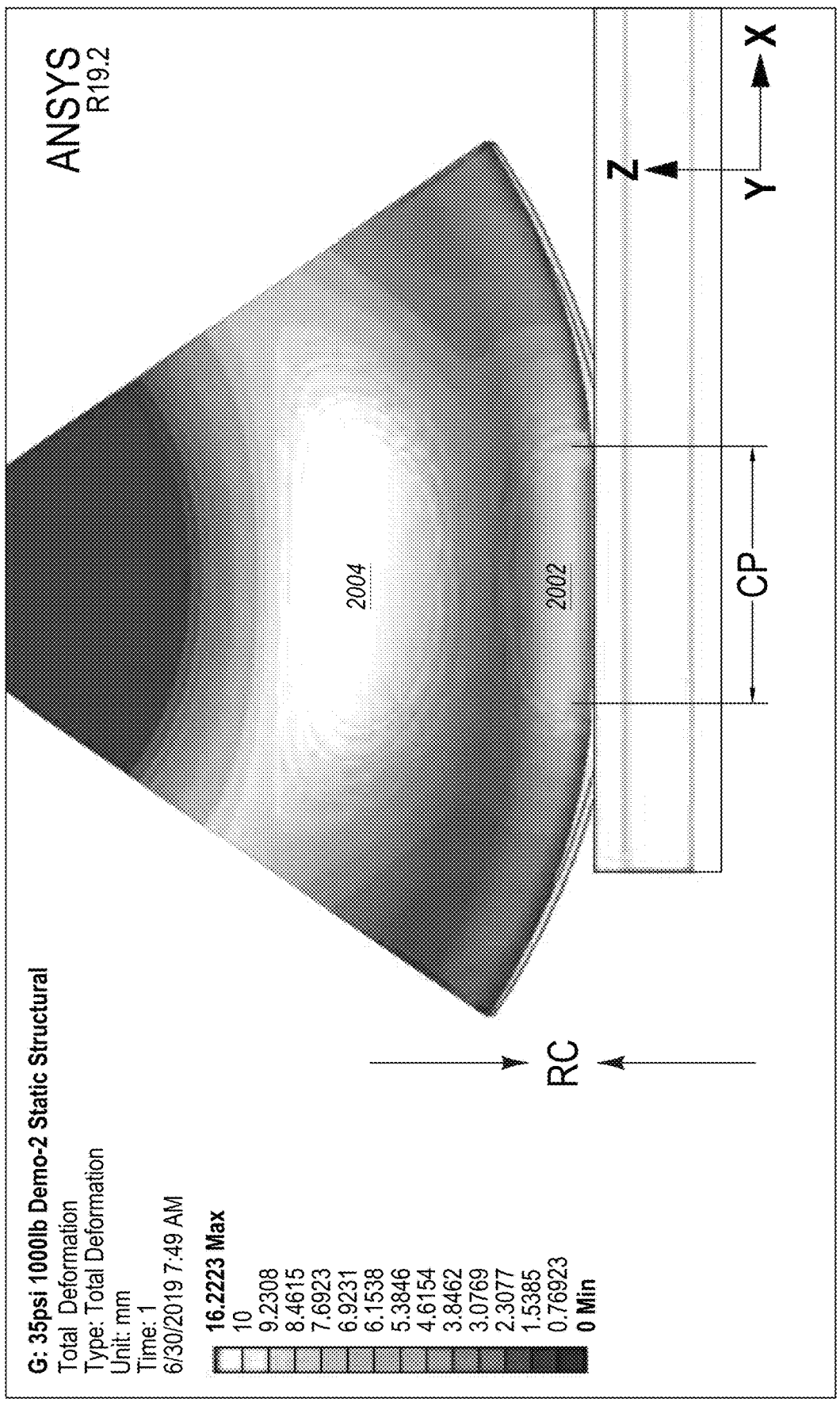
FIGS. 20A-20C include computer models of tire stresses and their locations as generated in Example 1.
Figure 20B:
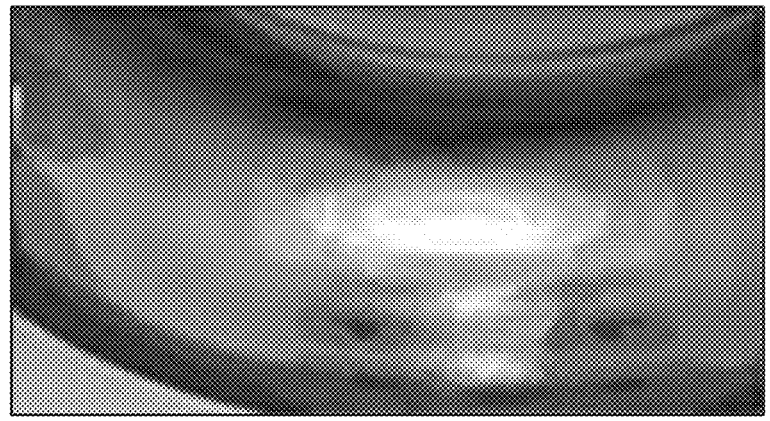
Figure 20C:
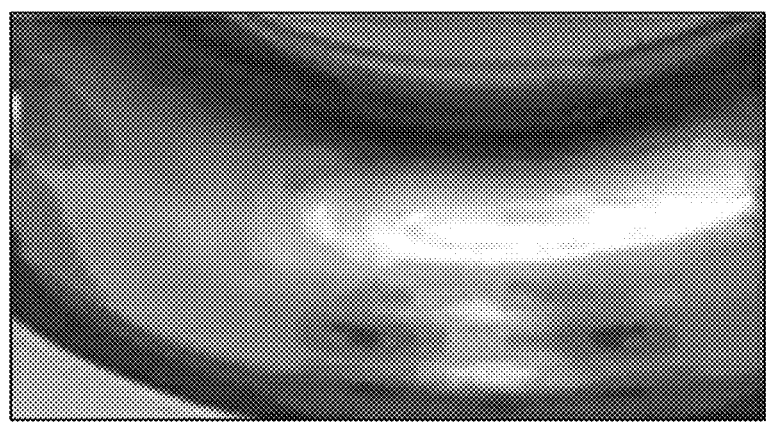

FIGS. 20A-20C include computer models of tire stresses and their locations as generated in this example, arranged in accordance with at least one embodiment described herein.

In this example, a 205/R15 radial tire was mounted on a tire stress system and the tire was inflated to about 31 pounds per square inch (psi). The tire stress applied to various locations on the tire was measured by various sensor modules such as described herein with sensor regions distributed at various locations on the inside of the tire. The measurements were received by a laptop computer with an ANSYS 19.2 software module. The resulting measurements were processed and the images as set forth in FIGS. 20A-20C were generated. Regions of varying stress are depicted in different shades, and high stress areas 2002 and 2004 in the tread and sidewall indicate a tire deformation of greater than 10.0 mm. In FIG. 20A, "CP" indicates the contact patch of the tire with the road surface and "RC" indicates radial compression of the tire upon sitting on the road surface. The RC was measured to be about 16 mm in this example. Placement of the sensor regions, dielectric generating material and or piezoelectric generating materials high stress areas such as 2002 and 2004 may increase and/or maximize the amplitude of the displacement applied to the respective sensor regions, dielectric current generating material and/or piezo electric generating material.

Example—2A Formation of Laminate Detector Patch

Embodiments of the layers substantially as depicted in FIGS. 6A and 6B were manufactured using the same or similar techniques and/or materials as disclosed in U.S. Pat. Nos. 8,941,281, 9,476,692, and 9,874,431. In this embodiment, eighteen sensor regions 616 were formed/manufactured (36 channels), but more generally the number of the sensor regions 616 can be determined manufactured as needed. In addition, the detector patch 600 was sized and configured for the two sensor regions 616 located at each of the four outer corners of the substantially H-shaped detector patch 600 (see the footprint of FIG. 6B) to be placed on the inside of sidewalls of a tire, the two sensor regions 616 located at each of the four inner corners of the substantially H-shaped detector patch 600 to be placed on the inside of shoulders of the tire, and the two sensor regions 616 in the middle of the substantially H-shaped detector patch 600 that have a T-shaped arrangement to be placed on the inside of tread of the tire.

Example—2B Formation of Laminate Detector Patch

Embodiments of the layers substantially as depicted in FIG. 6A with the footprint of the signal electrode layer 700A of FIG. 7A were manufactured using the same or similar techniques and/or materials as disclosed in U.S. Pat. Nos. 8,941,281, 9,476,692, and 9,874,431. In this embodiment, two sensor regions 702 were formed/manufactured (4 channels) in the detector patch. Since the number of sensor regions 702 is reduced compared to Example 2A, a multiplexing circuit is not needed herein. In addition, in this embodiment, in the non-sensor regions, the first and second electrode layers as ground electrodes included an electrically conductive mesh structure cross-hatched at about 45° relative the longitudinal axis of the detector patch. The mesh structure was disposed upon corresponding elastomeric layers by depositing conductive ink upon the corresponding elastomeric layers. The shorter of the two sensor regions 702 correspond to being placed on tire sidewall locations while the longer of the two sensor regions 702 correspond to being placed on tire tread locations.

Example—3 Formation of Sensor System a detector patch as described in Example 1 was wired to a 9-volt battery and a blue tooth communicating circuit, including an RF antenna. The tire was mounted on a rolling resistance machine and inflated to about 31 PSI. The raw data output was viewed on a laptop computer. An additional artificial intelligence chip may be connected to analyze the aforementioned raw data output.

Example—4 Formation of Energy Generating System

A detector patch as constructed in Example 1 was electrically connected to an energy generating circuit, e.g., on an inside surface of a portion of an automobile tire. The energy generating circuit included a 3 inch by 5 inch piece of piezo electric generating film and an energy harvesting storage module which provided a strain storage function and upon attaining a given threshold, discharged the accumulated charge to an electrically connected Imprint Energy (Alameda, CA, USA) Zinc polymer battery.

Example—5 Strain and Displacement Testing

A sensor module with detector patch as described in Examples 1 and 2A above was inserted onto an inner surface of a Goodyear R205/15 radial with some sensor regions correspondingly positioned inside the tire sidewalls, some sensor regions positioned inside the tire shoulders, and some sensor regions positioned inside the tire tread. The sensor module was glued in place using an adhesive compound and allowed to cure for 24 hours at room temperature. The resulting tire and attached sensor module was mounted on a rolling resistance machine. Each sensor region sent out raw data in the form of capacitive discharge which was viewed on a laptop computer with a bluetooth receiver. The resistance applied by the rolling resistance machine was varied and the corresponding changes in the data was noted.

Example—6 Energy Generation

An energy generating circuit such as the energy generating circuit 300 was positioned and attached to a portion of a tire. Upon manual deformation of the tire to which the electricity generating element (a piezo film in this example) was attached, a voltage was measured.

Figure 21:
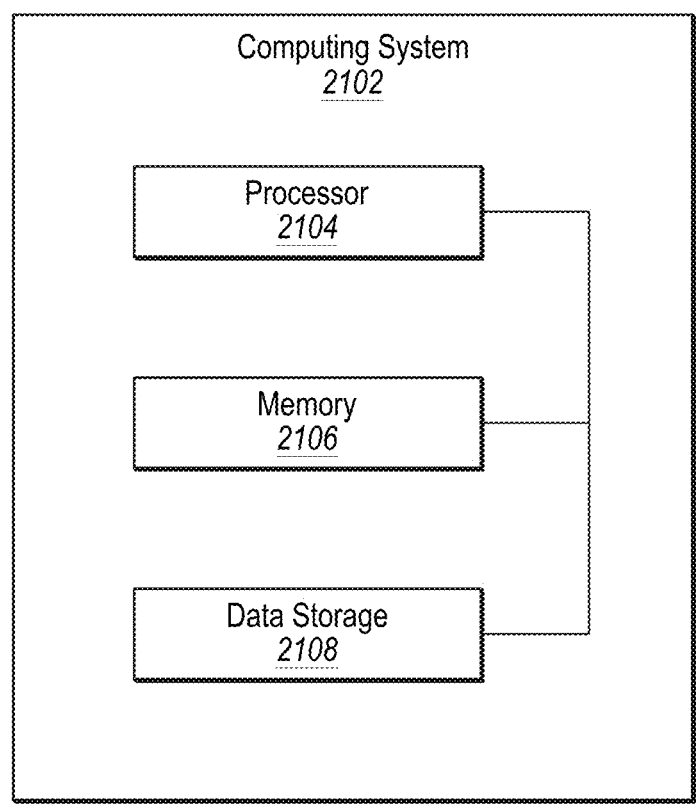
FIG. 21 illustrates a block diagram of an example computing system that may be used to perform or direct performance of one or more operations described herein.

FIG. 21 illustrates a block diagram of an example computing system 2102 that may be used to perform or direct performance of one or more operations described herein. The electronics units described herein may include or be implemented as the computing system 2102 or portions thereof. The computing system 2102 may include a processor 2104, a memory 2106, and a data storage 2108. The processor 2104, the memory 2106, and the data storage 2108 may be communicatively coupled.

In general, the processor 2104 may include any suitable special-purpose or general-purpose computer, computing entity, or processing device including various computer hardware or software modules and may be configured to execute instructions stored on any applicable computer-readable storage media. For example, the processor 2104 may include a microprocessor, a microcontroller, a DSP, an ASIC, an FPGA, or any other digital or analog circuitry configured to interpret and/or to execute computer-executable instructions and/or to process data. Although illustrated as a single processor, the processor 2104 may include any number of processors configured to, individually or collectively, perform or direct performance of any number of operations described in the present disclosure.

In some implementations, the processor 2104 may be configured to interpret and/or execute computer-executable instructions and/or process data stored in the memory 2106, the data storage 2108, or the memory 2106 and the data storage 2108. In some implementations, the processor 2104 may fetch computer-executable instructions from the data storage 2108 and load the computer-executable instructions in the memory 2106. After the computer-executable instructions are loaded into memory 2106, the processor 2104 may execute the computer-executable instructions.

The memory 2106 and the data storage 2108 may include computer-readable storage media for carrying or having computer-executable instructions or data structures stored thereon. Such computer-readable storage media may include any available media that may be accessed by a general-purpose or special-purpose computer, such as the processor 2104. By way of example, and not limitation, such computer-readable storage media may include tangible or non-transitory computer-readable storage media including RAM, ROM, Electrically EEPROM, Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2104 to perform a certain operation or group of operations.

For the processes and/or methods disclosed herein, the functions performed in the processes and methods may be implemented in differing order, as may be indicated by context. Furthermore, the outlined steps and operations are only provided as examples and some of the steps and operations may be optional, combined into fewer steps and operations, or expanded into additional steps and operations.

This disclosure may sometimes illustrate different components contained within, or connected with, different other components. Such depicted architectures are merely exemplary, and many other architectures may be implemented which achieve the same or similar functionality.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms used in this disclosure and in the appended embodiments, (e.g., bodies of the appended embodiments) are generally intended as "open" terms (e.g., the term "including" should be interpreted as "including, but not limited to," the term "having" should be interpreted as "having at least," the term "includes" should be interpreted as "includes, but not limited to," etc.). In addition, if a specific number of elements is introduced, this may be interpreted to mean at least the recited number, as may be indicated by context (e.g., the bare recitation of "two recitations," without other modifiers, means at least two recitations of two or more recitations). As used in this disclosure, any disjunctive word and/or phrase presenting two or more alternative terms should be understood to contemplate the possibilities of including one of the terms, either of the terms, or both terms. For example, the phase "A or B": will be understood to include the possibilities of "A" or "B" or "A and B."

The terms "a," "an," "the" and similar referents used in the context of describing the present disclosure (especially in the context of the following embodiments) are to be construed to cover both the singular and the plural, unless otherwise indicated herein or clearly contradicted by context. The use of any and all examples, or exemplary language (e.g., "such as") provided herein is intended merely to better illuminate the present disclosure and does not pose a limitation on the scope of any embodiments. No language in the specification should be construed as indicating any non-embodied element essential to the practice of the present disclosure.

Groupings of alternative elements or embodiments disclosed herein are not to be construed as limitations. Each group member may be referred to and embodied individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended embodiments.

Certain embodiments are described herein, including the best mode known to the inventors for carrying out the present disclosure. Of course, variations on these described embodiments, will become apparent to those of ordinary skill in the art upon reading the foregoing description. The inventor expects skilled artisans to employ such variations as appropriate, and the inventors intend for the present disclosure to be practiced otherwise than specifically described herein. Accordingly, the embodiments include all modifications and equivalents of the subject matter recited in the embodiments as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the embodiments. Other modifications that may be employed are within the scope of the embodiments. Thus, by way of example, but not of limitation, alternative embodiments may be utilized in accordance with the teachings herein. Accordingly, the embodiments are not limited to the embodiments precisely as shown and described.

A. A vehicle tire, comprising:
    a tread portion;
    a sidewall portion; and
    a sensor module for estimating one or more parameters of the tire, the sensor module comprising:

a detector patch comprising one or more capacitors, each of which has an electrostatic capacity that is variable due to at least deformation of each capacitor; and
an electronics unit connected to each capacitor and configured to control the sensor module;
wherein:
the detector patch is adhered to an inside of at least one of the tread portion or the sidewall portion;
at least one of the capacitors is located on the inside of the at least one of the tread portion and the inside of the sidewall portion; and
the electronics unit is configured to estimate at least one of the parameters based on the electrostatic capacity of each capacitor.

B. The vehicle tire of claim A, wherein the electronics unit is located on the inside of the tread portion or the sidewall portion.

C. The vehicle tire of claim A or B, wherein the capacitors are stacked as two or more layers or one layer in a thickness direction of the detector patch.

D. The vehicle tire of any of claims A-C, wherein each capacitor comprises at least a portion of each of three electrode layers, and two of the electrode layers are grounded.

E. The vehicle tire of claim D, wherein the grounded electrode layers have an electrically conductive mesh structure.

F. The vehicle tire of claim D, wherein:
the detector patch further comprises a perimeter electrode coupled between the grounded electrode layers;
a signal electrode layer of the three electrode layers is positioned between the grounded electrode layers; and
the grounded electrode layers and the perimeter electrode substantially encapsulate the signal electrode layer and form a Faraday cage substantially around the signal electrode layer.

G. The vehicle tire of claim D, wherein the three electrode layers are attached to the electronics unit by a conductive adhesive.

H. The vehicle tire of any preceding claim, wherein each capacitor is charged by direct current, and a variation of the electrostatic capacity of each capacitor is calculated on an amount of discharged charge.

I. The vehicle tire of any preceding claim, wherein:
a first capacitor of the one or more capacitors has a length and a width;
the length exceeds the width;

J. The vehicle tire of claim 1, wherein: when the sensor module is attached to the tire, the length of the first capacitor is aligned within plus or minus 30 degrees of a direction of travel of the tire or within plus or minus 30 degrees of a direction perpendicular to the direction of travel of the tire.

K. The vehicle tire of any of claims kJ, wherein the one or more capacitors comprise at least a first capacitor and a second capacitor.

L. The vehicle tire of claim K, wherein a major axis direction of the first capacitor is oriented in a different direction than a major axis direction of the second capacitor.

M. The vehicle tire of claim K, wherein a major axis direction of the first capacitor is oriented orthogonally to a major axis direction of the second capacitor.

N. The vehicle tire of any preceding claim, wherein the detector patch comprises a plurality of stacked layers, each of the stacked layers having a Young's modulus of 0.1 GPa or less.

O. The vehicle tire of any preceding claim, wherein the sensor module comprises a bend sensor module.

P. The vehicle tire of any preceding claim, wherein the one or more capacitors of the detector patch comprises a first capacitor and a second capacitor stacked on the first capacitor in a thickness direction of the detector patch.

Q. The vehicle tire of any preceding claim, wherein each of the capacitors comprises a first node substantially encapsulated within and electrically isolated from a second node, the second node forming a Faraday cage substantially around the first node.

R. The vehicle tire of any preceding claim, wherein the detector patch further comprises:
a first ground electrode layer;
a first dielectric layer coupled to the first ground electrode layer;
a signal electrode layer coupled to the first dielectric layer opposite the first ground electrode layer;
a second dielectric layer coupled to the signal electrode opposite the first dielectric layer;
a second ground electrode layer coupled to the second dielectric layer opposite the signal electrode layer; and
a perimeter electrode electrically coupled between a perimeter of the first ground electrode layer and a perimeter of the second ground electrode layer, the signal electrode layer electrically isolated from the perimeter electrode.

S. The vehicle tire of claim R, wherein:
the one or more capacitors of the detector patch includes a first capacitor;
the signal electrode layer of the detector patch includes a first sensor region of electrically conductive material; and
the first sensor region and first portions of the first ground electrode layer and the second ground electrode layer respectively separated from the first sensor region by the first dielectric layer and the second dielectric layer form the first capacitor.

T. The vehicle tire of claim R, wherein:
the one or more capacitors of the detector patch further includes a second capacitor;
the signal electrode layer of the detector patch further includes a second sensor region of electrically conductive material;
the first sensor region and the second sensor region are electrically isolated from each other within the signal electrode layer; and
the second sensor region and second portions of the first ground electrode layer and the second ground electrode layer respectively separated from the second sensor region by the first dielectric layer and the second dielectric layer form the second capacitor.

U. The vehicle tire of any preceding claim, further comprising an electric power source, wherein the electric power source comprises an energy generating circuit.

V. A method for estimating one or more parameters of a tire, the method comprising:
charging each of one or more capacitors of a detector patch;
determining an electrostatic capacity of each capacitor, a differential electrostatic capacity of a pair of capacitors, or a variation of electrostatic capacity of each capacitor; and
estimating at least one of the parameters based on the determined electrostatic capacity, differential electrostatic capacity, or variation of electrostatic capacity.

W. The method of claim V, wherein:
  the determining comprises impedance buffering voltage of each capacitor, sampling the voltage by an analog to digital converter (ADC) where a value of ADC output is proportional to strain, and applying a calibration coefficient; and
  the estimating comprises applying a machine learning algorithm to track features of a tire deformation waveform to estimate at least one of treadwear, loading, or traction.

X. The method of claim V or W, further comprising prior to the determining and the estimating, calibrating each capacitor, including determining a reference output of each capacitor with known tire physical parameter.

Y. The method of claim X, further comprising receiving an output of each capacitor with unknown tire physical parameter, wherein the estimating includes comparing the reference output with the known tire physical parameter and the output for the unknown tire physical parameter.

Z. The method of any of claims V-Y, further comprising attaching the detector patch to the tire with a length of a first capacitor of the one or more capacitors aligned within plus or minus 30 degrees of a direction of travel of the tire or within plus or minus 30 degrees of a direction perpendicular to the direction of travel of the tire, wherein the first capacitor has the length and a width and the length exceeds the width.

AA. The method of any of claims V-Z, further comprising attaching the detector patch to the tire with each capacitor located near at least one selected from the group consisting of tire tread, tire shoulder, and tire sidewall.

BB. The method of any of claims V-AA, further comprising generating energy in an energy generating circuit coupled to the detector patch to charge each capacitor.

CC. A detector patch, comprising:
  a first ground electrode layer;
  a first dielectric layer coupled to the first ground electrode layer;
  a signal electrode layer coupled to the first dielectric layer opposite the first ground electrode layer;
  a second dielectric layer coupled to the signal electrode opposite the first dielectric layer;
  a second ground electrode layer coupled to the second dielectric layer opposite the signal electrode layer; and
  a perimeter electrode electrically coupled between a perimeter of the first ground electrode layer and a perimeter of the second ground electrode layer, the signal electrode layer electrically isolated from the perimeter electrode.

DD. The detector patch of claim CC, wherein at least one of the first ground electrode layer, the signal electrode layer, and the second ground electrode layer comprises an elastomeric material with electrically conductive material integrated within or thereon.

EE. The detector patch of claim CC or DD, wherein at least one of the first ground electrode layer, the signal electrode layer, and the second ground electrode layer comprises an electrically conductive mesh structure.

FF. The detector patch of any of claims CC-EE, wherein each of the of the first ground electrode layer, the first dielectric layer, the signal electrode layer, the second dielectric layer, and the second ground electrode layer comprises a Young's modulus of 0.1 GPa or less.

GG. The detector patch of any of claims CC-EE, wherein:
  the signal electrode layer comprises a first sensor region of electrically conductive material and a second sensor region of electrically conductive material; and
  the first sensor region and the second sensor region are electrically isolated from each other within the signal electrode layer.

HH. The detector patch of claim GG, wherein:
  the first sensor region and first portions of the first ground electrode layer and the second ground electrode layer respectively separated from the first sensor region by the first dielectric layer and the second dielectric layer form a first capacitor; and
  the second sensor region and second portions of the first ground electrode layer and the second ground electrode layer respectively separated from the second sensor region by the first dielectric layer and the second dielectric layer form a second capacitor.

II. The detector patch of any of claims CC-HH, wherein the first ground electrode layer, the second ground electrode layer, and the perimeter electrode form a Faraday cage substantially around the signal electrode layer.

JJ. A method to form a detector patch, the method comprising:
  forming a signal electrode layer, including:
    forming an elastomeric material layer;
    forming a first sensor region on the elastomeric material layer in a first portion of the elastomeric material layer;
    placing an interposer on the first sensor region;
    forming a second sensor region on the elastomeric material layer in a second portion of the elastomeric material layer, wherein each of the first sensor region and the second sensor region includes one or more electrically conductive materials; and
    folding the elastomeric material layer to position the second portion over the first portion with the second sensor region aligned to the first sensor region and separated from the first sensor region by the interposer, wherein the signal electrode layer includes the folded elastomeric material layer with the aligned first and second sensor regions separated by the interposer; and
  forming a ground electrode layer spaced apart from the signal electrode layer by a dielectric layer.

KK. The method of claim JJ, wherein the elastomeric material layer includes an electronics connection region, the method further comprising, prior to the folding:
  forming a first trace on the elastomeric material layer that electrically couples the first sensor region to a first electrical pad in the electronics connection region; and
  forming a second trace on the elastomeric material layer that electrically couples the second sensor region to a second electrical pad in the electronics connection region;
  wherein each of the first trace and the second trace includes one or more electrically conductive materials.

LL. The method of claim JJ or KK, further comprising forming a Faraday cage substantially around the signal electrode layer.

MM. The method of claim LL, wherein the ground electrode layer comprises a first ground electrode layer, the dielectric layer comprises a first dielectric layer formed on the first ground electrode layer, the signal electrode layer is formed on the first dielectric layer, and the forming the Faraday cage comprises:
  forming a second ground electrode layer above and spaced apart from the signal electrode layer by a second dielectric layer; and
  forming a perimeter electrode substantially surrounding the first dielectric layer, the signal electrode layer, and the second dielectric layer and that electrically couples the first ground electrode layer to the second ground electrode layer.

NN. The method of any of claims JJ-MM, wherein the ground electrode layer comprises a first ground electrode layer, the dielectric layer comprises a first dielectric layer formed on the first ground electrode layer, and the signal electrode layer is formed on the first dielectric layer, the method further comprising:

forming a first dielectric cover layer prior to forming the first ground electrode layer, wherein the first ground electrode layer is formed on the first dielectric cover layer;

forming a second dielectric layer on the signal electrode layer;

forming a perimeter electrode substantially surrounding the first dielectric layer, the signal electrode layer, and the second dielectric layer, wherein the perimeter electrode is electrically coupled to the first ground electrode layer;

forming a second ground electrode layer on the second dielectric layer and electrically coupled to the perimeter electrode and the first ground electric layer; and forming a second dielectric cover layer on the second ground electrode layer.

OO. The method of any of claims JJ-NN, wherein the forming the ground electrode layer comprises forming an other elastomeric material layer and forming an electrically conductive mesh structure on the other elastomeric material layer.

What is claimed is:

1. A vehicle tire, comprising:
   a tread portion;
   a sidewall portion; and
   a sensor module for estimating one or more parameters of the tire, the sensor module comprising:
      a detector patch comprising one or more capacitors, each of which has an electrostatic capacity that is variable due to at least deformation of each capacitor; and
      an electronics unit connected to each capacitor and configured to control the sensor module;
   wherein:
      the detector patch is adhered to an inside of at least one of the tread portion or the sidewall portion;
      at least one of the capacitors is located on the inside of the at least one of the tread portion or the sidewall portion; and
      the electronics unit is configured to estimate at least one of the parameters based on the electrostatic capacity of each capacitor;
   wherein:
      a first capacitor of the one or more capacitors has a length and a width;
      the length exceeds the width;
      the one or more capacitors comprise at least a first capacitor and a second capacitor;
      a major axis direction of the first capacitor is oriented in a different direction than a major axis direction of the second capacitor; and
      the major axis direction of the first capacitor is oriented orthogonally to the major axis direction of the second capacitor.

2. The vehicle tire of claim 1, wherein the electronics unit is located on the inside of the tread portion or the sidewall portion.

3. The vehicle tire of claim 1, wherein the capacitors are stacked as two or more layers or one layer in a thickness direction of the detector patch.

4. The vehicle tire of claim 1, wherein each capacitor comprises at least a portion of each of three electrode layers, and two of the electrode layers are grounded.

5. The vehicle tire of claim 4, wherein the grounded electrode layers have an electrically conductive mesh structure.

6. The vehicle tire of claim 4, wherein:
   the detector patch further comprises a perimeter electrode coupled between the grounded electrode layers;
   a signal electrode layer of the three electrode layers is positioned between the grounded electrode layers; and
   the grounded electrode layers and the perimeter electrode substantially encapsulate the signal electrode layer and form a Faraday cage substantially around the signal electrode layer.

7. The vehicle tire of claim 4, wherein the three electrode layers are attached to the electronics unit by a conductive adhesive.

8. The vehicle tire of claim 1, wherein each capacitor is charged by direct current, and a variation of the electrostatic capacity of each capacitor is calculated on an amount of discharged charge.

9. The vehicle tire of claim 1, wherein: when the sensor module is attached to the tire, the length of the first capacitor is aligned within plus or minus 30 degrees of a direction of travel of the tire or within plus or minus 30 degrees of a direction perpendicular to the direction of travel of the tire.

* * * * *